(12) United States Patent
Foote et al.

(10) Patent No.: US 9,580,017 B2
(45) Date of Patent: Feb. 28, 2017

(54) VEHICLE MIRROR ASSEMBLY WITH WIDE ANGLE ELEMENT

(71) Applicant: Donnelly Corporation, Holland, MI (US)

(72) Inventors: Keith D. Foote, Grand Rapids, MI (US); Kevin P. Benthem, Grand Rapids, MI (US); Niall R. Lynam, Holland, MI (US)

(73) Assignee: DONNELLY CORPORATION, Holland, MI (US)

( * ) Notice: Subject to any disclaimer, the term of this patent is extended or adjusted under 35 U.S.C. 154(b) by 248 days.

(21) Appl. No.: 14/336,371

(22) Filed: Jul. 21, 2014

(65) Prior Publication Data

US 2014/0328072 A1     Nov. 6, 2014

Related U.S. Application Data

(63) Continuation of application No. 12/187,725, filed on Aug. 7, 2008, now Pat. No. 8,786,704.

(60) Provisional application No. 60/954,953, filed on Aug. 9, 2007, provisional application No. 61/022,450, filed on Jan. 21, 2008, provisional application No. 61/031,869, filed on Feb. 27, 2008, provisional application No. 61/050,853, filed on May 6, 2008, provisional application No. 61/073,406, filed on Jun. 18, 2008.

(51) Int. Cl.
  *H04N 7/18*   (2006.01)
  *B60R 1/08*   (2006.01)
  *B60Q 1/26*   (2006.01)

(52) U.S. Cl.
  CPC ............ *B60R 1/082* (2013.01); *B60Q 1/2665* (2013.01)

(58) Field of Classification Search
  CPC .............................. B60R 1/082; B60Q 1/2665
  USPC ......................................................... 348/148
  See application file for complete search history.

(56) References Cited

U.S. PATENT DOCUMENTS 1,114,559 A   10/1914  Weed
1,672,559 A    6/1928  Doble
(Continued)

FOREIGN PATENT DOCUMENTS

DE    2409748    9/1975
DE    2550095    5/1976
(Continued)

*Primary Examiner* — Alicia M Harrington
(74) *Attorney, Agent, or Firm* — Gardner, Linn, Burkhart & Flory, LLP

(57) ABSTRACT

A mirror reflective element assembly for a vehicular exterior rearview mirror assembly includes a principal mirror element, a wide angle mirror element and an illumination element that at least partially circumscribes the wide angle mirror element. The illumination element emits illumination at least partially around the wide angle mirror element that is viewable by a person viewing the exterior rearview mirror assembly when the mirror assembly is disposed at a side of a vehicle. At least one of (i) the illumination element, responsive to determination that an ambient light level is below a threshold level, is operable to provide a light level that is less than about 100 candelas per square meter, and (ii) the illumination element, responsive to determination that an ambient light level is above a threshold level, is operable to provide a light level that is greater than about 200 candelas per square meter.

19 Claims, 42 Drawing Sheets

(56) References Cited

U.S. PATENT DOCUMENTS

| | | |
|---|---|---|
| RE17,274 E | 4/1929 | Porter |
| 2,135,262 A | 11/1938 | Schumacher |
| 2,636,419 A | 4/1953 | Kerr |
| 2,778,273 A | 1/1957 | Fellmeth |
| 2,911,177 A | 11/1959 | West |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,267,806 A | 8/1966 | Azegami |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,764,201 A | 10/1973 | Haile |
| 3,826,563 A | 7/1974 | Davis |
| 3,881,811 A | 5/1975 | French |
| 3,909,117 A | 9/1975 | Takahashi et al. |
| 4,200,359 A | 4/1980 | Lawson |
| 4,223,983 A | 9/1980 | Bloom |
| 4,258,979 A | 3/1981 | Mahin |
| 4,268,120 A | 5/1981 | Jitsumori |
| 4,293,191 A | 10/1981 | Kim |
| 4,303,308 A | 12/1981 | Kobrin |
| 4,306,770 A | 12/1981 | Marhauer |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,436,372 A | 3/1984 | Schmidt et al. |
| 4,439,013 A | 3/1984 | Hagn et al. |
| 4,449,786 A | 5/1984 | McCord |
| 4,526,446 A | 7/1985 | Adams |
| 4,549,786 A | 10/1985 | Albers et al. |
| 4,575,202 A | 3/1986 | McGuire |
| 4,629,296 A | 12/1986 | White |
| 4,674,849 A | 6/1987 | Stewart |
| 4,678,294 A | 7/1987 | Van Nostrand |
| 4,715,701 A | 12/1987 | Urban |
| 4,824,231 A | 4/1989 | Quintana |
| 4,828,379 A | 5/1989 | Parsons et al. |
| 4,853,283 A | 8/1989 | Skolnick |
| 4,859,046 A | 8/1989 | Traynor et al. |
| 4,913,542 A | 4/1990 | Adolfsson |
| 4,917,485 A | 4/1990 | Baldwin, Sr. |
| 4,929,074 A | 5/1990 | Urban |
| 4,932,769 A | 6/1990 | Goosen |
| 4,932,770 A | 6/1990 | Caravaty |
| 4,989,964 A | 2/1991 | Meise |
| 5,005,962 A | 4/1991 | Edelman |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,080,492 A | 1/1992 | Platzer, Jr. |
| 5,115,352 A | 5/1992 | do Espirito Santo |
| 5,118,540 A | 6/1992 | Hutchison |
| 5,166,833 A | 11/1992 | Shyu |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,295,021 A | 3/1994 | Swanson |
| 5,296,973 A | 3/1994 | Burke |
| 5,371,659 A | 12/1994 | Pastrick et al. |
| 5,412,512 A | 5/1995 | Zebold et al. |
| 5,424,875 A | 6/1995 | Davis, II |
| 5,432,643 A | 7/1995 | Huang |
| 5,497,305 A | 3/1996 | Pastrick et al. |
| 5,497,306 A | 3/1996 | Pastrick |
| 5,517,367 A | 5/1996 | Kim et al. |
| 5,526,195 A | 6/1996 | Thomas |
| 5,530,588 A | 6/1996 | Vivier |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,579,133 A | 11/1996 | Black et al. |
| 5,594,593 A | 1/1997 | Milner |
| 5,621,569 A | 4/1997 | Schlenke |
| 5,621,577 A | 4/1997 | Lang et al. |
| 5,644,442 A | 7/1997 | Lemere |
| 5,668,663 A | 9/1997 | Varaprasad et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,691,855 A | 11/1997 | Lupkas |
| 5,715,093 A | 2/1998 | Schierbeek et al. |
| 5,724,187 A | 3/1998 | Varaprasad et al. |
| 5,751,489 A | 5/1998 | Caskey et al. |
| 5,760,962 A | 6/1998 | Schofield et al. |
| 5,784,211 A | 7/1998 | Mingledorff |
| 5,786,772 A | 7/1998 | Schofield et al. |
| 5,790,327 A | 8/1998 | Lee et al. |
| 5,793,542 A | 8/1998 | Kondo et al. |
| 5,796,094 A | 8/1998 | Schofield et al. |
| 5,805,367 A | 9/1998 | Kanazawa |
| 5,823,654 A | 10/1998 | Pastrick et al. |
| 5,835,294 A | 11/1998 | Minegishi |
| 5,847,889 A | 12/1998 | Komiyama et al. |
| 5,863,116 A | 1/1999 | Pastrick et al. |
| 5,864,434 A | 1/1999 | Taylor |
| 5,910,854 A | 6/1999 | Varaprasad et al. |
| 5,929,786 A | 7/1999 | Schofield et al. |
| 5,980,050 A | 11/1999 | McCord |
| 6,007,207 A | 12/1999 | Liu |
| 6,030,084 A | 2/2000 | Schmidt |
| 6,032,323 A | 3/2000 | Smith et al. |
| 6,033,078 A | 3/2000 | Su et al. |
| 6,097,023 A | 8/2000 | Schofield et al. |
| 6,109,586 A | 8/2000 | Hock |
| 6,116,743 A | 9/2000 | Hoek |
| 6,154,306 A | 11/2000 | Varprasad et al. |
| 6,176,602 B1 | 1/2001 | Pastrick et al. |
| 6,198,409 B1 | 3/2001 | Schofield et al. |
| 6,199,993 B1 | 3/2001 | Mou |
| 6,201,642 B1 | 3/2001 | Bos |
| 6,227,689 B1 | 5/2001 | Miller |
| 6,250,148 B1 | 6/2001 | Lynam |
| 6,276,821 B1 | 8/2001 | Pastrick et al. |
| 6,315,419 B1 | 11/2001 | Platzer, Jr. |
| 6,341,523 B2 | 1/2002 | Lynam |
| 6,343,402 B1 | 2/2002 | Smith et al. |
| 6,396,397 B1 | 5/2002 | Bos et al. |
| 6,398,377 B1 | 6/2002 | Chou |
| 6,420,036 B1 | 7/2002 | Varaprasad et al. |
| 6,498,620 B2 | 12/2002 | Schofield et al. |
| 6,511,192 B1 | 1/2003 | Henion et al. |
| 6,522,451 B1 | 2/2003 | Lynam |
| 6,537,138 B2 | 3/2003 | Ohmori et al. |
| 6,582,109 B2 | 6/2003 | Miller |
| 6,690,268 B2 | 2/2004 | Schofield et al. |
| 6,717,610 B1 | 4/2004 | Bos et al. |
| 6,717,712 B2 | 4/2004 | Lynam et al. |
| 6,757,109 B2 | 6/2004 | Bos |
| 6,882,287 B2 | 4/2005 | Schofield |
| 6,919,796 B2 | 7/2005 | Boddy et al. |
| 6,932,483 B2 | 8/2005 | Strumolo et al. |
| 6,979,090 B2 | 12/2005 | Wnuk |
| 7,005,974 B2 | 2/2006 | McMahon et al. |
| 7,038,577 B2 | 5/2006 | Pawlicki et al. |
| 7,097,312 B2 | 8/2006 | Platzer, Jr. |
| 7,126,456 B2 | 10/2006 | Boddy et al. |
| 7,167,294 B2 | 1/2007 | Lynam et al. |
| 7,168,830 B2 | 1/2007 | Pastrick et al. |
| 7,184,190 B2 | 2/2007 | McCabe et al. |

(56) References Cited

U.S. PATENT DOCUMENTS

| | | |
|---|---|---|
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,338,177 B2 | 3/2008 | Lynam |
| 7,339,149 B1 | 3/2008 | Schofield et al. |
| 7,370,983 B2 | 5/2008 | DeWind et al. |
| 7,377,675 B2 | 5/2008 | Pastrick et al. |
| 7,400,435 B2 | 7/2008 | Byers et al. |
| 7,420,756 B2 | 9/2008 | Lynam |
| 7,589,883 B2 * | 9/2009 | Varaprasad ............ B32B 17/06 359/267 |
| 7,944,371 B2 | 5/2011 | Foote et al. |
| 8,786,704 B2 | 7/2014 | Foote et al. |
| 2002/0105741 A1 | 8/2002 | Platzer, Jr. |
| 2002/0159169 A1 | 10/2002 | McCord |
| 2002/0159270 A1 * | 10/2002 | Lynam ................... B60K 35/00 362/492 |
| 2003/0117731 A1 | 6/2003 | Platzer, Jr. |
| 2004/0120056 A1 * | 6/2004 | Goolsby ................ B60R 1/082 359/866 |
| 2004/0165291 A1 | 8/2004 | Platzer, Jr. |
| 2005/0232469 A1 | 10/2005 | Schofield et al. |
| 2005/0248859 A1 | 11/2005 | Platzer, Jr. |
| 2006/0061008 A1 | 3/2006 | Karner et al. |
| 2006/0125919 A1 | 6/2006 | Camilleri et al. |
| 2006/0184297 A1 | 8/2006 | Higgins-Luthman |
| 2006/0268440 A1 | 11/2006 | Platzer, Jr. |
| 2007/0058257 A1 | 3/2007 | Lynam |
| 2008/0212189 A1 | 9/2008 | Baur et al. |
| 2008/0225421 A1 | 9/2008 | Platzer |
| 2008/0304170 A1 | 12/2008 | Zhao |

FOREIGN PATENT DOCUMENTS

| | | |
|---|---|---|
| DE | 2647592 | 4/1978 |
| DE | 5915521 | 10/1980 |
| DE | 3329998 | 3/1985 |
| DE | 3620228 | 12/1987 |
| DE | 4026578 | 4/1992 |
| EP | 0210757 | 2/1987 |
| EP | 0310261 | 4/1989 |
| EP | 0551802 | 1/1992 |
| EP | 0728618 | 8/1996 |
| EP | 0729864 | 9/1996 |
| EP | 0791503 | 8/1997 |
| EP | 0917987 | 5/1999 |
| FR | 2628042 | 3/1988 |
| GB | 2048189 | 12/1980 |
| GB | 2092534 | 8/1982 |
| JP | 55076721 | 10/1980 |
| JP | 1186443 | 7/1989 |
| KR | 2002092059 | 12/2002 |
| WO | WO0181956 | 11/2001 |
| WO | WO2004026633 | 4/2004 |
| WO | WO2004047421 | 6/2004 |
| WO | WO2004103772 | 12/2004 |
| WO | WO2006124682 | 11/2006 |
| WO | WO2007005942 | 1/2007 |
| WO | WO2008051910 | 5/2008 |

* cited by examiner

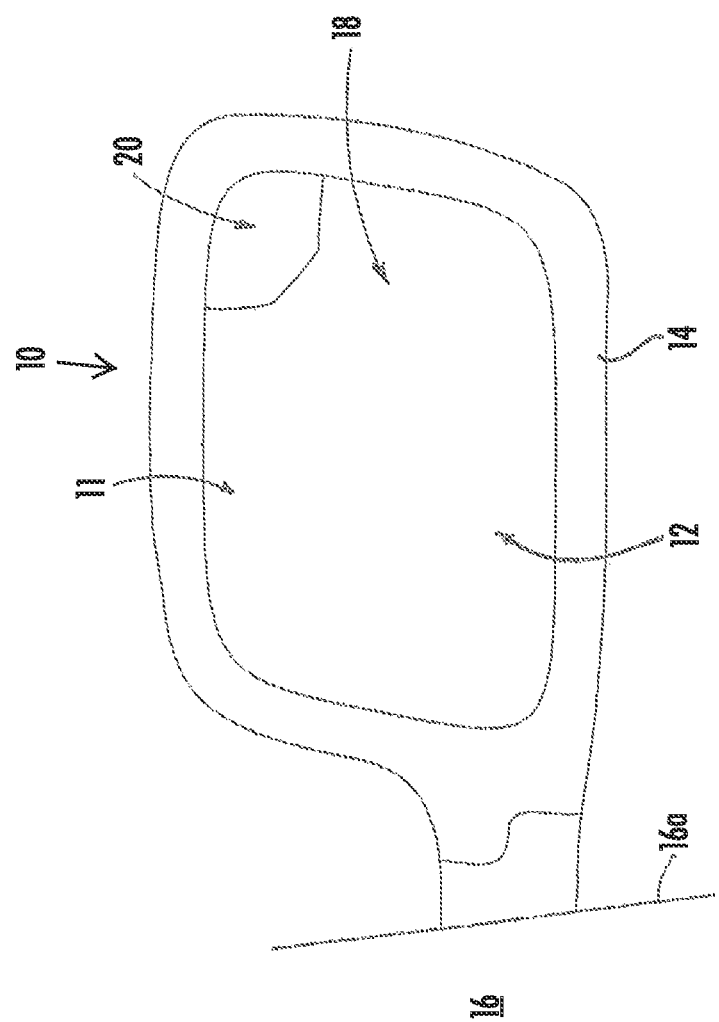

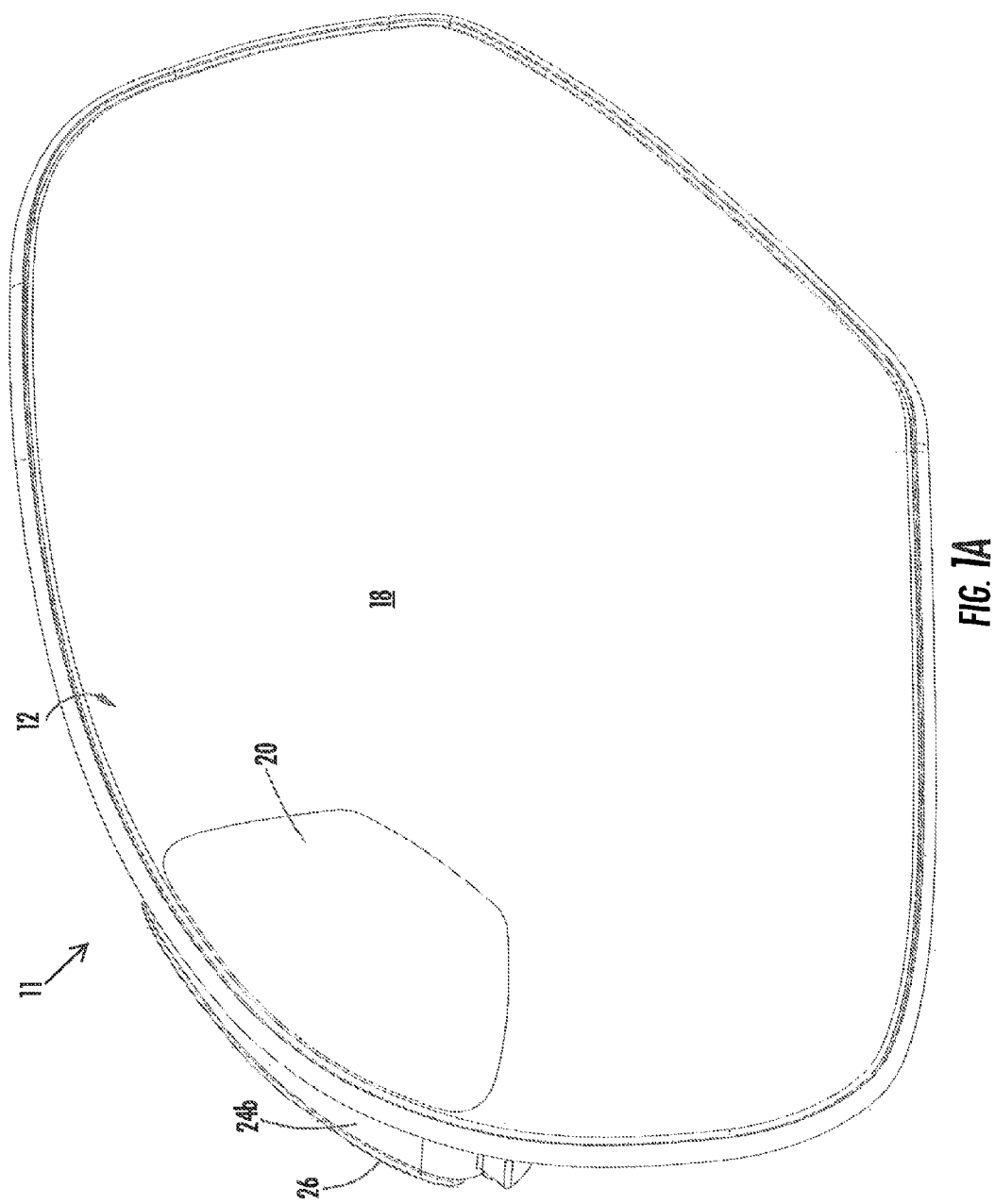

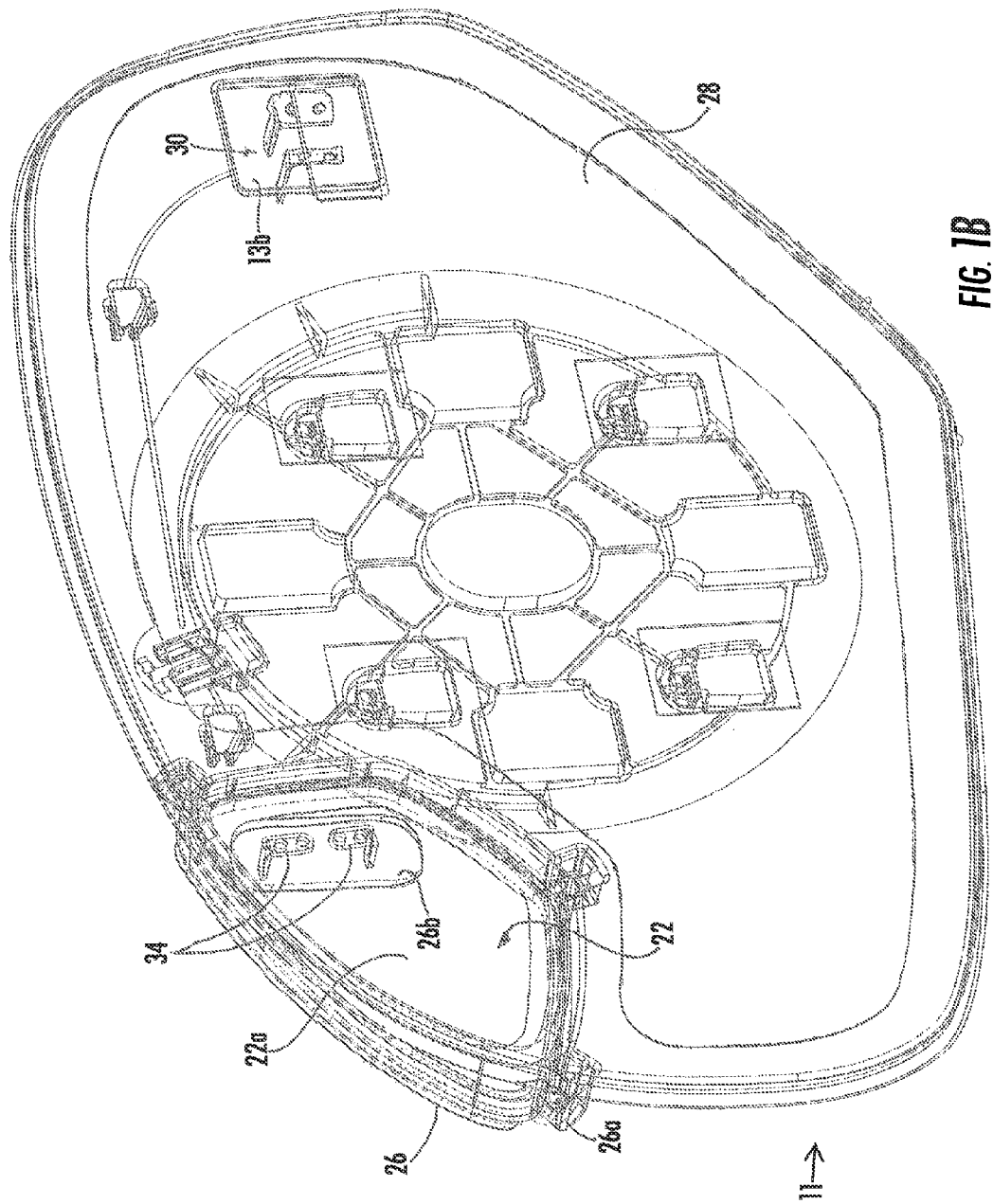

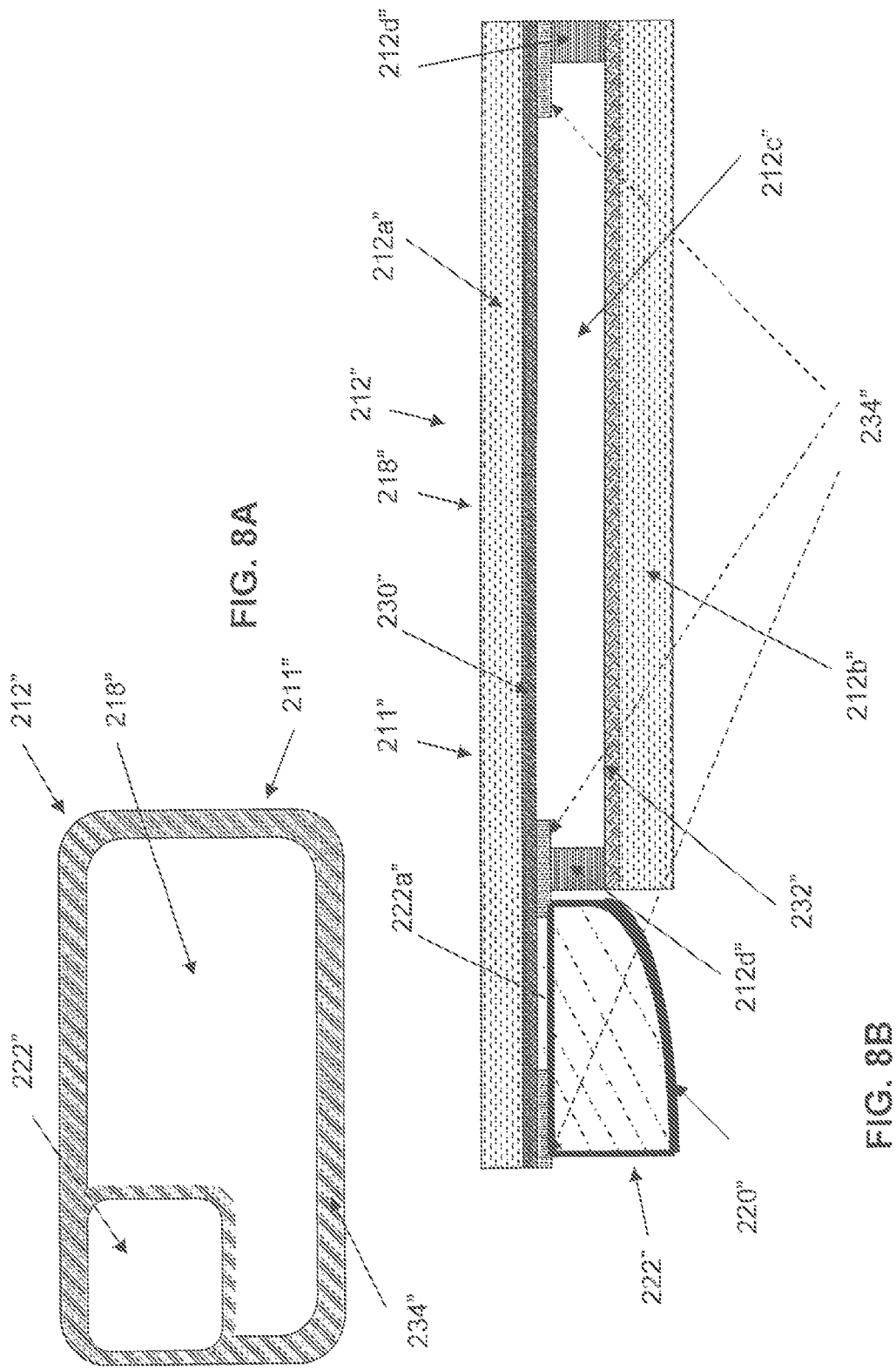

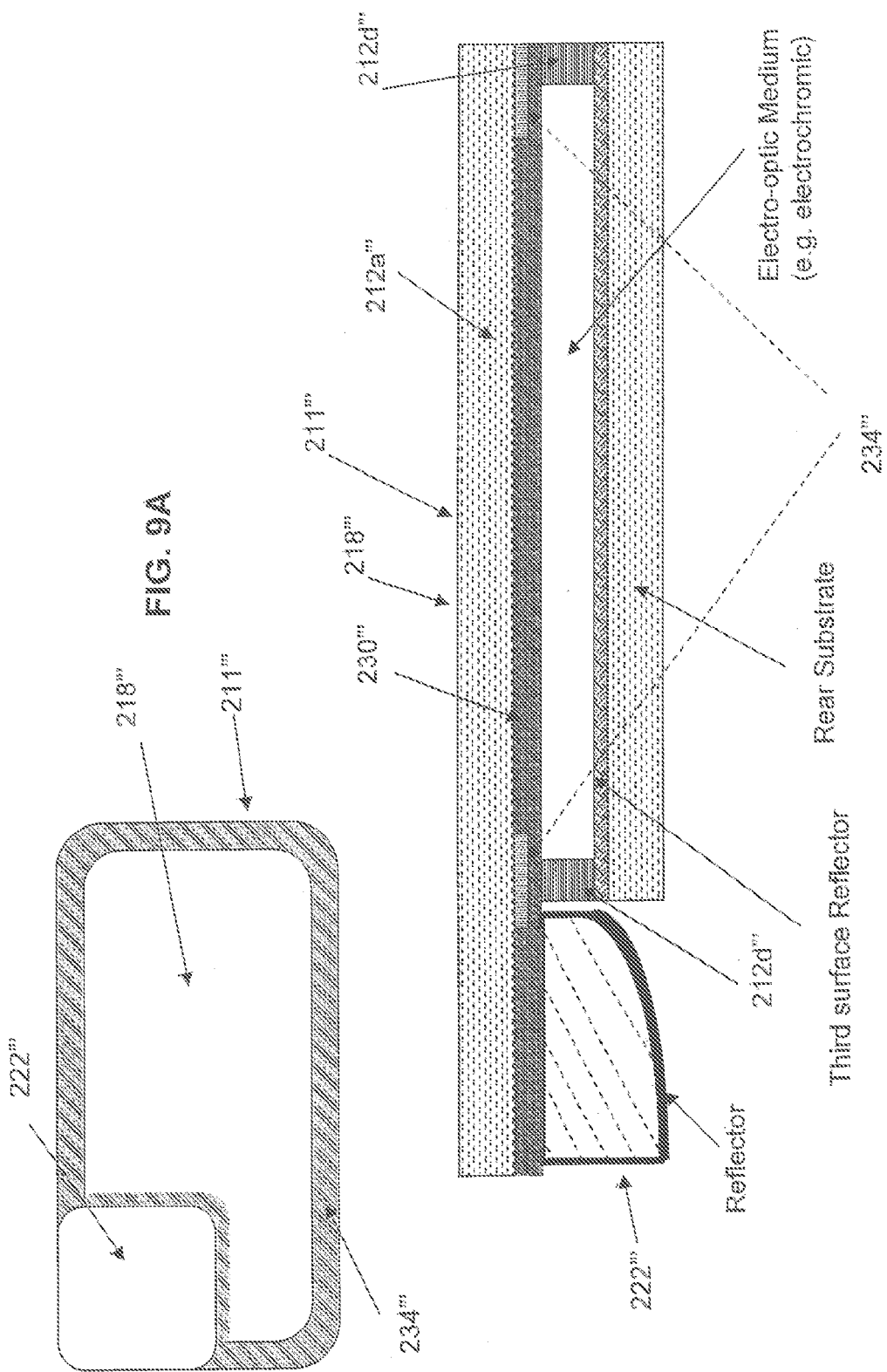

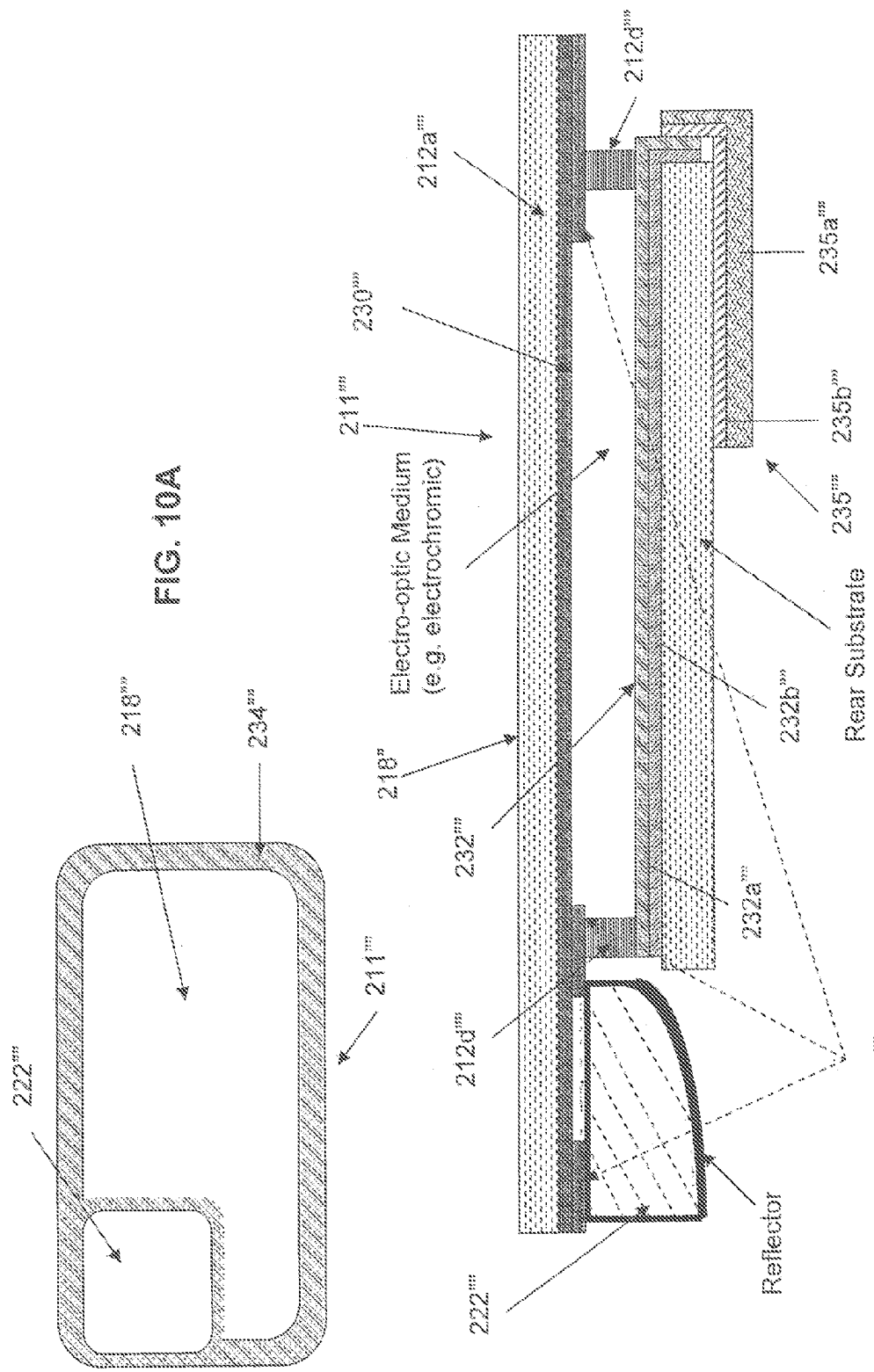

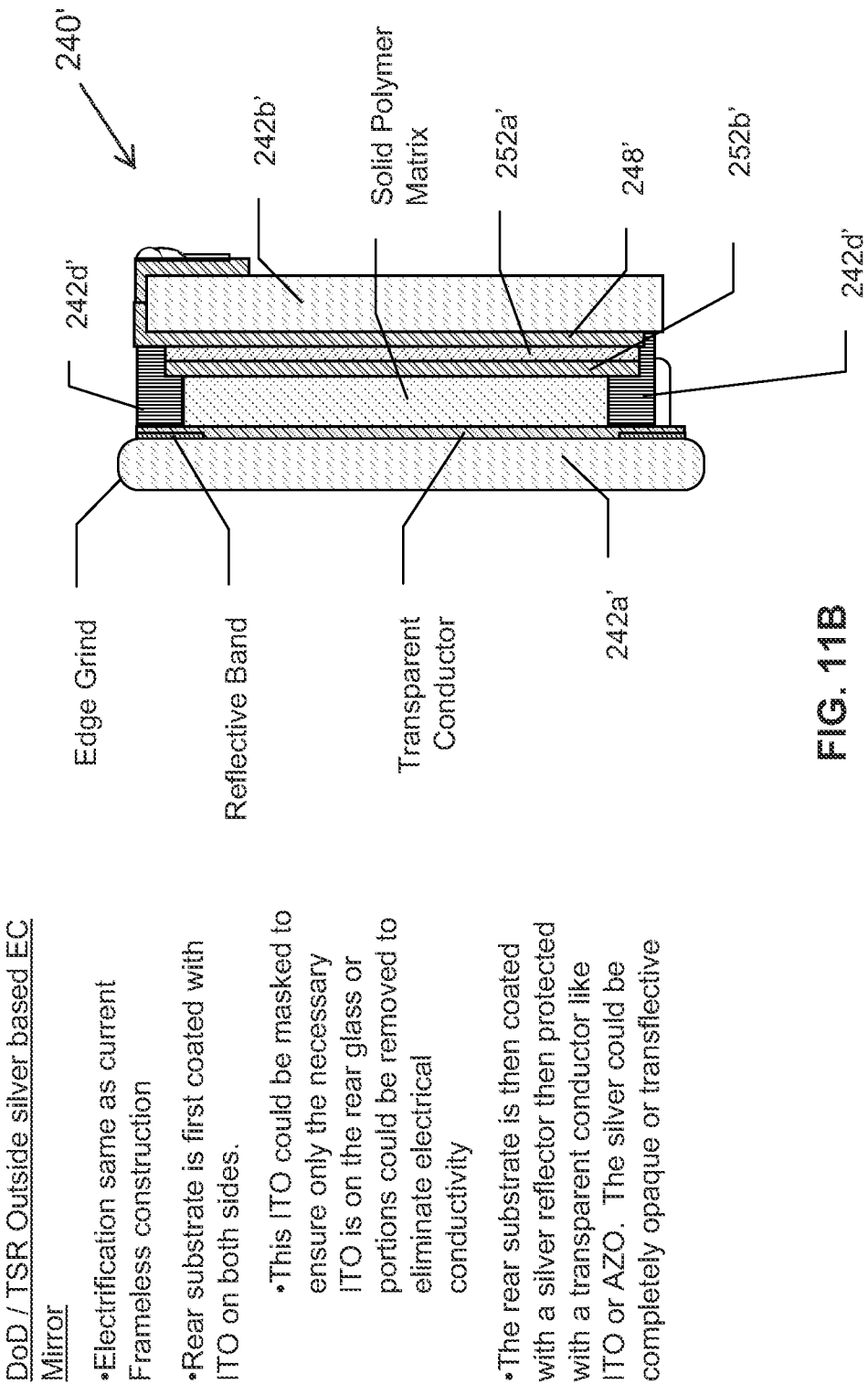

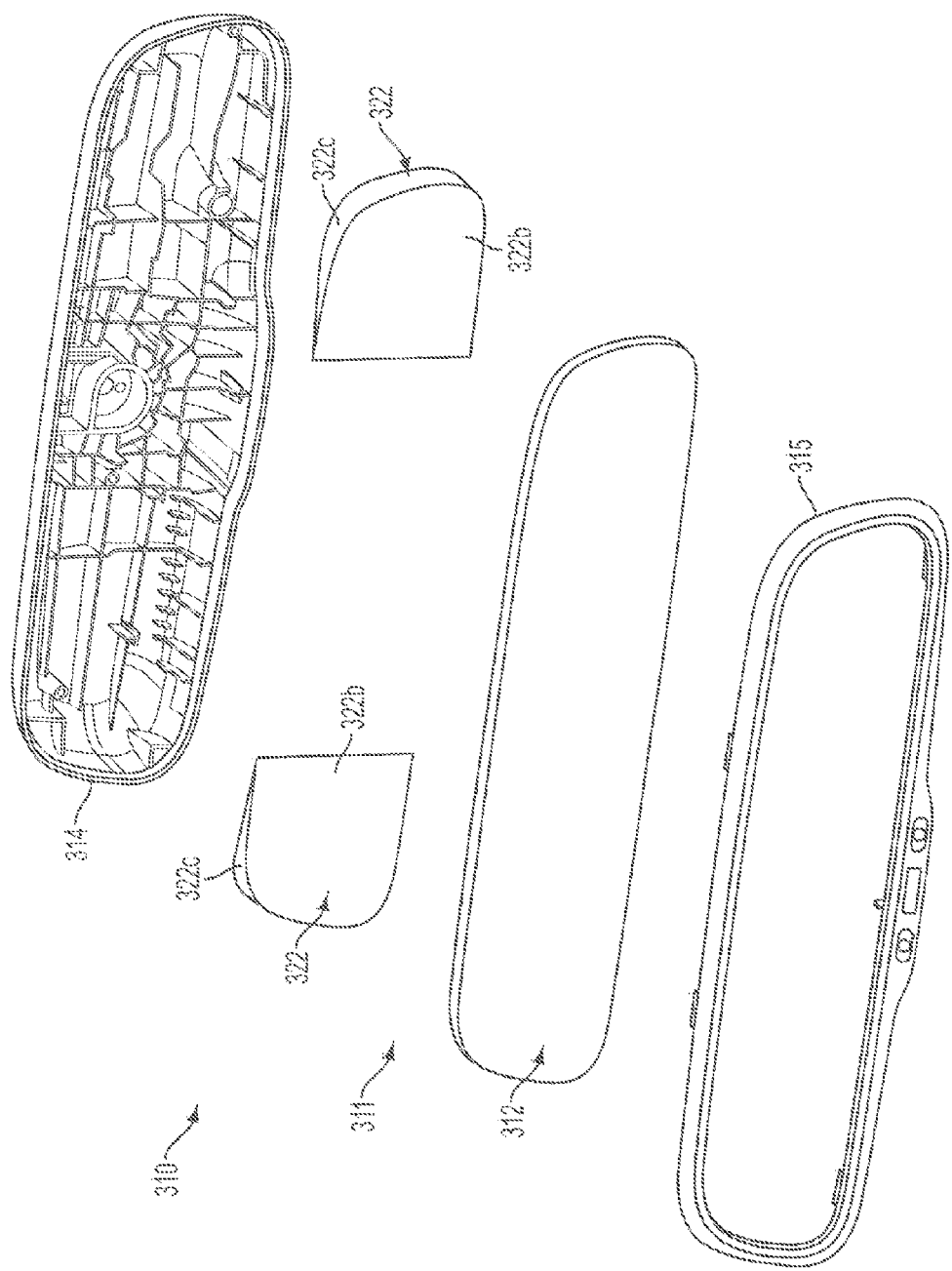

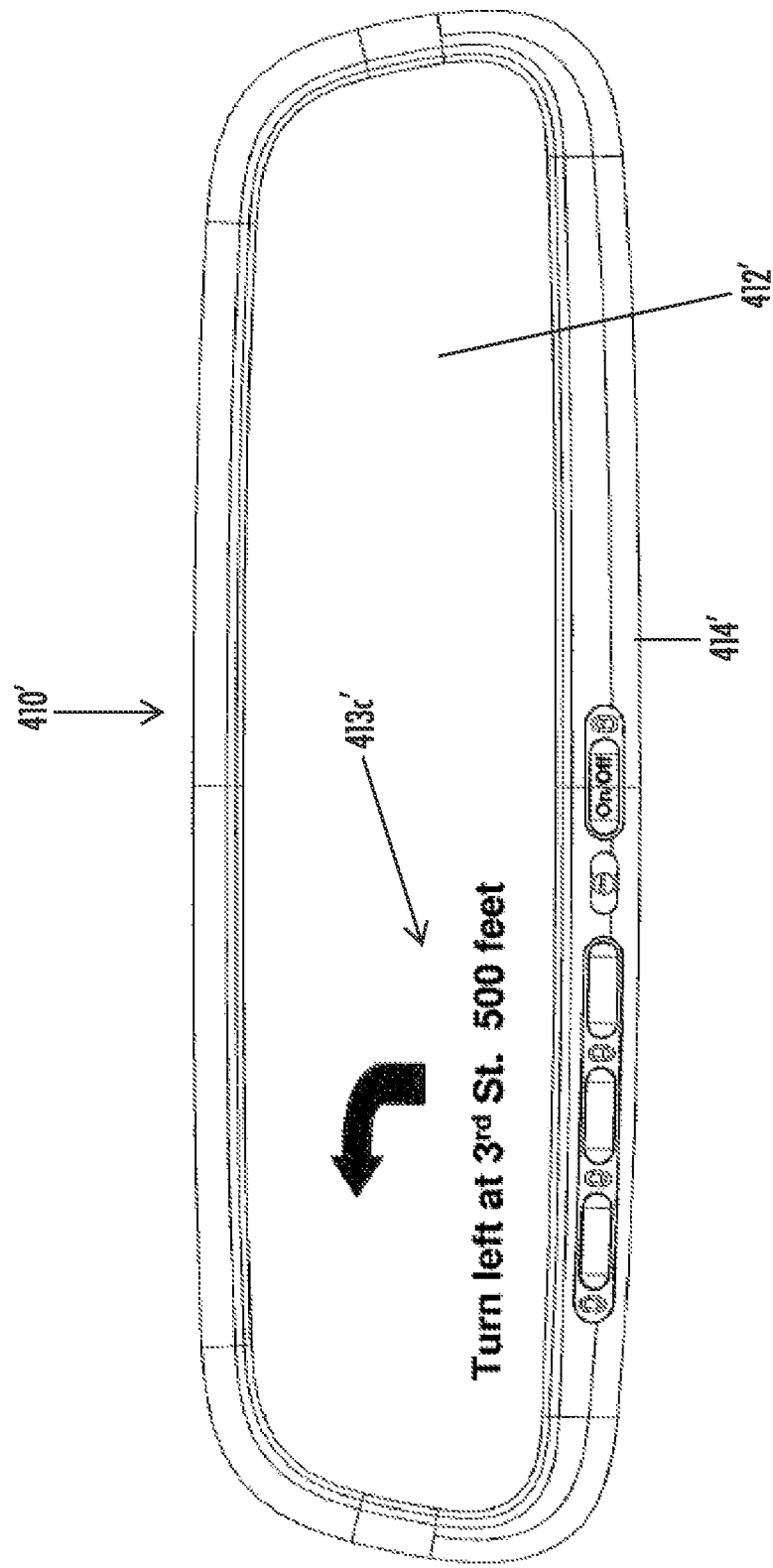

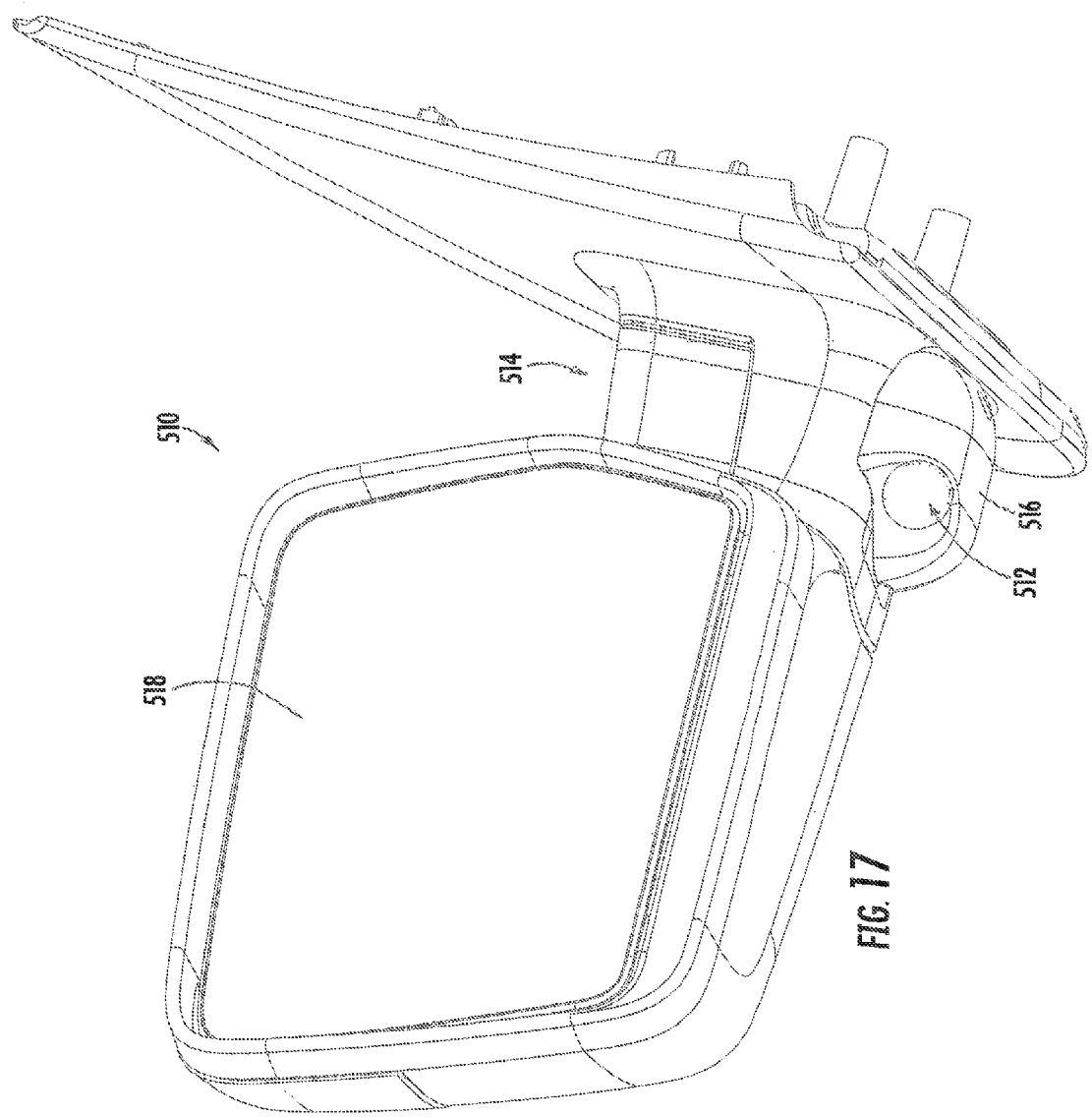

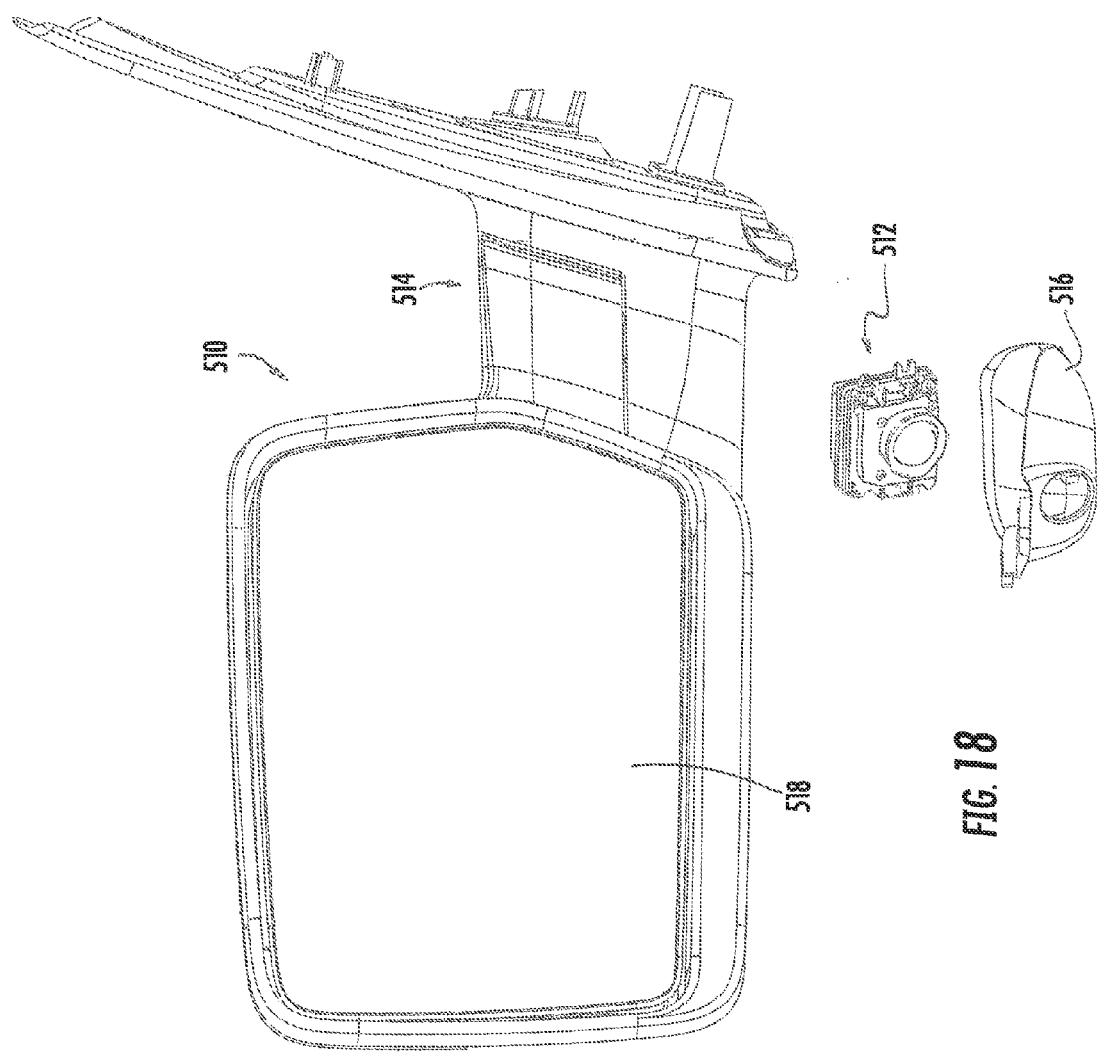

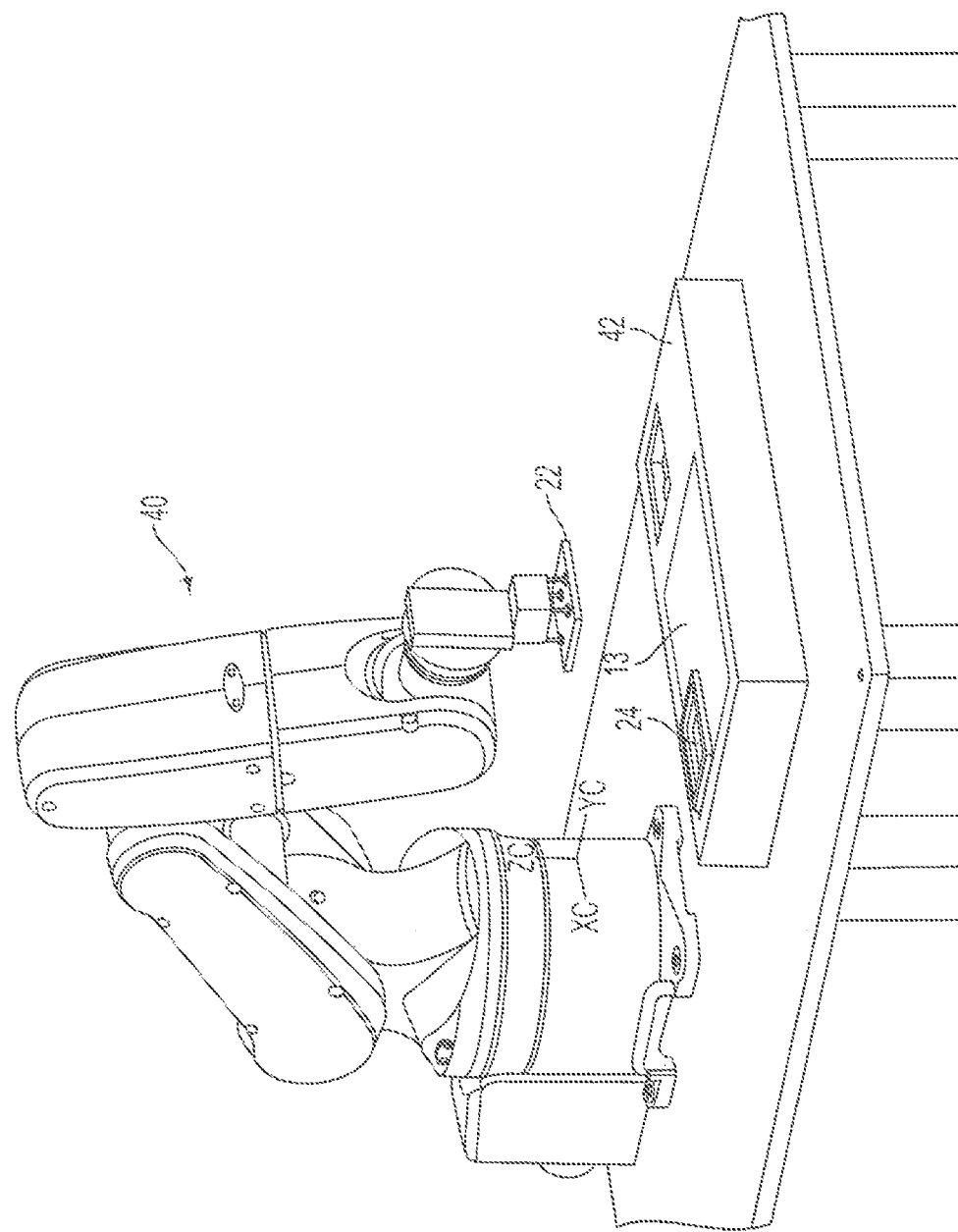

VEHICLE MIRROR ASSEMBLY WITH WIDE ANGLE ELEMENT

CROSS REFERENCE TO RELATED APPLICATIONS

The present application is a continuation of U.S. patent application Ser. No. 12/187,725, filed Aug. 7, 2008, now U.S. Pat. No. 8,786,704, which claims the benefit of U.S. provisional applications, Ser. No. 60/954,953, filed Aug. 9, 2007; Ser. No. 61/022,450, filed Jan. 21, 2008; Ser. No. 61/031,869, filed Feb. 27, 2008; Ser. No. 61/050,853, filed May 6, 2008; and Ser. No. 61/073,406, filed Jun. 18, 2008, which are hereby incorporated herein by reference in their entireties.

FIELD OF THE INVENTION

The present invention relates to exterior rearview mirror assemblies and, more particularly, to an exterior rearview mirror assembly having an auxiliary wide angle reflector portion or optic for providing the driver with a wider angle rearward field of view as compared to a substantially planar portion of the rearview mirror.

BACKGROUND OF THE INVENTION

It is known to provide a wide angle rearward field of view to a driver of a vehicle via a wide angle reflective element at one or both of the exterior rearview mirror assemblies. Such a wide angle rearward field of view may be provided via a curved mirror reflector, or an auxiliary wide angle reflective element may be provided at a portion of a generally planar mirror reflector, such as via a stick on curved auxiliary reflector element attached to the generally planar mirror reflector. Such add-on curved auxiliary reflectors may be provided at the front surface or first surface (the surface of the mirror reflector that is generally facing rearward and at least partially toward the driver of the vehicle) and provide a reduced image size (as compared to the size of the generally planar reflector) wide angle rearward field of view that is readily viewable by the driver of the vehicle. Other auxiliary wide angle reflectors have been proposed, such as those described in U.S. Pat. Nos. 7,255,451; 7,195,381; 6,717,712; 7,126,456; 6,315,419; 7,097,312; 6,522,451; 6,315,419; 5,080,492; 5,050,977 and/or 5,033,835, which are hereby incorporated herein by reference in their entireties.

SUMMARY OF THE INVENTION

The present invention provides an exterior rearview mirror reflector or reflective element preferably having a generally planar principal reflector portion and an auxiliary wide angle reflector portion established at a portion or region of the mirror reflective element assembly and at or near the mirror substrate, such as at an outer and upper corner region of the reflective element outboard of the side of the vehicle when the mirror assembly is mounted to the vehicle (or elsewhere at the mirror reflective element, such as at a lower outboard corner region of the reflective element or an upper or lower inboard corner region of the reflective element or any other region of the reflective element as desired and depending on the particular application of the mirror reflective element assembly).

According to an aspect of the present invention, an exterior rearview mirror assembly for a vehicle includes a reflective element having a glass mirror substrate having a front surface and a rear surface, a back plate attached to and generally supporting (preferably adjustable via a mirror actuator as is commonly known in the mirror arts) the reflective element and a wide angle reflector element. The reflective element comprises a first reflector portion and a second reflector portion, with the first reflector portion having a first reflective coating disposed thereat. The back plate has a receiving portion generally at the second reflector portion when the back plate is attached to the reflective element. The wide angle reflector element comprises a glass element and has a curved rear surface with a second reflective coating disposed at the curved rear surface. The wide angle reflector element is received in the receiving portion and disposed at the rear surface of the reflective element and at the second reflector portion. An optical element or adhesive is disposed between a front surface of the wide angle reflector element and the rear surface of the reflective element.

An aspect of the present invention includes selecting the substrate material or materials of the reflective element and the auxiliary wide angle reflector element so that they have substantially similar or matching linear coefficients of thermal expansion to enhance the bonding of the wide angle reflector element to the principal mirror reflective element.

A cover plate may be attached to the receiving portion and thus may substantially encase the wide angle reflector element within the receiving portion. Optionally, a darkened band may be disposed or established along a perimeter region of the front surface of the wide angle reflector element (or at the rear surface of the glass mirror element or substrate or at an element or film disposed between the wide angle reflector element and the glass mirror element) to demarcate or outline the wide angle reflector element at the reflective element.

These and other objects, advantages, purposes and features of the present invention will become apparent upon review of the following specification in conjunction with the drawings.

BRIEF DESCRIPTION OF THE DRAWINGS

FIG. 1 is a front elevation of an exterior mirror assembly with an auxiliary wide angle reflector element in accordance with the present invention, shown as viewed in the direction of travel of the vehicle;

FIG. 1A is a front perspective view of an exterior mirror reflective element assembly in accordance with the present invention;

FIG. 1B is a front perspective view of the exterior mirror reflective element assembly of FIG. 2, with the reflective element removed to show additional details;

FIG. 8A is a plan view of another exterior mirror reflective element assembly of the present invention;

FIG. 8B is a sectional view of the mirror reflective element assembly of FIG. 8A;

FIG. 9A is a plan view of another exterior mirror reflective element assembly of the present invention;

FIG. 9B is a sectional view of the mirror reflective element assembly of FIG. 9A;

FIG. 10A is a plan view of another exterior mirror reflective element assembly of the present invention;

FIG. 10B is a sectional view of the mirror reflective element assembly of FIG. 10A;

FIG. 11B is a sectional view of another exterior mirror reflective element assembly of the present invention;

FIG. 13A is an exploded perspective view of the interior rearview mirror assembly and blind spot reflector elements of FIG. 13;

FIGS. 16A-C are plan views of exterior rearview mirror assemblies with electro-luminescent display devices incorporated therein in accordance with the present invention;

FIG. 17 is a perspective view of an exterior rearview mirror assembly and imaging sensor in accordance with the present invention;

FIG. 18 is an exploded perspective view of the exterior rearview mirror assembly and imaging sensor of FIG. 17;

FIGS. 20A-E are views of an assembly system that adheres a wide angle reflector element at the rear surface of a mirror substrate in accordance with the present invention.

DESCRIPTION OF THE PREFERRED EMBODIMENTS

Figure 1C:
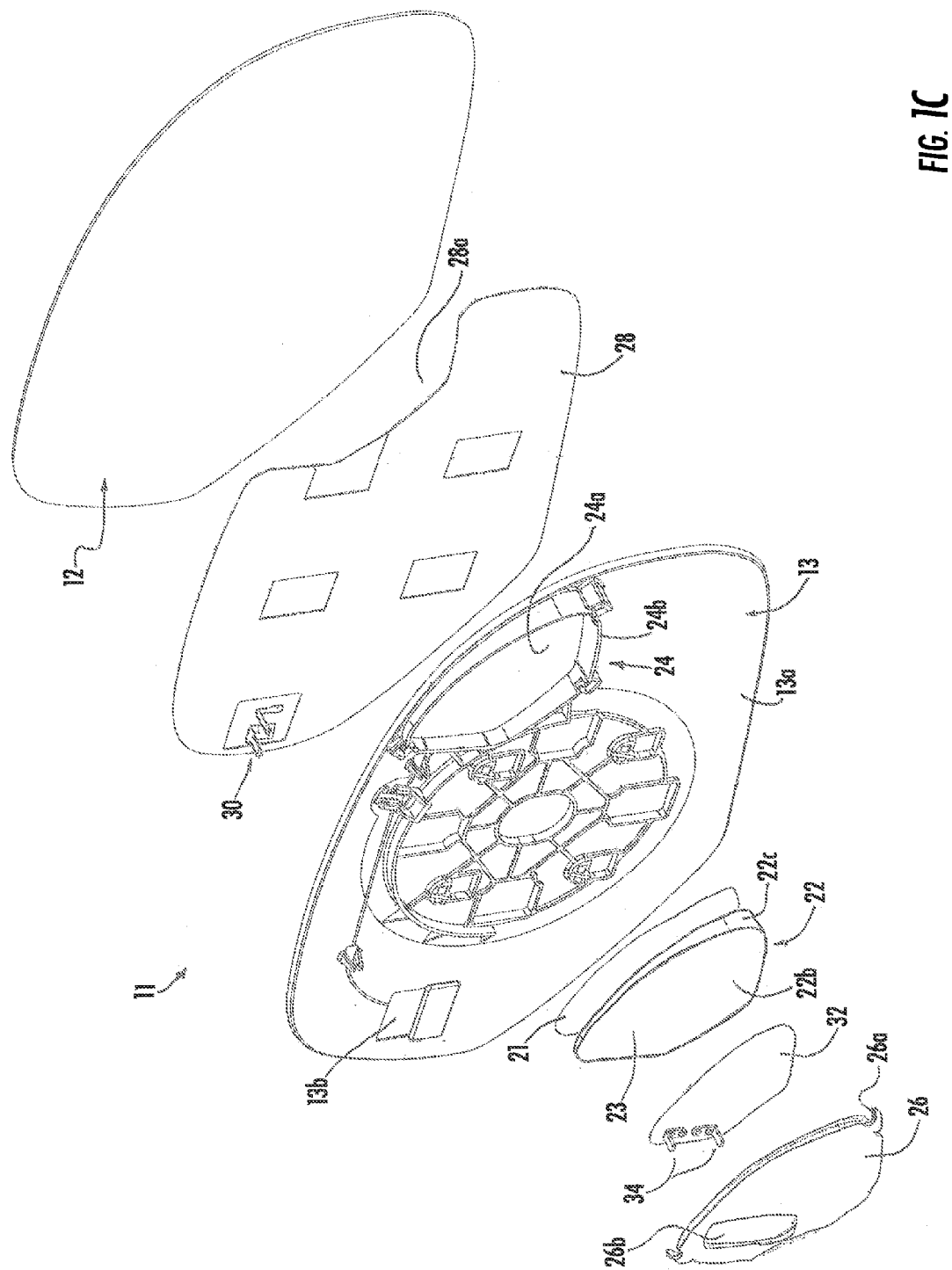
FIG. 1C is an exploded perspective view of the exterior mirror reflective element assembly of FIG. 2.
Figure 1D:
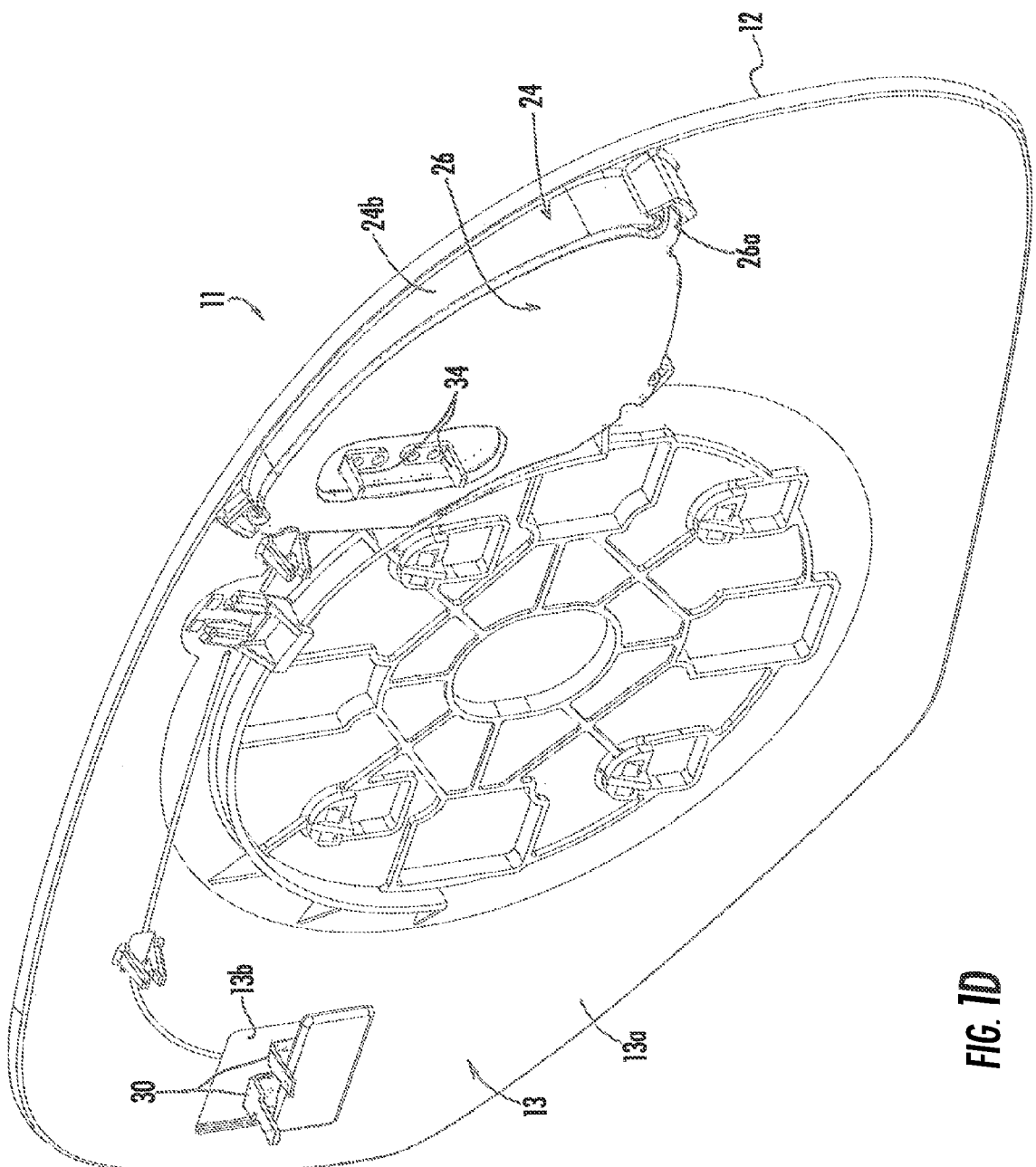
FIG. 1D is a rear perspective view of the exterior mirror reflective element assembly of FIG. 2.

Referring now to the drawings and the illustrative embodiments depicted therein, an exterior rearview mirror assembly 10 for a vehicle includes a mirror reflective element assembly 11 having a mirror reflector or reflective element 12 attached to a back plate or mounting plate 13 and received in and/or supported by a mirror shell or casing 14 (FIGS. 1-1 D). Mirror assembly 10 is mounted at the side 16a of a host or subject vehicle 16. Mirror reflective element 12 provides a first or principal or main viewing mirror reflective element portion 18 and a second or auxiliary or wide angle reflective element portion 20. Reflective element assembly 11 includes an auxiliary wide angle reflective element or reflective optic or lens 22 established behind and at or near the wide angle portion 20 of the mirror reflective element 12 to provide a wide angle "spotter" mirror at the reflective element, as discussed below. The reflective element assembly may utilize aspects of the mirror assemblies described in U.S. Pat. Nos. 7,255,451; 7,195,381; 7,126,456; 7,097,312; 6,717,712; 6,522,451; 6,315,419; 5,080,492; 5,050,977 and/or 5,033,835, and/or U.S. patent applications, Ser. No. 11/502,214, filed Aug. 10, 2006, now U.S. Pat. No. 7,448,764; Ser. No. 11/116,523, filed Apr. 28, 2005 and published Nov. 10, 2005 as U.S. Pat. Publication No. US2005/0248859; Ser. No. 10/784,668, filed Feb. 23, 2004, now U.S. Pat. No. 7,097,312; Ser. No. 10/280,042, filed Oct. 24, 2002 and published Jun. 26, 2003 as U.S. Pat. Publication No. US2003/0117731; and/or Ser. No. 09/733,410, filed Dec. 11, 2000 and published Aug. 8, 2002 as U.S. Pat. Publication No. US2002/0105741; and/or PCT International Publication No. WO 01/81956 A1, published Nov. 1, 2001, which are hereby incorporated herein by reference in their entireties.

Mirror reflector or reflective element 12 may comprise a generally planar glass mirror substrate or substrates and may comprise a variably reflective, electro-optic reflective element (having a front and rear substrate with an electro-optic medium sandwiched therebetween) or a single substrate reflective element, while remaining within the spirit and scope of the present invention. The reflective element 12 has a reflector coating for reflecting light incident thereon to provide a rearward field of view to the driver of the vehicle. The reflector coating is disposed at an appropriate surface of the reflective element and at the principal reflecting portion 18 of the reflective element, while a window or non-reflective portion is established at the auxiliary portion 20 (such as via masking of the auxiliary portion 20 during the coating process of the reflective element glass substrate) of the reflective element 12. For example, a window may be masked or formed through the mirror reflector coating or layer (such that a window area of the reflective element is substantially devoid of the mirror reflector coating, while the mirror reflector or coating is present at the other regions of the principal reflecting area of the reflective element). The window may be formed via any suitable means, such as via masking of the window area during sputter deposition of the mirror reflector or the like, such as via utilizing aspects of the coating processes described in U.S. Pat. Nos. 7,274,501; 7,255,451 and/or 7,184,190, and/or PCT Application No. PCT/US2006/018567, filed May 15, 2006 and published Nov. 23, 2006 as International Publication No. WO 2006/124682, which are all hereby incorporated herein by reference in their entireties.

Optionally, an anti-reflective (AR) coating may be disposed on the front surface of the reflective element (the surface facing generally rearward with respect to the direction of travel of the vehicle when the mirror assembly is mounted to the vehicle) to reduce glare at the viewed surface of the mirror reflective element (such as by utilizing aspects described in U.S. Pat. No. 5,076,674, and/or PCT Application No. PCT/US06/042718, filed Oct. 31, 2006, and published May 10, 2007 as International Publication No. WO 07/053,710, which is hereby incorporated herein by reference in its entirety). Optionally, a hydrophilic and/or hydrophobic coating may be disposed on the front surface of the reflective element to limit water or moisture accumulation at the reflective element and wide angle portion thereof. Optionally, the reflective element may include an anti-static means, such as a conductive coating, particularly a substantially transparent conductive coating, such as ITO, tin oxide and/or the like; index matching means to reduce internal and interfacial reflections, such as thin films of an appropriately selected optical path length; and/or light absorbing glass, such as glass tinted to a neutral density, such as "GRAY-LITE" gray tinted glass (commercially available from Pittsburgh Plate Glass Industries) and "SUNGLAS" gray tinted glass (commercially available from Ford Glass Co., Detroit, Mich.), which assists in augmenting contrast enhancement. Optionally, polymer interlayers, which may be tinted gray (such as those used in electrochromic devices as taught by and described in U.S. Pat. No. 4,712,879, which is hereby incorporated herein by reference in its entirety), may be incorporated into the electro-optic or electrochromic mirrors described herein.

Auxiliary wide angle element 22 is disposed at the rear of the reflective element and at or behind the window formed in the reflective coating of the reflective element 12 (and at the auxiliary portion 20 of the reflective element 12). Auxiliary wide angle element 22 comprises a glass element having a front surface 22a, a curved rear surface 22b and a perimeter edge 22c, with a reflective coating or layer or element 23, disposed or established at the curved rear surface 22b. The reflective coating or layer may comprise any suitable reflector layer, such as a metallic coating or layer, such as chromium or silver or aluminum or alloys thereof, or an ITO/Ag/ITO stack of layers or coatings or a silicon metal reflector coating, or the like. The glass wide angle element may be formed via casting or grinding the glass material, or via other suitable forming means, such as bending a flat glass substrate, as is commonly known in the art, to form the curved or bent element. The wide angle element may have a spherical reflective property, an aspherical reflective property, or a compound curved reflective property depending on the particular application. Optionally, if the reflective coating or layer at the auxiliary reflector element or optic or lens is environmentally fragile or non-robust, a sealing or protective layer (not shown), such as a lacquer or paint or ink or the like, may be established over the reflector coating to substantially seal the reflector coating and/or to protect the reflector coating.

Auxiliary wide angle element 22 may comprise a glass lens or element that is adhered to the rear surface of the reflective element with an optical element 21, such as an optical adhesive (such as, for example, a Dymax UV curable adhesive or the like, such as are available from Dymax Corporation of Torrington, Conn.). Such a glass element or lens limits or substantially precludes bonding issues that may arise when a plastic or polymeric or polycarbonate lens is bonded to the glass substrate of the reflective element due to the differences in the thermal expansion coefficients of the two materials. Because an exterior rearview mirror assembly is subjected to extreme temperature variation and thermal shock and thermal cycling, it is desirable to select materials that have similar or substantially matching thermal coefficients of expansion, so that the materials can be bonded together (via a suitable optical adhesive that preferably has a similar thermal coefficient of expansion) and can withstand the extreme temperature and environmental variations encountered by an exterior rearview mirror assembly of a vehicle.

For example, the principal mirror reflective element substrate may be formed of glass, and is preferably a soda-lime glass substrate, such as is commercially available from a float line or the like. The linear coefficient of thermal expansion of float line glass at 25° C. is typically less than about $20 \times 10$-61° C., and may be less than about $15 \times 10$-6/° C., and may be less than about $10 \times 10$-6/° C., such as about $8.6 \times 10$-6/° C. or about $9 \times 10$-6/° C. or thereabouts (that is typical for commercial soda-lime float glass). Through experimentation, it has been found that it is beneficial to match or substantially match the linear coefficients of thermal expansion of the principal mirror reflective element substrate to that of the substrate of the wide angle reflective element or optic. Thus, the principal mirror reflective element substrate and the wide angle element substrate may both be made of glass, and as much as practicable, may both be made of glass materials that have matching, and preferably substantially matching, coefficients of thermal expansion. Thus, in general, where a glass substrate is implemented for the principal mirror reflective element substrate, it is preferable that the linear coefficient of thermal expansion at 25° C. of the substrate used or the wide angle element be less than about 20×10-6/° C., more preferably less than about 15×10-6/° C., and more preferably less than about 10×10-6/° C. Moreover, it is envisioned that glass materials other than soda-lime glass may be utilized for the reflective element substrate and/or wide angle element substrate, such as, for example, vitreous silica glass (having a linear coefficient of thermal expansion of about 0.5×10-61/° C.), or silica glass (such as 96 percent silica glass having a linear coefficient of thermal expansion of about 0.75×10-6/° C.), or borosilicate glass (such as Corning PYREX® 7740 Borosilicate glass having a linear coefficient of thermal expansion of about 3.25×10-6/° C.) or other glass material.

In contrast to the use of a glass wide angle element in combination with a glass mirror substrate in accordance with the present invention, it has been found that use of a polymeric or plastic wide angle element in combination with a glass mirror substrate may lead to failures of the bond or attachment between the plastic wide angle element and the glass mirror substrate. In contrast to the glass materials, polycarbonate material may have a linear coefficient of thermal expansion at 25° C. in a range of about 32×10-6/° C. to about 120×10-6/° C. (depending on the grade of the material), while acrylic material may have a linear coefficient of thermal expansion at 25° C. in a range of about 60×10-6/° C. to about 130×10-6/° C., and transparent grade polystyrene may have a linear coefficient of thermal expansion at 25° C. in a range of about 66×10-6/° C. to about 69×10-6/° C. The use of such polycarbonate or acrylic or polystyrene materials for the wide angle element thus may lead to difficulties in bonding the wide angle element to the glass mirror substrate due to the substantial differences in the respective linear coefficient of thermal expansion.

Thus, the present invention utilizes a glass wide angle element and a suitable optical adhesive (that preferably has a linear coefficient of thermal expansion within a suitable or acceptable range from the linear coefficient of thermal expansion of the wide angle element and the mirror substrate) to bond the glass wide angle element to the rear surface of the glass mirror substrate of the reflective element. Moreover, it has been found that adhesives having substantially different and higher (typically up to about 5 times higher or up to 10 times higher or more) linear coefficients of thermal expansion (as compared to glass materials) do not typically cause problems when adhering a glass wide angle element to a glass principal mirror substrate due to the relatively thin layer of optical adhesive disposed between the principal mirror substrate and the wide angle element.

The optical adhesive 21 is disposed between the wide angle element 22 and the rear surface of the reflective element substrate to adhere the wide angle element to the reflective element and is selected to have a refractive index that substantially matches or approximates the refractive index of the glass wide angle element and glass mirror substrate. The adhesive process to be used may be similar to or utilize aspects of the processes described in U.S. patent application Ser. No. 10/603,518, filed Jun. 25, 2003, now U.S. Pat. No. 7,345,680, which is hereby incorporated herein by reference in its entirety. Optionally, the optical adhesive may comprise an acrylic or urethane based material, and may be a UV curable adhesive.

The optical adhesive or medium or material or layer may comprise an optically matching clear, transparent adhesive that may optically match the optical qualities of the glass element and substrate, such as by utilizing aspects of the assemblies described in U.S. patent application Ser. No. 10/993,302, filed Nov. 19, 2004, now U.S. Pat. No. 7,338,177, which is hereby incorporated herein by reference in its entirety. Such polymeric adhesives typically will have a linear coefficient of thermal expansion that is significantly greater than that of the glass materials that it is bonding together. However, it has been found to not be problematic in this application because the layer of adhesive is relatively thin in comparison to the dimensions of the glass mirror substrate and the glass wide angle element that are being joined by the adhesive. Optionally, for example, the optical adhesive or medium or material may comprise an optical adhesive layer, such as a thermally cured or activated adhesive, an acrylic adhesive, an acrylate adhesive, a urethane adhesive, a silicone adhesive or epoxy adhesive or the like, with a refractive index (measured at the sodium D line) of preferably approximately 1.4 to approximately 1.6, more preferably approximately 1.45 to approximately 1.55, more preferably approximately 1.5 to approximately 1.54, such as approximately 1.52. The optical adhesive thus substantially matches the optical qualities or characteristics of the substrate material, such as glass (which has a refractive index of approximately 1.52), and thus is not readily discernable via looking through the reflective element by a person viewing the reflective element. Such optical mediums or adhesives are known, such as the adhesive commercially available from Norland Products, Inc., New Brunswick, N.J., and such as described in U.S. Pat. Nos. 5,073,012; 5,115,346; 5,355,245 and 5,523,877, which are hereby incorporated herein by reference in their entireties. Optionally, for example, the optical adhesive may comprise a UV curable adhesive, such as, for example, the NB120-119 adhesive commercially available from ND Industries, Inc. of Troy, Mich., or other suitable optical adhesive, depending on the particular application of the mirror reflective element assembly. The wide angle reflector element may be adhered to the rear of the mirror substrate via any suitable process, such as via a robotic process, and such as the robotic process discussed below with respect to FIGS. 20A-E.

Optionally, the optical element may not comprise an adhesive but may comprise an optical layer that provides the optical qualities or characteristics of the adhesives described above. The optical element may be disposed between the planar surface of the glass mirror substrate and the planar surface of the wide angle reflector element, whereby the wide angle reflector element may be held in place by a mechanical attachment or bond between the glass case or back plate and the wide angle reflector element, such that further adhering of the wide angle reflector element to the glass substrate may not be needed.

The wide angle element 22 is disposed behind the reflective element 12, such as at a perimeter region of the reflective element, such as at an outboard, upper region or outer upper quadrant of the reflective element (such as shown in FIG. 1) or elsewhere at the reflective element as may be selected depending on the particular application of the reflective element, and behind the auxiliary portion 20 of the reflective element 12. The front surface 22a of wide angle element 22 may be substantially flat or planar for substantially uniformly engaging the rear surface of the mirror reflective element (optionally, the front surface of the wide angle element may be slightly curved for applications where the reflective element is slightly curved, while the rear surface of the wide angle element has a smaller radius of curvature than the front surface to provide a wider angle field of view to a person viewing the mirror assembly). As shown in FIG. 1C, the wide angle reflector element 22 may be formed with a thicker outboard portion as compared to an inboard portion of the wide angle reflector element to enhance the wide angle view or partially sideward view provided by the wide angle reflector element.

The size, location and/or radius of curvature of the wide angle reflector element may be selected to provide the desired rearward field of view of the wide angle reflector element, such as, for example, a rearward field of view that encompasses the region between an outer limit of the viewing angle of the principal reflecting region of the mirror reflective element and the rearward limit of the driver's peripheral vision, or such as, for example, a rearward field of view that overlaps or substantially overlaps one or both of the outer limit of the viewing angle of the principal reflecting region and the rearward limit of the driver's peripheral vision, or any other suitable rearward field of view depending on the particular application of the wide angle reflector element and mirror reflective element assembly. Optionally, two or more wide angle elements or blind zone mirror elements may be disposed at the mirror assembly to provide two or more rearward wide angle fields of view to the driver of the vehicle (such as, for example, a first wide angle element that provides a generally sideward and rearward field of view that may at least span or overlap the viewing area between the rearward limit of the driver's peripheral field of view and the outboard limit of the rearview mirror, and a second wide angle element that provides a generally sideward and downward field of view to provide a view of the area immediately adjacent the vehicle so as to assist the driver in parking the vehicle), depending on the particular application of the mirror reflective element assembly.

The back plate 13 is attached to the rear of the reflective element 12 (such as via any suitable adhesive or the like), and is formed or configured to attach to a mirror actuator (not shown) for adjusting the reflective element to provide the desired or appropriate rearward field of view when the mirror assembly is mounted to the vehicle. The actuator may comprise an electronic actuator or manual actuator without affecting the scope of the present invention. Back plate 13 includes an attaching portion 13a and a pocket or receiving portion 24 that is formed to receive wide angle element 22 therein. The pocket 24 comprises an aperture 24a formed through the attaching portion 13a and sidewalls 24b extending rearward from the attaching portion and formed to substantially correspond with the peripheral edge of the wide angle element 22. The back plate 13 and pocket 24 may be unitarily formed together, such as via molding or injection molding of the back plate.

Reflective element assembly 11 includes a cover plate 26 that is attachable to the rear of the pocket 24 such that the sidewalls 24b and cover plate 26 substantially encase the wide angle element 22 within the pocket 24. The cover plate 26 may readily attach to the sidewalls 24b of pocket 24, such as via snaps or tabs 26a for engaging corresponding connecting elements 24c of sidewalls 24 to provide a snap type connection or the like.

Optionally, and desirably, the reflective element assembly 11 may include a heater element 28 that is disposed at or established at the rear surface of the reflective element 12 to reduce fogging of the reflective element. The heater pad or element 28 at the rear surface of the glass substrate may provide an anti-fogging of de-fogging feature to the exterior mirror assembly, and may utilize aspects of the heater elements or pads described in U.S. patent application Ser. No. 11/334,139, filed Jan. 18, 2006, now U.S. Pat. No. 7,400,435; and/or U.S. provisional applications, Ser. No. 60/853,850, filed Oct. 24, 2006; Ser. No. 60/918,089, filed Mar. 15, 2007; and/or Ser. No. 60/970,687, filed Sep. 7, 2007, and/or PCT Application No. PCT/US07/82099, filed Oct. 22, 2007, which are hereby incorporated herein by reference in their entireties). The heater element 28 may include electrical contacts 30 that extend rearward therefrom and through an aperture 13b of attaching portion 13a of back plate 13 for electrical connection to a wire harness or connector of the mirror assembly, or the back plate and/or heater pad may include suitable electrical connectors and connections incorporated therein (such as by utilizing aspects of the mirror assembly described in U.S. patent application Ser. No. 11/334,139, filed Jan. 18, 2006, now U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

The heater pad may conform to the rear surface of the rear substrate and thus may provide heating to the principal reflector portion 18 of the reflective element 12. Heater pad 28 thus may provide substantially uniform heating of the mirror reflective element over substantially the entire principal reflecting area 18 of the mirror reflective element 12. Heater pad 28 may be formed so as to not overly the wide angle reflector portion 20 of the reflective element. For example, the heater pad may have a window or aperture or cut-out area or portion 28a that generally corresponds with the wide angle reflector portion 20 of the reflective element 12 when the heater pad 28 is attached or adhered to the rear surface of the reflective element 12.

Optionally, the reflective element assembly 11 may include a second or auxiliary heater element 32 for heating the rear surface of the wide angle reflector element 22. Auxiliary heater element 32 may be attached or adhered (or otherwise disposed at) the rear surface of the wide angle element, such as in a similar manner as described above. Because the thickness of the wide angle element 22 is greater than the thickness of the reflective element substrate of reflective element 12, the auxiliary heater element 32 is preferably a more powerful heater element than the primary heater element or pad 28, such that auxiliary heater element 32 may provide sufficient heat output to effectively heat the wide angle element 22. Auxiliary heater element 32 includes electrical connectors 34 for electrically connecting the auxiliary heater element to a wire harness or connector of the back plate or mirror assembly. An aperture 26b may be provided or formed through cover plate 26 to facilitate electrical connection to the connectors 34 of auxiliary heater element 32.

Optionally, a substantially light absorbing opacifying border, such as a dark color or darkened or black border, may be provided around the perimeter of the wide angle element 22, such as at the front surface and perimeter edge region of the wide angle element (or optionally on the glass substrate of the reflective element) to provide a demarcation or delineation line so as to demarcate or distinguish the wide angle reflector portion from the primary reflector portion of the reflective element. The dark border may be disposed or established at the front surface and perimeter edge region of the wide angle element, and may coat or cover the perimeter edges 22c of the wide angle element 22.

Optionally, and desirably, the wide angle element or lens 22 may be formed to be slightly larger than the window formed or established in the reflector coating of the reflective element so that the wide angle element 22 slightly overlaps the principal or primary reflector portion 18 of the reflective element. For example, the wide angle element 22 may overlap the primary reflector portion 18, such as by one or more millimeters, such as, for example, about 1 mm or thereabouts, at the perimeter regions of the wide angle element. In such an application, a light absorbing layer, such as, for example, about a 2 mm wide to about a 3 mm wide (or thereabouts) light absorbing layer (such as a dark or black coating or layer), may be provided around the perimeter edge region of the wide angle element so that a blackened or darkened band (such as a band of about 1 mm wide or preferably about 2 mm wide) is viewable through the reflective element by a person viewing the mirror assembly (clearly other dimensions may be utilized without affecting the scope of the present invention).

Optionally, a dark color or darkened or black coating or layer may be disposed along the perimeter region of the reflective element so that the perimeter edge of the reflective element is not seen as a light colored line in regions where there may not be any reflector coating disposed on the mirror substrate.

Thus, the present invention provides a wide angle element or optic or lens at the rear of the mirror reflective element so as to provide a wide angle spotter mirror at a corner or region of the reflective element, such as at an upper outboard corner or lower outboard corner or upper or lower inboard corner, or such as at any other suitable or appropriate region of the reflective element, such as any upper, lower or side region of the mirror reflective element as desired and depending on the particular application of the mirror reflective element assembly. The back plate has a pocket formed thereat that allows for enhanced assembly of the mirror assembly. For example, the heater pad may be adhered to the rear surface of the reflective element and the back plate may be adhered to the rear surface of the heater pad. The optical adhesive may be disposed at the rear surface of the reflective element and within the pocket region of the back plate and the wide angle element or lens may be inserted into the pocket and engaged against the optical adhesive and rear surface of the reflective element. The auxiliary heater element may be adhered to the rear surface of the wide angle element and the cover may then be snapped to the pocket walls of the back plate. The entire assembly may then be UV cured to cure the optical adhesive and thus secure or bond the wide angle element to the rear surface of the mirror reflective element substrate. The present invention thus provides for z-axis assembly of the back plate and wide angle or auxiliary element and heater pad to the rear surface of the mirror reflective element.

Optionally, the mirror reflector or reflective element may comprise an electro-optic reflective element (but could comprise a non-electro-optic reflective element) having a front substrate, a rear substrate and an electro-optic medium (such as a solid polymer matrix electrochromic medium or the like) sandwiched therebetween and sealed via a perimeter seal. The front substrate has a transparent conductor coating (such as an indium tin oxide (ITO) coating or layer) disposed at its rear surface, while the rear substrate has a mirror reflector or coating (such as a non-dichroic transflector, such as an ITO/Ag/ITO stack of layers or coatings or a silicon metal reflector coating or the like) and a transparent conductor layer (such as an ITO or F-doped or As-doped tin oxide layer or the like) disposed at its front surface. The mirror reflective element thus may comprise a third surface electro-optic mirror reflective element (such as an electrochromic mirror element). The front and rear substrates may comprise generally planar mirror substrates or may have a slight radius of curvature to provide a wider angle field of view across the principal reflector portion depending on the particular application of the mirror reflective element and exterior rearview mirror assembly.

Optionally, the transparent electrically conductive layer at the rear surface of the front substrate may be masked so that the rear surface of the front substrate is devoid of the transparent conductor layer at the auxiliary reflector portion of the reflective element. In such an application, the reflective element will not be dimmed at the wide angle portion when the primary reflector portion is dimmed via energization of the coatings at the front and rear substrates. Thus, the wide angle reflector element or spotter mirror reflector portion is not dimmed even when the primary reflector portion of the reflective element may be dimmed (such as when glare is detected at the rearview mirror). The difference in dimming of the primary reflector portion and auxiliary reflector portion of the reflective element may distinguish or demarcate the auxiliary reflector portion from the primary reflector portion to enhance viewability and discernibility of the wide angle reflector portion to a person viewing the mirror assembly.

Optionally, the reflector coating 23 at the rear surface of the auxiliary wide angle element 22 may match or substantially match the reflector coating of the reflective element, so that the primary reflector portion provides a similar or substantially the same color or tint as the auxiliary reflector portion of the mirror assembly. Optionally, however, it is envisioned that the reflector coating 23 at the rear surface of the auxiliary wide angle element 22 may be different than the reflector coating of the reflective element, so that the primary reflector portion provides a color or tint from the auxiliary reflector portion of the mirror assembly. For example, the reflector coating 23 at the rear surface of the auxiliary wide angle element 22 may comprise chromium (or other suitable metallic coating or coatings) while the reflector coating of the reflective element may comprise aluminum (or other suitable metallic coating or coatings), so as to provide a different tint or appearance between the reflector portions. Optionally, the glass wide angle element 22 may comprise a colored or tinted glass material to distinguish or differentiate the wide angle reflector portion from the primary reflector portion. For example, the wide angle element may comprise a blue or blue-tinted glass, while the reflective element substrate or substrates may comprise transparent or clear glass.

Optionally, the transparent conductor layer may be established or disposed at substantially the entire principal reflecting portion of the reflective element, while the mirror reflector is disposed at the transparent conductor layer and with a window masked or formed through the mirror reflector. The transparent conductor may disposed over substantially the entire front surface of the rear substrate and at the window region so as to provide a conductive layer or surface at the electro-optic medium and over substantially the entire interface between the rear substrate and the electro-optic medium. Thus, electrical conductivity may be preserved between the glass substrate and the electro-optic medium across the interface surface of the substrate including at the window region or auxiliary reflector portion, so as to provide substantially uniform dimming of the mirror reflective element (i.e. darkening of the electro-optic medium) when an electrical voltage is applied to the conductive coatings at the opposed surfaces of the front and rear substrates.

Thus, the auxiliary wide angle mirror reflector element 22 provides a wide angle rearward field of view to the driver of the vehicle as compared to the field of view provided by the generally planar or slightly curved principal reflecting area or portion 18 of the mirror reflective element 12. The diameter and radius of curvature (with a smaller radius of curvature providing a wider angle rearward field of view) of the rear surface of the wide angle mirror reflector element 22 is selected to provide the desired wide angle rearward field of view. The curved rear surface of the wide angle reflector element has a radius of curvature that is smaller and preferably substantially smaller than the radius of curvature of the principal reflector portion of the reflective element, which may have a large radius of curvature that may approach infinity, such as for a slightly curved to generally or substantially planar or flat mirror element. Thus, the mirror reflector or reflective element or transflective electro-optic mirror element of the present invention has an auxiliary wide angle mirror reflector portion established at the rear of the mirror reflective element, such as at the rear of the rear substrate of an electro-optic reflective element.

As used herein, the term "generally planar" as used in reference to the principal or main viewing reflective element may encompass both generally planar driver side mirror reflective elements and slightly curved passenger side mirror reflective elements, and is intended to refer to the principal or main viewing reflective element being generally planar or less curved as compared to the radius of curvature of the curved rear reflector surface of the wide angle reflective element. For example, a generally planar main-viewing or principal mirror reflector or reflective element may be used in a driver-side complete exterior mirror assembly on a vehicle operated in the United States of America and subject to FMVSS 111, while a main-viewing or principal mirror reflector or reflective element may be non-planar, and may have a convex curvature, such as a spherical curvature or a multi-radius curvature or the like, if used in a passenger-side complete exterior mirror assembly on a vehicle operated in the United States of America.

Optionally, the auxiliary wide angle mirror reflector portion of the present invention may be disposed at or established at a rear surface of a fourth surface reflecting electro-optic mirror reflective element. Optionally, the auxiliary wide angle mirror reflector portion of the present invention may be disposed at or established at a rear surface of non-electro-optic or non-electrochromic reflective element, such as a single substrate mirror reflective element. The single substrate may comprise a generally flat or planar substrate or a slightly curved substrate or a prismatic element or substrate, while remaining within the spirit and scope of the present invention.

Figure 20B:
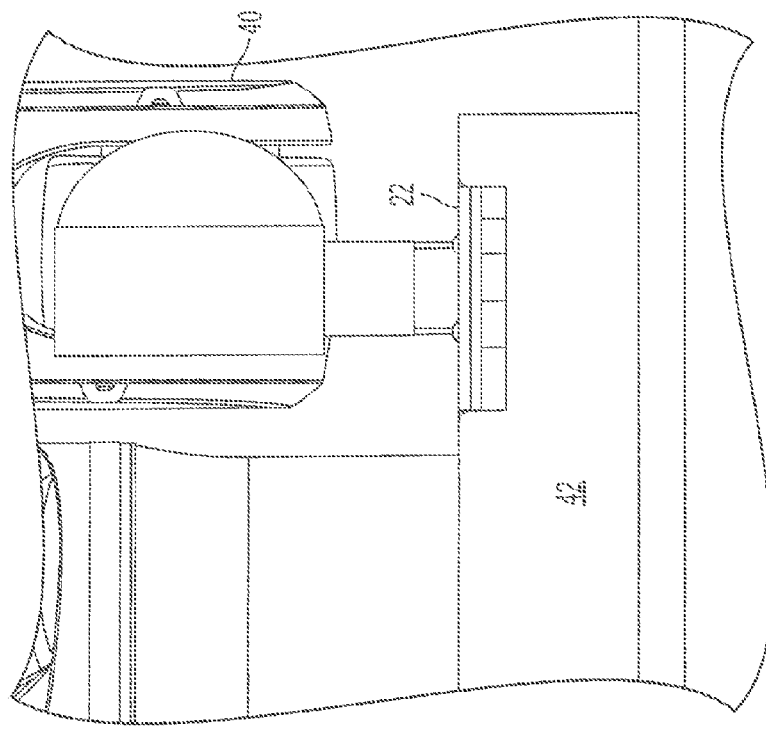
Figure 20A:
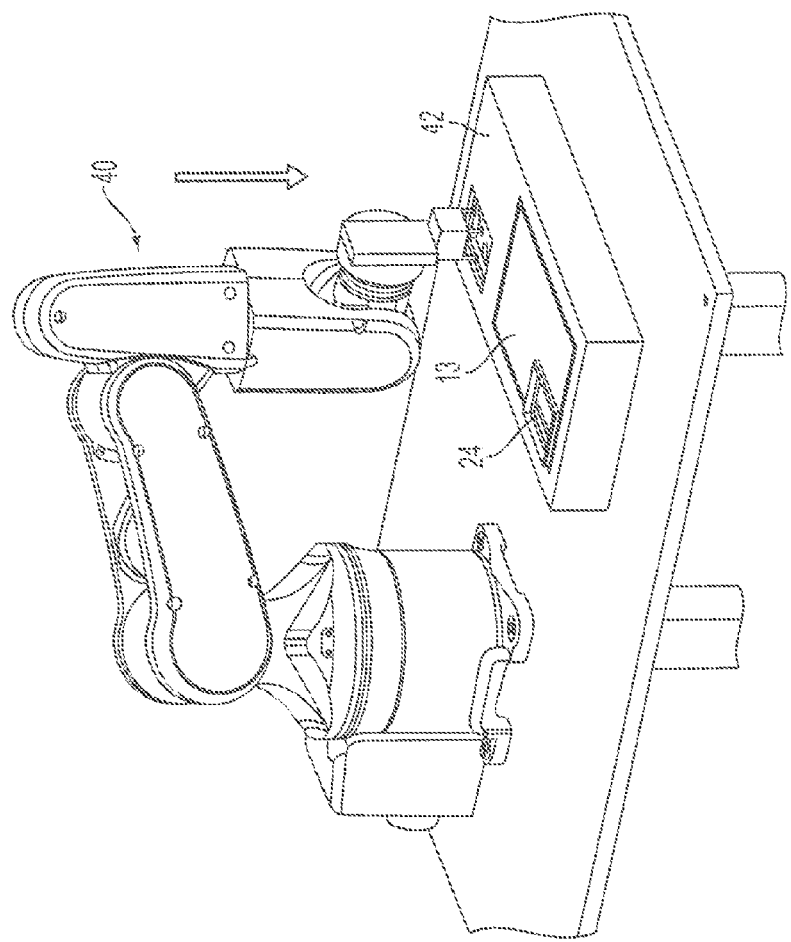

Optionally, and with reference to FIGS. 20A-E, the wide angle element 22 may be adhered to the rear of the mirror substrate 12 and within the receiving pocket 24 of the back plate via a robotic device 40. As can be seen in FIG. 20A, a fixture 42 may be disposed at or near robot 40 and may receive the mirror substrate 12 (with the back plate and receiving pocket facing upward or outward from the fixture 42) and the wide angle element 22 (with its generally planar front surface facing downward and its curved reflector surface facing upward or outward from the fixture). The robot 40 is operable to engage the rear curved surface of the wide angle element (such as via suction cups or vacuum cups or the like at an engaging portion of the robot, and such as shown in FIG. 20B) and lift or move the wide angle element from its fixture pocket and move the wide angle element (as shown in FIG. 20C) to be generally at or over the receiving pocket or case 24 of the back plate 13.

Figure 20D:
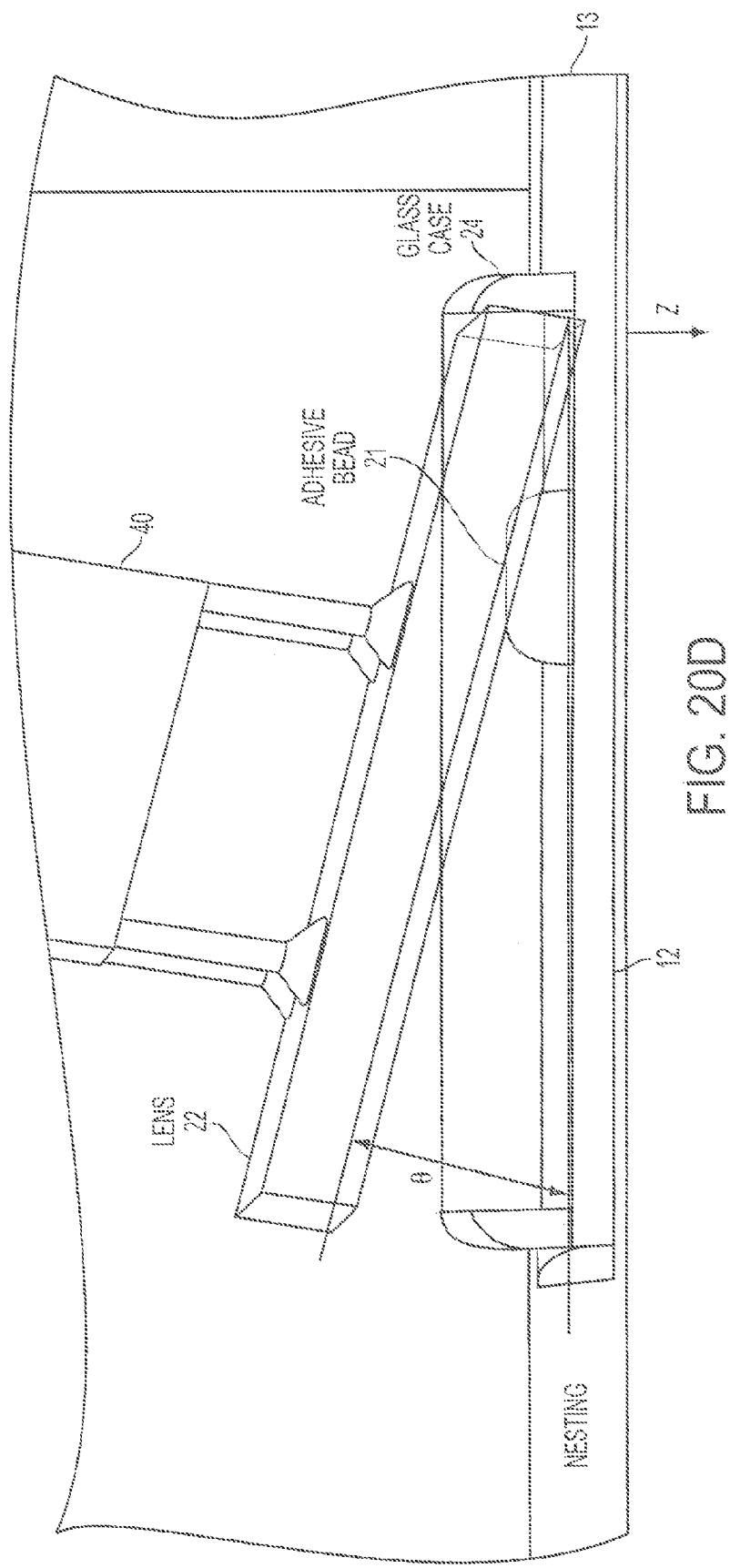
Figure 20E:
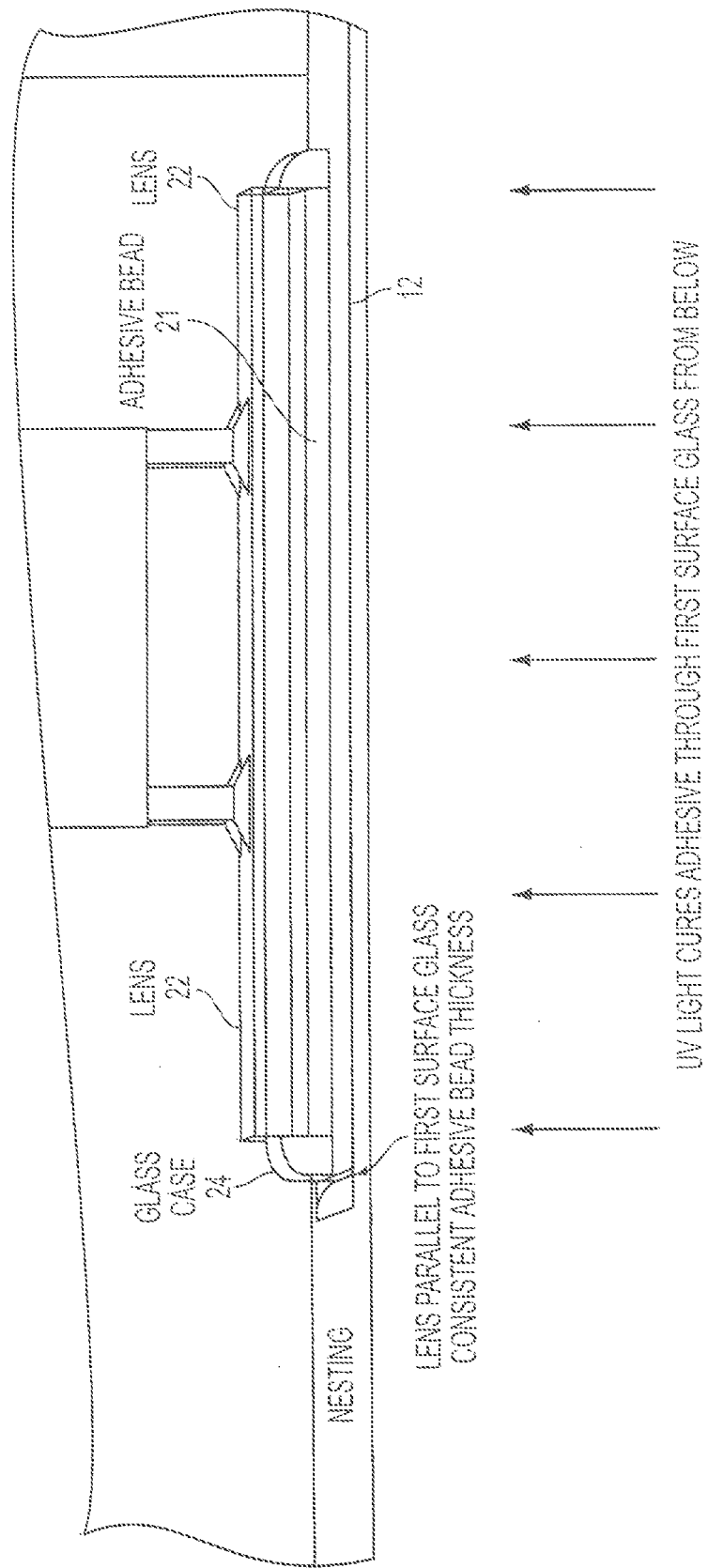

As shown in FIG. 20D, a bead of adhesive 21 may be disposed at or along a side region of the wide angle reflector portion 20 of the reflective element, and the robot may move the wide angle element 22 downward and at an angle θ relative to the plane of the mirror reflective element. The robot thus engages the dispensed adhesive with the wide angle element at a defined angle, and then rolls the wide angle element down toward the rear surface of the glass substrate and toward an orientation where the front or planar surface of the wide angle element is generally parallel with the rear or planar surface of the mirror substrate and may simultaneously move the wide angle element downward (in the z-direction in FIG. 20D) until the final position and orientation of the wide angle element is reached. As can be seen in FIG. 20E, the planar surface of the wide angle element is then parallel to the planar rear surface of the reflective element substrate, with the adhesive spread out to all of the edge regions of the wide angle element and disposed between the planar surfaces with a consistent adhesive bead thickness or bond gap. The adhesive may then be cured via UV light, which may be activated to cure the adhesive through the glass substrate or reflective element, such as from below the fixturing device or element. The vacuum at the robot vacuum cups may be deactivated and the robot may release the wide angle element and return to a home position. The assembled mirror reflective element assembly may be removed from the fixture and a new reflective element and wide angle element may be disposed at the fixture and the process may be repeated. Although shown and described as using a UV cured adhesive, clearly other types of adhesives may be used.

Figure 2A:
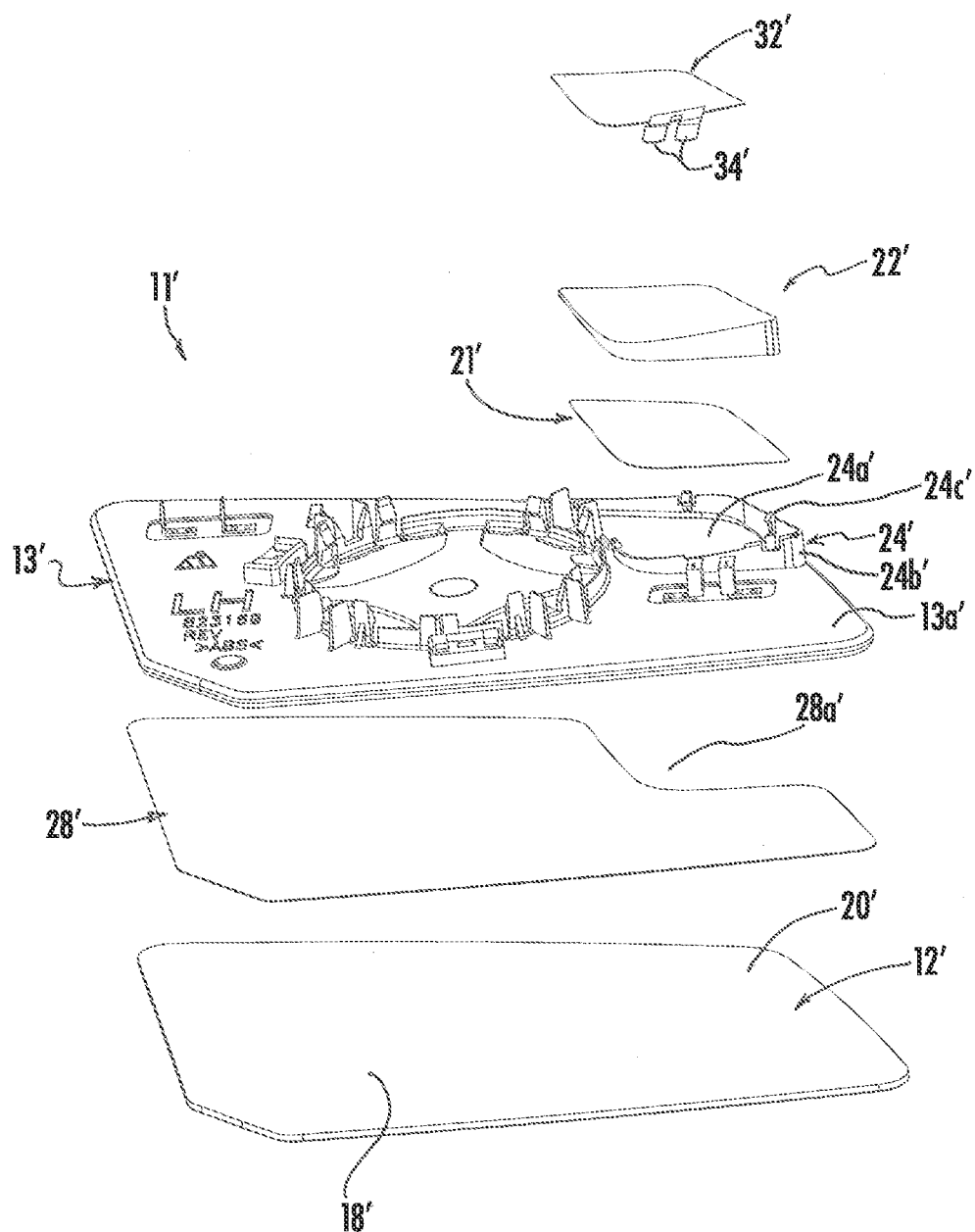
FIG. 2A is an exploded perspective view of another exterior mirror reflective element assembly in accordance with the present invention.
Figure 2B:
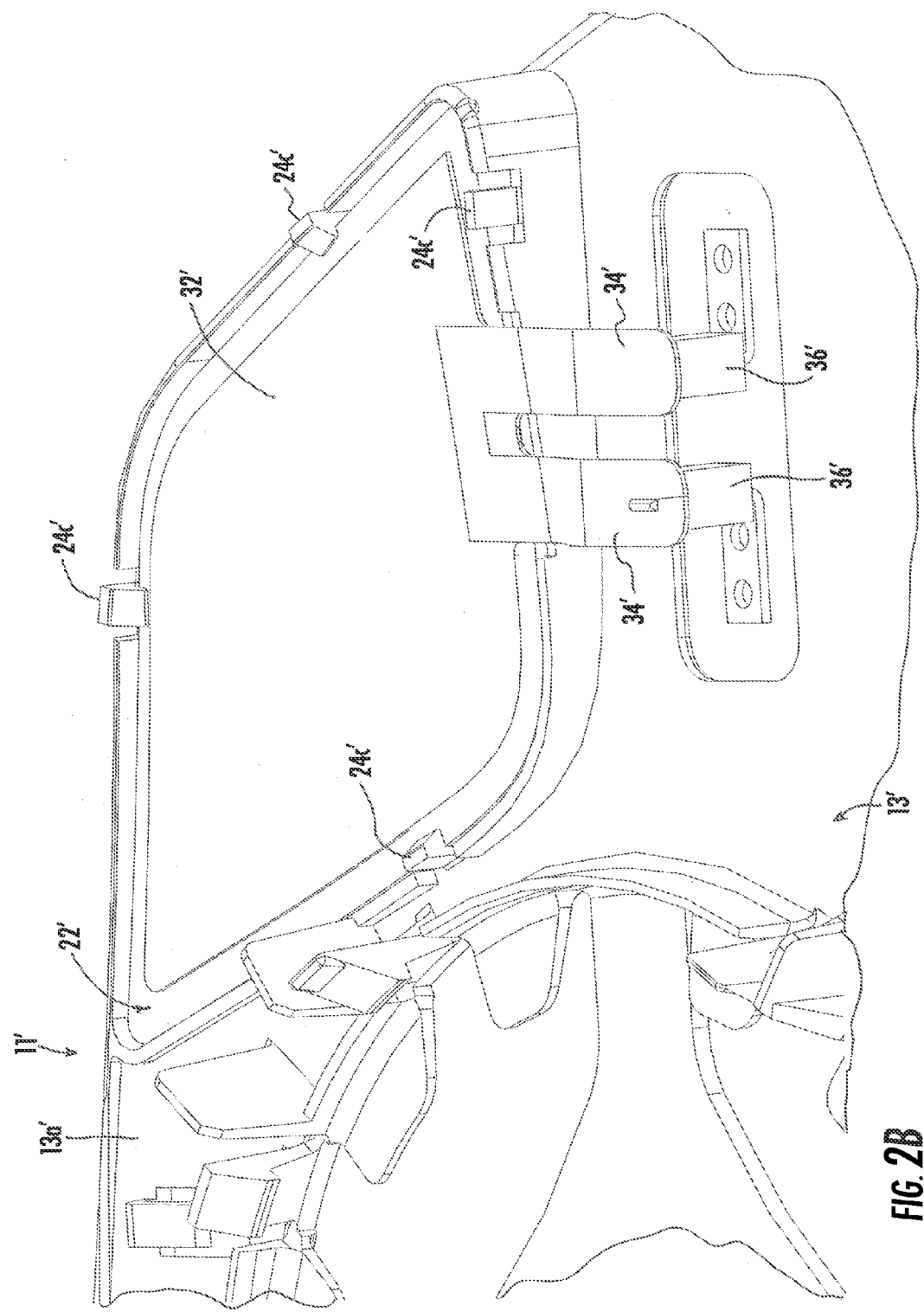
FIG. 2B is a rear perspective view of the wide angle reflector element of the exterior mirror reflective element assembly of FIG. 2A.

Optionally, and with reference to FIGS. 2A and 2B, an auxiliary wide angle element 22' of an exterior mirror reflective element assembly 11' may be received within a pocket or receiving portion 24' of back plate 13' that is formed to receive wide angle element 22' therein, and may be mechanically retained in the pocket. The pocket 24' comprises an aperture 24a' formed through the attaching portion 13a' of back plate 13' and sidewalls 24b' extending rearward from the attaching portion and formed to substantially correspond with the peripheral edge of the wide angle element 22'. As can be seen in FIGS. 2A and 2B, the receiving portion 24' includes locking tabs or securing means 24c' for mechanically securing or retaining wide angle element 22' within the receiving portion 24' when the wide angle element is inserted or received into the receiving portion. The mirror reflective element assembly 11' may otherwise be substantially similar to the mirror reflective element assembly 11, discussed above, such that a detailed discussion of the mirror reflective element assemblies need not be repeated herein.

As can be seen in FIGS. 2A and 2B, the locking tabs 24c' may comprise flexible tabs or fingers that include angled outer faces to allow the wide angle element to push the tabs outward as the wide angle element is inserted into the receiving pocket. When the wide angle element is seated or received within the pocket, the tabs flex back or snap back, with the hook at the end of the tabs engaging the rear surface of the wide angle element and thereby securing or mechanically retaining the wide angle element within the receiving pocket. Thus, the wide angle element need not be adhered to the rear surface of the mirror substrate or reflective element 12'. In the illustrated embodiment, the mirror reflective element assembly 11' includes an optical film or layer 21' disposed between the planar surface of the wide angle element 22' and the rear surface of the mirror substrate 12'. The optical film layer 21' may be selected to have a refractive index that substantially matches or approximates the refractive index of the glass wide angle element and glass mirror substrate.

In the illustrated embodiment, the reflective element assembly 11' includes a heater element 28' that is disposed at or established at the rear surface of the reflective element 12' to reduce fogging of the reflective element, such as described above. The heater pad may conform to the rear surface of the rear substrate and thus may provide heating to the principal reflector portion 18' of the reflective element 12'. Heater pad 28' thus may provide substantially uniform heating of the mirror reflective element over substantially the entire principal reflecting area 18' of the mirror reflective element 12' and may be formed so as to not overly the wide angle reflector portion 20' of the reflective element. For example, the heater pad may have a window or aperture or cut-out area or portion 28a' that generally corresponds with the wide angle reflector portion 20' of the reflective element 12' when the heater pad 28' is attached or adhered to the rear surface of the reflective element 12'.

Optionally, and as shown in FIGS. 2A and 2B, the reflective element assembly 11' may include a second or auxiliary heater element 32' for heating the rear surface of the wide angle element 22'. Auxiliary heater element 32' may be attached or adhered (or otherwise disposed at) the rear surface of the wide angle element, such as in a similar manner as described above. Auxiliary heater element 32' includes electrical connectors 34' for electrically connecting the auxiliary heater element to a wire harness or connector 36' of the back plate or mirror assembly. Optionally, the mirror reflective element assembly 11' may include a cover plate that is attachable to the rear of the pocket 24' such that the sidewalls 24b' and the cover plate substantially encase the wide angle element 22' and heater element 32' within the pocket 24, such as in a similar manner as described above.

Figure 3:
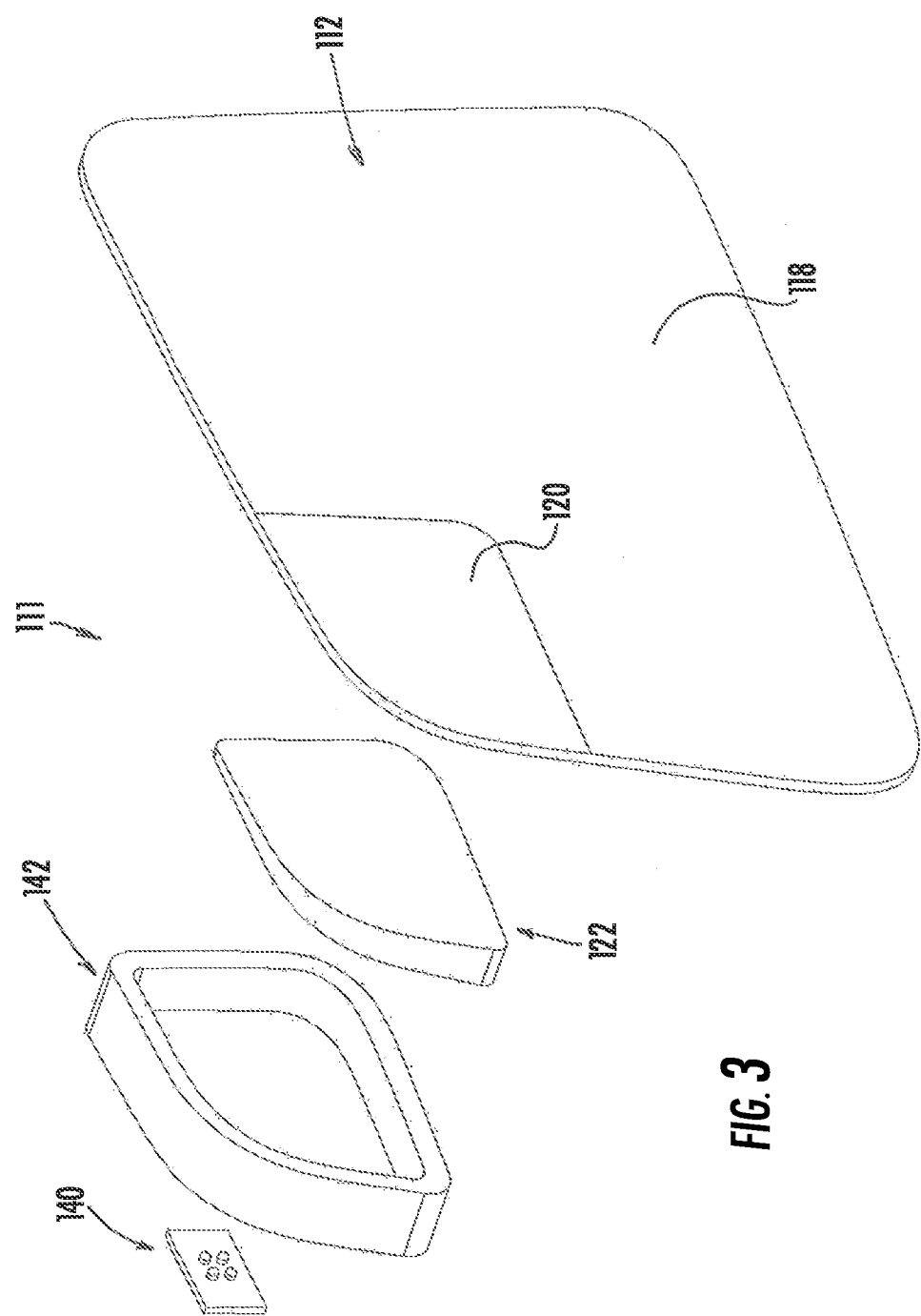
FIG. 3 is an exploded perspective view of another exterior mirror reflective element assembly in accordance with the present invention.

Optionally, and with reference to FIG. 3, a reflective element assembly 111 for an exterior rearview mirror assembly of a vehicle includes a generally planar mirror reflector or reflective element 112 providing a first or principal mirror reflective element portion 118 and a second or auxiliary wide angle reflective element portion 120. An auxiliary wide angle reflective element or reflective optic or lens 122 is disposed at or behind the wide angle reflective element portion 120 (which may be substantially devoid of the reflector coating as described above) and provides a wide angle "spotter" mirror at the reflective element. Reflective element assembly 111 includes an illumination source 140 (such as one or more light emitting diodes (LEDs) or the like) that is operable to illuminate or backlight or accent the wide angle spotter mirror so as to draw the driver's attention to the spotter mirror, such as when an object is detected at the side region or blind spot region of the vehicle, as discussed below. In the illustrated embodiment, the reflective element assembly 111 includes a perimeter illuminator element 142 that at least partially and preferably substantially or wholly circumscribes or wraps around or shrouds or bounds the perimeter of the wide angle element 122 and that is illuminated when the illumination source 140 is activated. The reflective element may have a window formed or masked at the reflector coating, whereby the wide angle element 122 and the illuminator element 142 are disposed behind the window region and thus viewable through the reflective element. The reflective element assembly may utilize aspects of the reflective element assembly 11, discussed above, or may utilize aspects of the reflective element assemblies described in U.S. Pat. Nos. 7,255,451; 7,195,381; 6,717,712; 6,522,451 and/or 7,126,456, which are hereby incorporated herein by reference in their entireties.

The illuminator element 142 may have light piping established thereat or therein, and at least partially circumferentially around the perimeter of the wide angle element and preferably substantially or wholly around the wide angle element, to distribute the illumination substantially uniformly around the element. Optionally, the illuminator element may otherwise provide illumination at or around or partially around the wide angle element while remaining within the spirit and scope of the present invention. The illuminator element may be molded around or partially around the wide angle element so as to at least partially circumscribe the wide angle element. Optionally, the illumination source may function to backlight the wide angle element to accent the wide angle element. Optionally, the wide angle element may have indicia or characters or the like established thereat (such as at the reflective coating of the wide angle element), whereby the indicia or the like may be viewable and discernible at the wide angle element when the illumination source is activated, such as by utilizing aspects of the mirror reflectors described in PCT Application No. PCT/US2006/018567, filed May 15, 2006 and published Nov. 23, 2006 as International Publication No. WO 2006/124682; and U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are hereby incorporated herein by reference in their entireties.

The illumination source may provide a low light level (such as to produce a brightness that is preferably less than about 100 candelas/m2 or more preferably less than about 50 candelas/m2 or thereabouts as viewed by the driver) or may provide a higher light level (such as to produce a brightness that is preferably greater than about 200 candelas/m2 or more preferably greater than about 400 candelas/m2 or thereabouts as viewed by the driver) depending on the particular application and desired illumination. Optionally, the illumination source may provide a reduced light level or output when the ambient light level is at or below a threshold level, so that a higher intensity output is provided during daytime driving conditions to limit or substantially preclude washout of the illumination, and a lower intensity output is provided during nighttime driving conditions to reduce glare to the driver of the vehicle. Optionally, and desirably, the illumination source and/or illumination element is angled so that the illumination is principally viewable by the driver of the controlled or subject vehicle, and not readily viewable or discernible by drivers of other vehicles. The illumination source may utilize aspects of the indicators and/or lighting means described in U.S. provisional applications, Ser. No. 60/853,850, filed Oct. 24, 2006; Ser. No. 60/918,089, filed Mar. 15, 2007; and/or Ser. No. 60/970,687, filed Sep. 7, 2007, and/or U.S. Pat. Nos. 6,198,409; 5,929,786 and 5,786,772, and/or PCT Application No. PCT/US2006/026148, filed Jul. 5, 2006, and/or PCT Application No. PCT/US07/82099, filed Oct. 22, 2007, which are hereby incorporated herein by reference in their entireties.

Optionally, and desirably, the illumination source is activated in response to an object detection system (such as a radar detection system or imaging detection system or the like) and/or a turn signal input (such as an input indicative of the driver of the vehicle activating a turn signal toward the side of the vehicle at which the respective reflective element assembly is disposed), such as by utilizing aspects of the mirror assemblies described in PCT Application No. PCT/US2006/026148, filed Jul. 5, 2006; and/or PCT Application No. PCT/US06/042718, filed Oct. 31, 2006, which are hereby incorporated herein by reference in their entireties.

Thus, the illumination source may function to alert the driver when there is an object in the field of view of the wide angle element or when it is appropriate for the driver to check the blind spot (such as when the driver is making a lane change). Optionally, the illuminator may be used as a turn signal or ground illuminator with various positions determined by the actuator. In the illustrated embodiment, the illuminator may utilize light pipes at or around the wide angle element to illuminate the perimeter element 142, which thus may provide a uniform lighting around the perimeter of the spotter mirror. However, the illuminator or illumination source may otherwise accent or illuminate the spotter mirror (such as via backlighting of the spotter mirror or other forms of illumination elements or light pipes) to accent the spotter mirror so as to alert the driver of the vehicle that there may be an object or other vehicle in the blind spot region or otherwise toward the side of the controlled vehicle. Such an illuminator may utilize aspects of the devices described in U.S. Pat. No. 6,919,796, which is hereby incorporated herein by reference in its entirety.

The illumination source or illuminator thus provides a cognitive awareness aid or element that draws the attention of the driver to the spotter mirror at the appropriate time. The illuminator is episodically activated so as to only accent or illuminate the spotter mirror when it is an appropriate time for the driver to view the spotter mirror (such as when a vehicle is detected in the adjacent lane and/or when the driver activates the turn signal indicator in anticipation of making a lane change). Thus, the driver's attention is drawn to the spotter mirror when it is useful or beneficial for the driver to check the blind spot region, and the driver is not otherwise drawn to viewing the spotter mirror, such as during normal driving conditions.

Optionally, and with reference to FIGS. 4A-H, a reflective element assembly 111' for an exterior rearview mirror assembly of a vehicle includes a generally planar mirror reflector or reflective element 112' providing a first or principal mirror reflective element portion 118' and an auxiliary wide angle reflective element portion 120', such as at a corner region of the reflective element 112' (as shown, but could be at another region of the reflective element). Reflective element assembly 111' may be similar to reflective element assemblies 11, 111, discussed above, and may have a wide angle reflector element 122' disposed behind a window or transparent portion of the reflective element 112' and generally at the wide angle reflective element portion 120'. In the illustrated embodiment, the reflective element 112' is attached (such as adhered) to a back plate 113', and the wide angle reflector element 122' is received in a pocket or receiving portion 124' of back plate 113'. The back plate is formed or configured to attach to a mirror actuator (not shown) for adjusting the reflective element to provide the desired or appropriate rearward field of view when the mirror assembly is mounted to the vehicle. The pocket or receiving portion 124' comprises an aperture 124a' and sidewalls 124b' extending rearward from the attaching portion of the back plate and formed to substantially correspond with the peripheral edge of the wide angle element 122'. The back plate 113' and pocket 124' may be unitarily formed together, such as via molding or injection molding of the back plate.

Figure 4A:
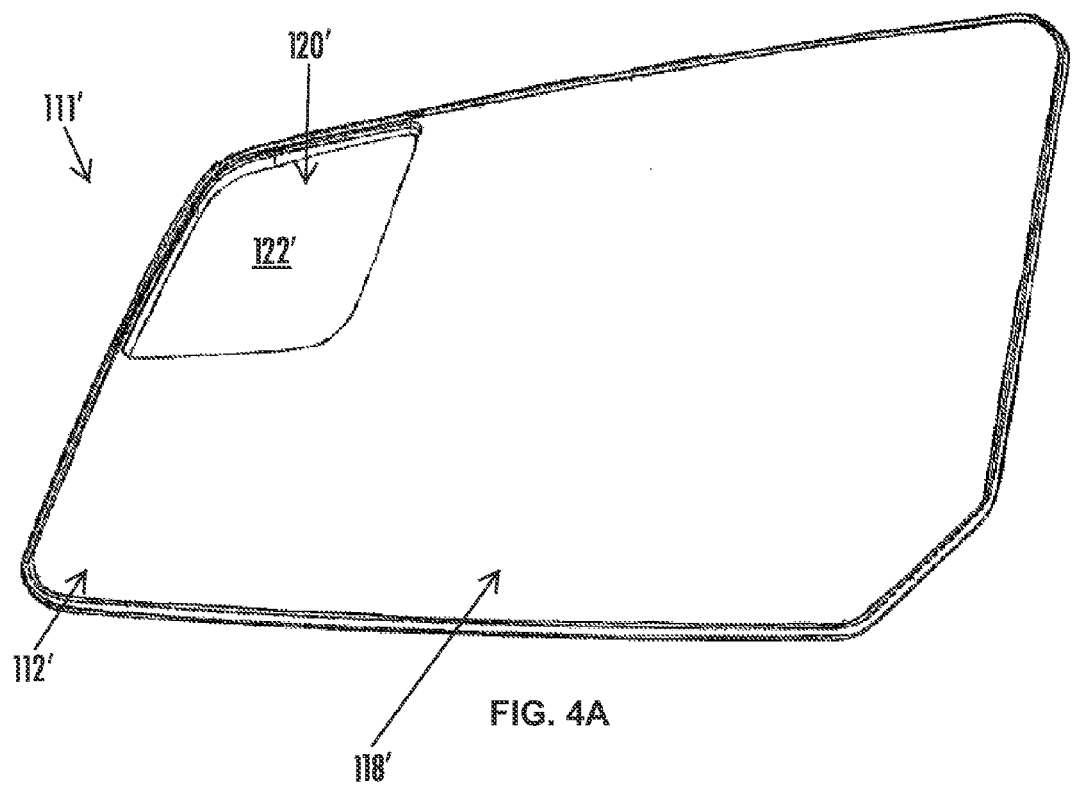
FIGS. 4A-D are perspective views of another exterior mirror reflective element assembly in accordance with the present invention.
Figure 4B:
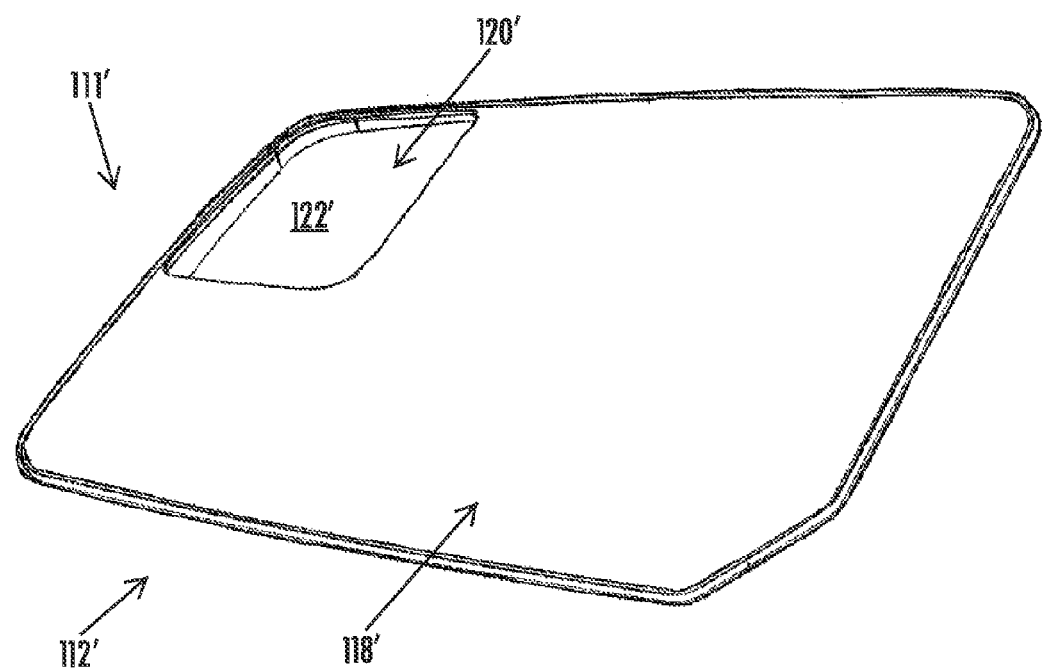
Figure 4C:
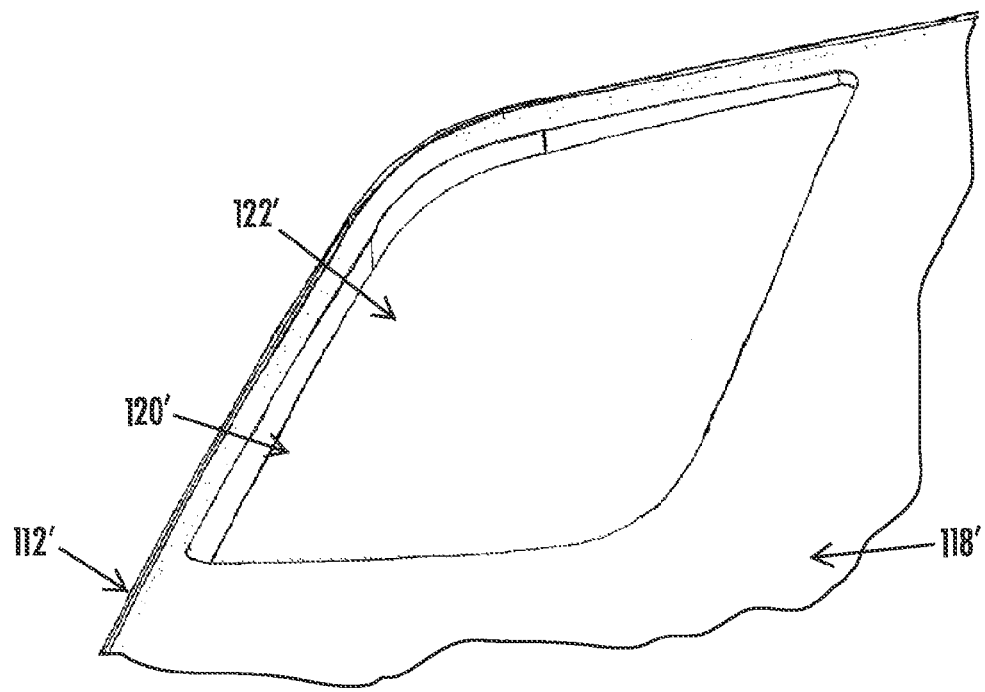
Figure 4D:
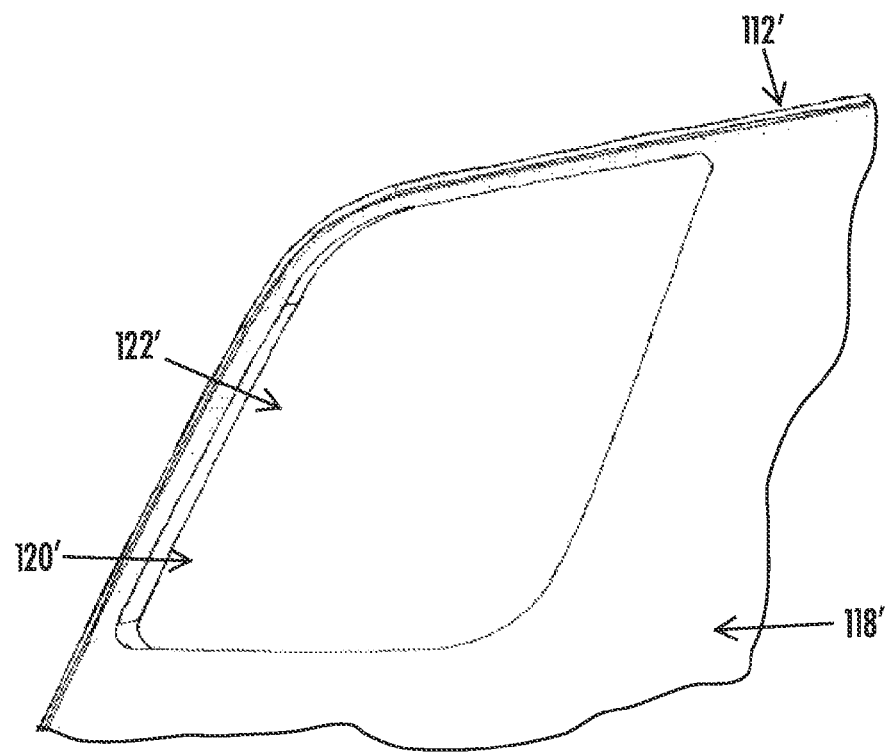
Figure 4E:
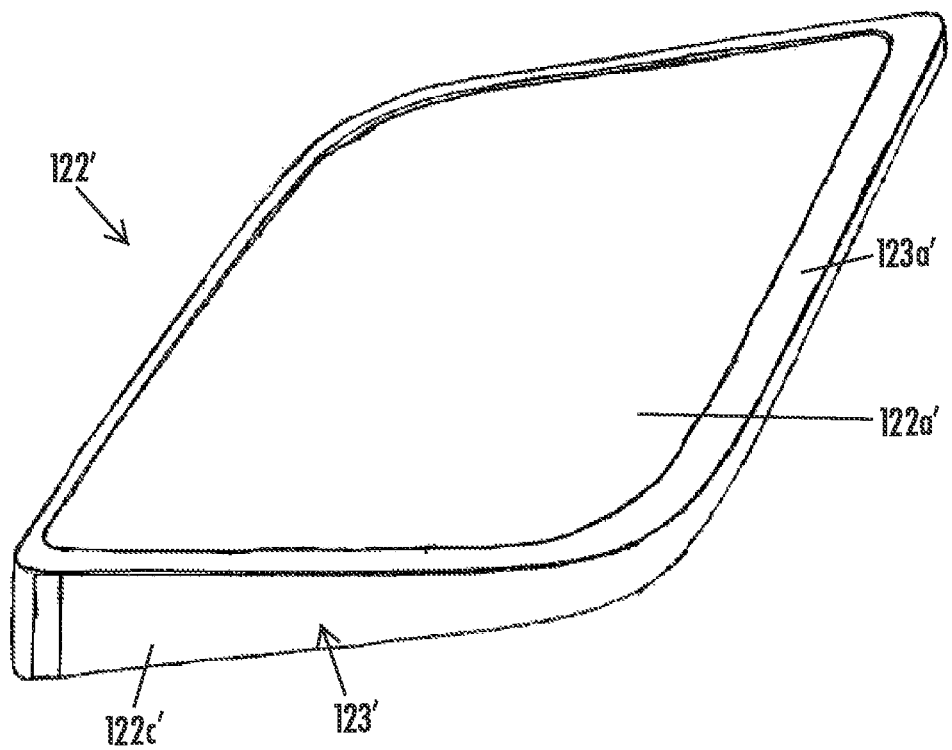
FIG. 4E is a front perspective view of the wide angle reflector element of the exterior mirror reflective element assembly of FIGS. 4A-D.
Figure 4F:
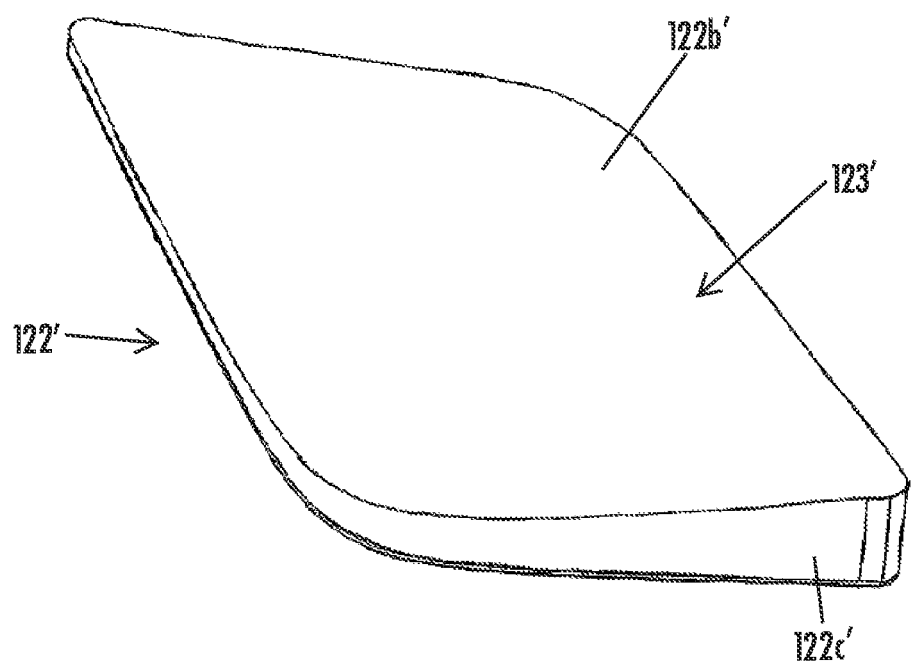
FIG. 4F is a rear perspective view of the wide angle reflector element of the exterior mirror reflective element assembly of FIGS. 4A-D.
Figure 4G:
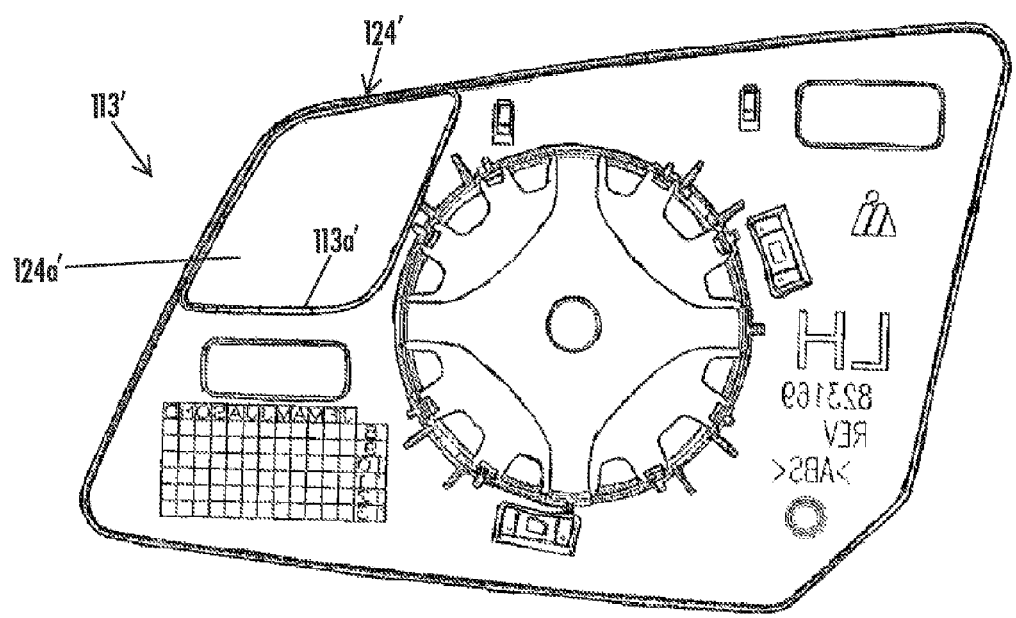
FIG. 4G is a front perspective view of the back plate of the exterior mirror reflective element assembly of FIGS. 4A-D.
Figure 4H:
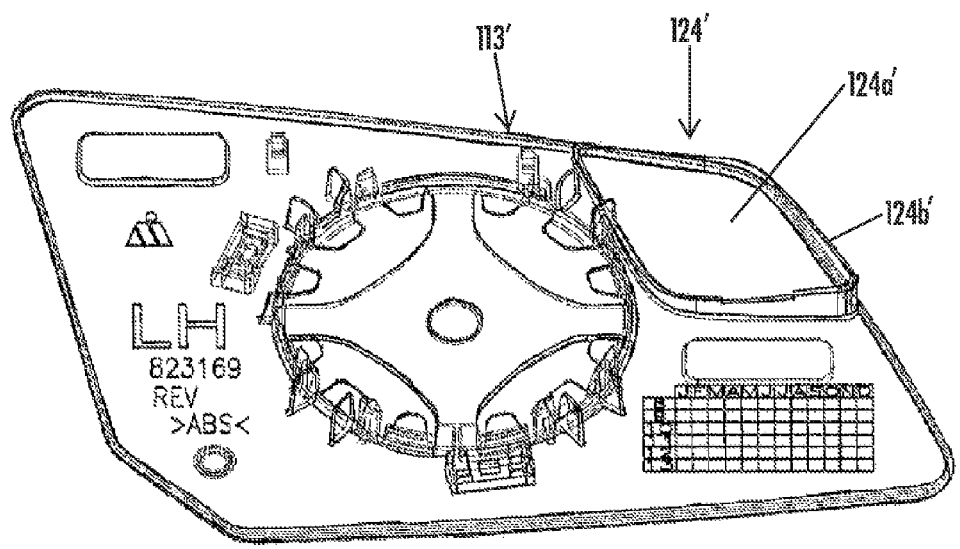
FIG. 4H is a rear perspective view of the back plate of the exterior mirror reflective element assembly of FIGS. 4A-D.

Optionally, and as can be seen with reference to FIG. 4G, the back plate 113' may include a lip or raised portion 113a' around the aperture 124a' and at the front surface of the back plate that is adhered to the reflective element 112'. The lip 113a' functions to limit transfer of adhesive between the wide angle optic and the back plate, and thus limits transfer of the adhesive that adheres the reflective element to the back plate to the wide angle optic region (where such adhesive may be visible if not an optical adhesive of the type that adheres the wide angle optic to the reflective element). Thus, the window at which the wide angle optic is disposed or adhered remains free from the adhesive that adheres the reflective element to the back plate to enhance the appearance of the reflective element assembly. Likewise, the lip may limit the transfer of the optical adhesive at the wide angle element to the principal reflecting region and between the reflective element and the back plate.

In the illustrated embodiment, wide angle element 122' comprises a glass element or optic that has a generally planar or flat front surface 122a' that opposes the rear surface of the reflective element 112' when the reflective element assembly is assembled and a curved rear surface 122b' (with a reflector, such as a silver reflector or the like, coated or otherwise established at the curved rear surface). The generally planar front surface 122a' is adhered to the rear surface of the reflective element via a suitable optical adhesive, such as a UV curable adhesive or the like. The adhesive layer disposed between the wide angle optic and the rear surface of the reflective element may be between about 15 mils and about 25 mils (about 0.015 inches to about 0.025 inches), less preferably between about 10 mils and about 30 mils, and less preferably between about 7 mils and about 40 mils. It is desirable to establish or achieve the desired thickness of the adhesive layer because if the layer is too thin, crazing or cracking at the glass surface may occur, while if the layer is too thick, a yellowing appearance may occur. The adhesive may comprise any suitable material, such as an acrylic or acrylate or epoxy or silicone based adhesive. The adhesive may comprise a UV curable adhesive and may utilize UV stabilization, such as by utilizing aspects of the assemblies described in U.S. Pat. Nos. 5,151,816; 5,073,012; 5,115,346; 5,076,674; 5,239,405 and/or 7,349,144, which are hereby incorporated herein by reference in their entireties. Optionally, the adhesive may be otherwise cured or activated, such as via thermal curing or the like.

Optionally, and as can be seen with reference to FIGS. 4A-F, wide angle optic 122' may include a darkened coating or layer or element 123' around its perimeter side edges 122c' and over its rear surface 122b'. In the illustrated embodiment, and as best shown in FIG. 4E, the darkened coating or layer or element 123' is disposed in a manner that has a portion 123a' that partially overlaps a perimeter region of the front or generally planar surface 122a' of the wide angle optic 122' so as to provide a darkened frame element that is viewable around the perimeter of the wide angle optic. Thus, for example, the front surface, with the exception of the perimeter edge regions, may be masked and the perimeter edge regions of the front surface and the side edges and the rear surface of the wide angle element may be coated or painted. As can be seen with reference to FIGS. 4A-E, the darkened coating or layer provides a frame around the wide angle element and also enhances the ability of the person viewing the mirror to recognize or appreciate the depth of the wide angle element and to enhance the appearance of the mirror reflective element assembly. The darkened layer or element may comprise any suitable layer or coating or paint or ink or element, such as a black coating or paint or ink coated or deposited over the curved rear surface of the wide angle optic, the side perimeter edges of the wide angle optic and partially overlapping the perimeter regions of the front generally planar surface of the wide angle optic.

Figure 5:
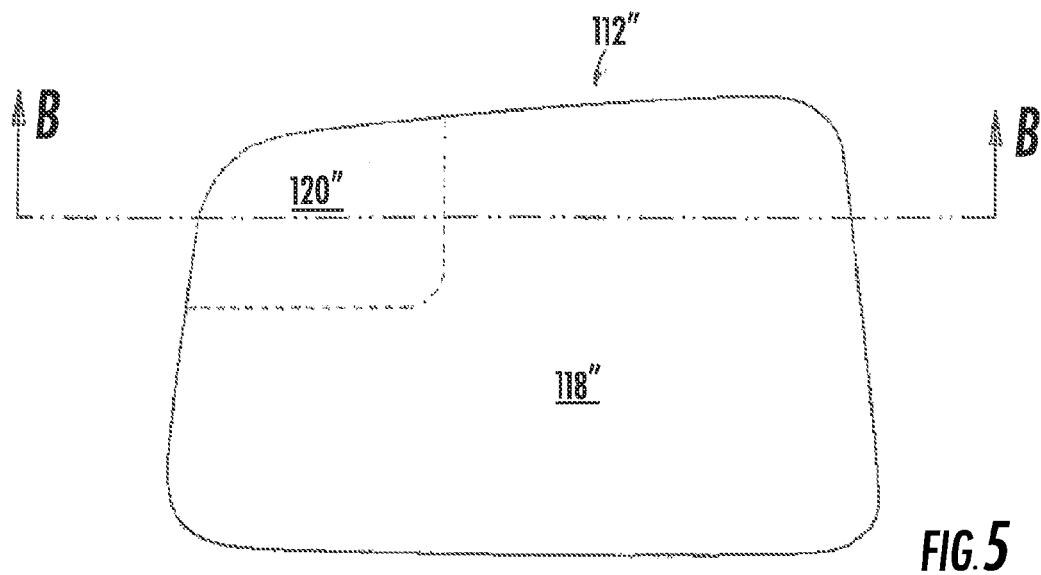
FIG. 5 is a plan view of another exterior mirror reflective element assembly in accordance with the present invention.
Figure 5A:
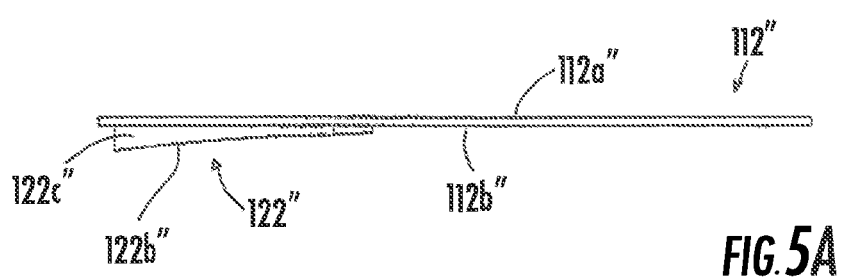
FIG. 5A is a bottom view of the exterior mirror reflective element assembly of FIG. 5.
Figure 5B:
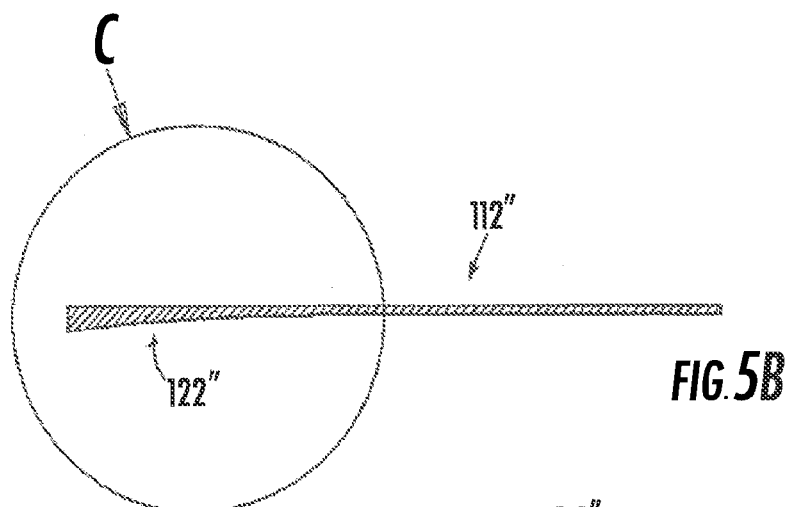
FIG. 5B is a sectional view of the exterior mirror reflective element assembly taken along the line B-B in FIG. 5.
Figure 5C:
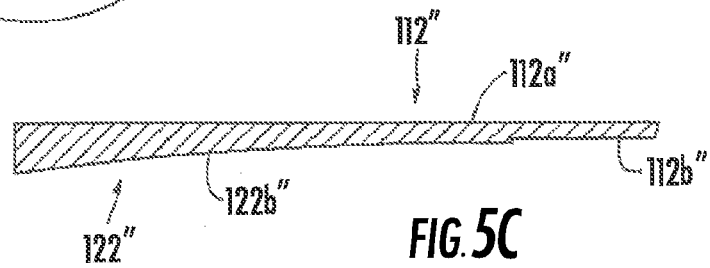
FIG. 5C is an enlarged sectional view of the area C in FIG. 5B.
Figure 5E:
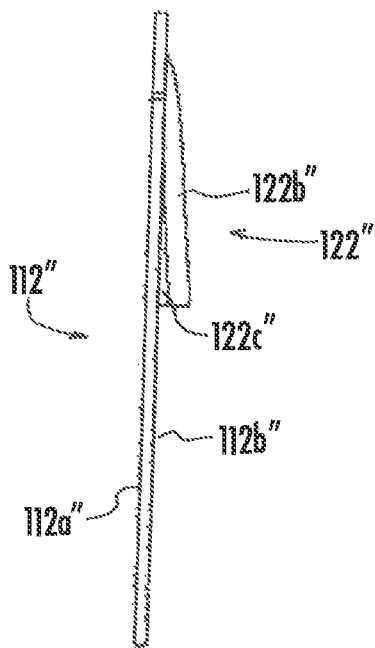
FIG. 5E is a side elevation of the exterior mirror reflective element assembly of FIG. 5.
Figure 5D:
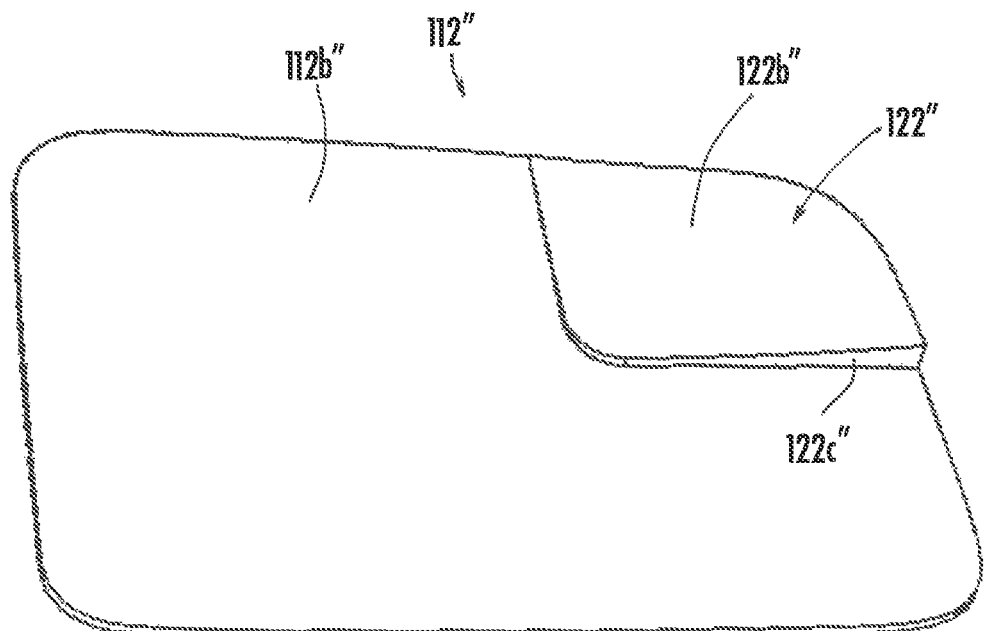
FIG. 5D is a rear perspective view of the exterior mirror reflective element assembly of FIG. 5.

Optionally, and with reference to FIGS. 5-5E, a reflective element 112" for an exterior rearview mirror assembly of a vehicle includes or provides a first or principal mirror reflective element portion 118" and a wide angle reflective element portion 120", such as at a corner region of the reflective element 112". In the illustrated embodiment, the reflective element portions are unitarily formed or established such that a wide angle reflector element or portion 122" is integrally formed with the generally planar reflective element. As best shown in FIGS. 5A-5E, the wide angle reflector element or portion 122" may be formed as part of the mirror substrate, such as part of a glass mirror substrate. The rear surface of the formed substrate (which may optionally be molded or otherwise formed to the desired shape) may be coated with a reflector coating or layer or element to provide the mirror reflector at the rear surface of the reflective element, including the generally planar, principally reflecting region and the curved wide angle reflecting region.

Optionally, for example, the reflective element 112" may be formed or manufactured by molding the substrate out of a glass material (such as a tempered soda lime glass material) or the like. The front or generally planar surface 112a" of the substrate is then ground and polished to either a flat or convex (depending whether the glass is for driver's or passenger's side) surface. The rear curved surface 122b" of the wide angle reflector portion 122" is ground and polished to have the desired or appropriate radius of curvature at the curved surface (such as, for example, a radius of curvature of about 400 to 500 mm or thereabouts, or a complex or multi-radius of curvature or the like). The rear curved surface 122b" of the wide angle reflector portion may be masked with the exception of about a 1-3 mm band around its perimeter edge regions, and a darkened coating or element (such as a black paint or the like) may be applied to the rear curved surface (and optionally to its perimeter edges 122c") to create the demarcating border (such as a dark or black border) around the wide angle reflector element, such as for demarcation or delineation of the wide angle reflector element. A reflective coating (such as an aluminum coating or aluminum alloy coating or the like) is applied to the rear curved surface (while the rear surface 112b" of the substrate at the principal reflecting region thereof may be masked during the wide angle reflector element coating process). The front generally planar surface 112a" (or slightly curved surface, such as for a passenger side exterior mirror assembly) of the substrate may be masked at a window at the wide angle reflector element that is required to view the curved reflector surface, and a metallic reflector coating (such as a chrome coating or the like) may be applied to the front generally planar surface of the reflector element. Optionally, a heater pad may be adhered or applied to the rear surface of the reflective element and/or the reflective element may be attached or adhered to a back plate or the like, such as in a known manner or such as described herein.

Optionally, the unitary construction of the glass mirror substrate and wide angle portion or element may be accomplished via other construction means, such as, for example, by machining the reflective element and wide angle element from glass stock, or by casting the glass reflective element and wide angle element and post polishing the glass, or by roll casting the glass reflective element and wide angle element and post polishing the glass, or by any other suitable means for casting or forming the glass substrate (with the wide angle element formed therewith) and finishing or polishing or grinding or machining the glass substrate to achieve the desired shape or form. The formed substrate may be coated on its appropriate surfaces to provide the desired reflectance of the mirror reflective element and wide angle reflective element (which may have substantially similar reflectance levels and/or tints or may have different reflectance levels and/or tints). Optionally, it is envisioned that the generally planar portion of the reflective element may be established or formed by grinding or physical removing of a portion the substrate around the wide angle optic, with the wide angle reflector element similarly formed by grinding or physical removing of a portion of the substrate to form the curved rear surface of the wide angle reflector element (such as by utilizing aspects of the mirror reflectors described in U.S. patent application Ser. No. 12/124,297, filed May 21, 2008, now U.S. Pat. No. 7,748,856, which is hereby incorporated herein by reference in its entirety).

Figure 6:
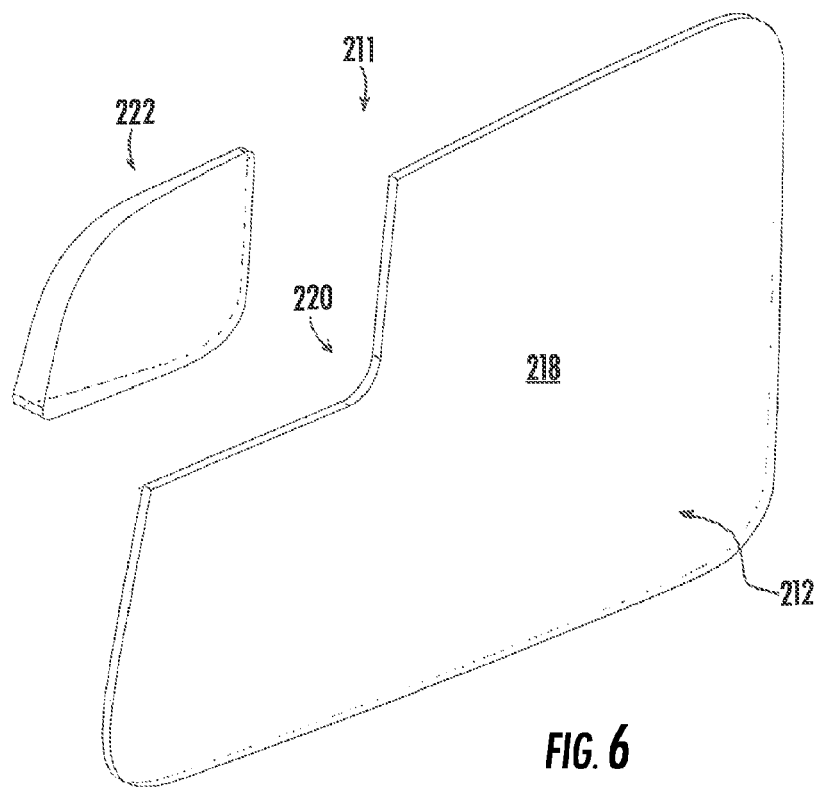
FIG. 6 is an exploded perspective view of another exterior mirror reflective element assembly in accordance with the present invention.
Figure 7:
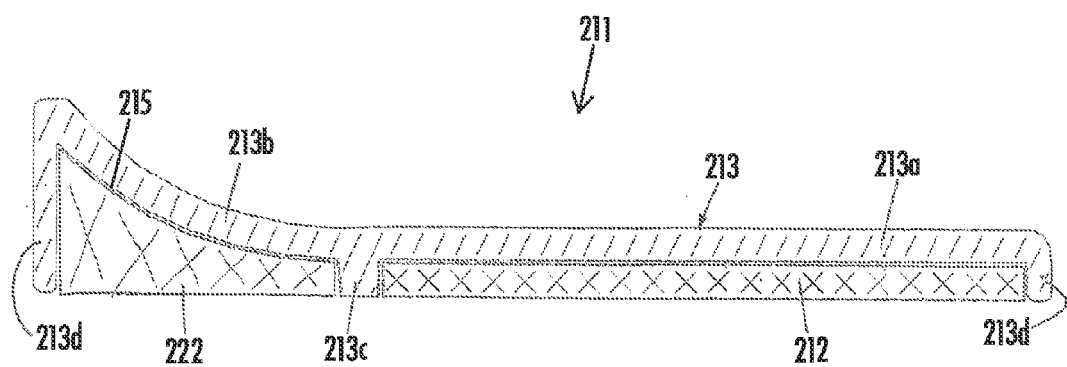
FIG. 7 is a sectional view of an exterior mirror reflective element assembly of the present invention.

Optionally, and with reference to FIGS. 6 and 7, a reflective element assembly 211 for an exterior rearview mirror assembly of a vehicle includes a generally planar main-viewing mirror reflector or reflective element 212 (if used in a driver-side complete exterior mirror assembly on a vehicle operated in the United States of America and subject to FMVSS 111; and if used in a passenger-side complete exterior mirror assembly on a vehicle operated in the United States of America, the main-viewing mirror reflector or reflective element 212 may be non-planar, and may have a convex curvature, such as a spherical curvature or a multi-radius curvature or the like) providing a first or principal mirror reflective element portion 218 and having a cutaway or auxiliary wide angle or notch portion 220, such as at a corner region of the reflective element 212 (and preferably at an outboard, upper corner or quadrant of the reflective element when reflective element assembly 211 is incorporated into a complete exterior mirror assembly as mounted on a vehicle and as normally viewed by the driver of the equipped vehicle). An auxiliary wide angle reflective element or reflective optic or lens 222 is disposed at the cutaway or notch region 220 and provides a wide angle-viewing "spotter" mirror at the reflective element assembly 211 with the front or first or outermost surface of the auxiliary blind-spot-viewing wide angle-viewing mirror element 222 being generally flush with or coplanar with the front or first surface of the main-viewing reflective element 212. The reflective element assembly 211 thus provides a spotter mirror at the reflective element with a generally flush or coplanar front surface as viewed by the driver and across both the reflective element and spotter mirror so as to provide an enhanced appearance and utility to the reflective element assembly 211.

As compared to prior art, the configuration of the first or front or outermost surface of wide angle element 211 in FIGS. 6 and 7 is at and generally coplanar with the front surface of the principal mirror reflective element 212 of the reflective element assembly 211, but wide angle element 211 is separate from and is not behind a portion of principal mirror reflective element 212. Thus, this embodiment of the present invention obviates any need for an anti-reflective coating at a wide angle reflector portion of the principal mirror substrate, since the wide angle element of the present invention is not disposed behind the glass (typically) principal mirror substrate. The reflective element 212 may have a reflector coating at its rear surface or at its front surface (or may be a third or fourth surface reflector electro-optic reflective element), while the wide angle element has a reflective coating or layer at its curved rear or second surface. It may desirable, depending on a particular vehicle type, that both the principal mirror reflective element and the wide angle element have their respective reflective coating or layer at the rear surface thereof or it may desirable that the principal mirror reflective element has its reflective coating or layer at the front or first surface thereof.

As shown in FIG. 7, an injection molded polymeric or plastic back plate 213 includes a generally planar mounting portion 213a that receives or partially receives and supports the generally planar main-viewing reflective element 212 and includes a generally curved mounting portion 213b that receives or partially receives and supports the curved rear or second surface of wide angle element 222 (such as utilizing aspects of the reflective element assemblies described in U.S. Pat. No. 6,522,451, which is hereby incorporated herein by reference in its entirety). In the illustrated embodiment of FIG. 7, mounting portion 213 has a generally planar backing portion 213a at the rear of the reflective element and a curved or angled backing portion 213b at the rear of the wide angle element 222, in order to accommodate the curved rear surface of the wide angle element 222. Mounting portion 213 includes a separation or demarcation portion or element 213c (that may be a separate element or may be integrally formed or molded with backing portions 213a, 213b) that is established between the adjacent or opposed perimeter edges of the wide angle element 222 and the cutaway portion 220 of the reflective element 212. The demarcation element 213c demarcates or delineates or distinguishes the wide angle element from the generally planar reflective element to enhance the discernibility of the wide angle element at the corner region of the reflective element assembly 211. Optionally, the mounting portion and/or demarcation element may include illumination means, such as may be provided by light piping or the like (or optionally, the wide angle element may be backlit or otherwise illuminated or partially illuminated), to enhance the discernibility and viewability of the wide angle element, such as in a similar manner as discussed above.

Mounting portion 213 may also include perimeter portions 213d that circumscribe the perimeter edges of the reflective element and the wide angle element. The perimeter portions 213d and the demarcation element 213c may also have front or outer surfaces that are generally coplanar with the front surface of the reflective element and the front surface of the wide angle element, thereby avoiding pockets or an exposed edge of the glass at the front surface of the mirror reflective element assembly where water and/or dirt may accumulate (optionally, the edges of the reflective element and/or wide angle element may be beveled or the like as is known in the mirror arts). A further advantage of having the front surface of the principal mirror substrate be coplanar with the front surface of the wide angle element substrate is that the driver perceives that the entire mirror surface viewed is flat, and thus the present invention enhances the driver's appreciation and the commercial value of the exterior rearview mirror reflective element, and enhances the cleaning process or wiping process of reflective element. The mirror reflective element assembly may utilize aspects of the reflective element assemblies discussed above or may utilize aspects of the reflective element assemblies described in U.S. Pat. Nos. 7,255,451; 7,195,381; 6,717,712; 6,522,451 and/or 7,126,456, which are hereby incorporated herein by reference in their entireties.

Thus, when designing rear portion 213b of the backing plate 213 to accommodate or receive auxiliary blind-spot viewing mirror element 222, the mirror optics of the blind spot mirror element 222 and the angling/orientation of the portion 213b are designed and/or engineered and/or configured so that the principal viewing axis of blind spot-viewing mirror element 222 is directed generally, and preferably mainly, to the blind spot region in a side lane where an overtaking vehicle might be found (and not to the likes of the sky or the distant horizon) when reflective element assembly 211 is used in a complete exterior mirror assembly mounted on the side of a vehicle and is being normally viewed by a driver of the equipped vehicle.

As shown in FIG. 7, and as discussed above, the reflective element assembly 211 comprises a back plate 213 (typically injection molded from a polymer resin and also including structure, such as known in the mirror art, for attachment to a mirror actuator when the reflective element assembly is used in an exterior rearview mirror assembly) that has (preferably at its upper outer quadrant) a receiving portion or pocket 213b for receiving the auxiliary wide angle reflective element 222. The receiving portion 213 may be formed to accommodate and/or receive the wide angle reflective element 222 (and may be formed or shaped to accommodate any desired or suitable shape of the wide angle reflective element, depending on the particular application of the mirror assembly). The receiving portion is configured to support and/or orient the wide angle reflective element with its principal viewing axis directed in a desired or appropriate or selected direction or orientation, such as to an outward and downward orientation, such as described in U.S. Pat. Nos. 6,522,451; 6,717,712 and 7,167,294, which are hereby incorporated herein by reference in their entireties.

The auxiliary wide angle blind spot-viewing reflective element 222 may be received in the receiving portion or pocket 213 and glued therein and thereto, such as via any suitable adhesive 215 disposed at the curved rear surface of the wide angle reflective element 222 and between the curved rear surface of the wide angle reflective element and the preferably curved backing portion or saddle portion 213b of the pocket or receiving portion 213 of the back plate 213. The adhesive may comprise any suitable adhesive and need not be an optical adhesive or the like, since the adhesive is disposed behind the reflector coating(s) at the rear surface of the wide angle reflective element and thus is not readily viewable by a person viewing the reflective element and wide angle reflective element when the reflective element assembly is normally mounted in an exterior rearview mirror assembly attached to the side of a vehicle, and is particularly not viewable through the wide angle reflective element for applications that have a substantially opaque or darkened coating or film or element disposed at the rear and/or perimeter surfaces of the wide angle reflective element, such as, for example, the wide angle reflective element that is shown in FIGS. 4E and 4F.

Because the adhesive is disposed rearward of the reflector of the auxiliary wide angle reflective element or mirror element and is not an optical adhesive disposed at the front surface of the auxiliary wide angle reflective element (and thus the manufacture of the reflective element assembly has greater tolerances for non-uniform application of the adhesive and/or existence of inclusion of bubbles or lint or the like in the adhesive and/or squeeze out of the adhesive), the assembly or manufacturing processes of the reflective element assembly are enhanced in this embodiment, and any potential concerns with scrapping entire reflective element assemblies due to non-uniformly distributed optical adhesive and the like are substantially reduced. This is particularly advantageous compared to the likes of the assembly of FIG. 7A (discussed below), where the reflective element assembly comprises an electrochromic reflective element assembly, which increases the losses/costs associated with the reflective element assembly being scrapped. Also, by disposing the adhesive behind the wide angle reflective element, the reflective element assembly provides a wider latitude in choices of adhesives, where the selected adhesive may comprise the likes of an epoxy adhesive, an acrylic adhesive, an acrylate adhesive or a urethane adhesive or the like (or other suitable adhesive or bonding material or compound), which may be filled or pigmented or colored or otherwise processed. Additionally, because the adhesive is to the rear of the reflector at the curved surface of the wide angle reflective element, the thickness or presence of the adhesive film will not detract from or impair or reduce the optical performance of the mirror reflector. Also, because the adhesive is disposed behind the wide angle reflective element, the adhesive is environmentally protected and is not exposed to ultraviolet (UV) radiation.

As shown in FIG. 7, the reflective element assembly 211 may have a generally flat outer surface, and thus may be suitable for use as a driver's side exterior mirror. As also shown in FIG. 7, the curved reflector-coated second or rear surface of the wide-angle blind spot-viewing auxiliary mirror element comprises a convex-curved reflector as viewed through the front surface of the mirror reflector, and may be a spherically convex-curved reflector or may be a multi-radius curvature reflector or the like. The side portion or perimeter portion 213d (at or at least partially around the wide angle reflective element) and demarcation element or portion 213c (which may be unitarily or integrally molded as part of the back plate and pocket or receiving portion) generally surround or encompass the perimeter of the wide angle reflective element, with the outermost surfaces of the side portion 213d, demarcation portion 213c, auxiliary wide angle reflective element 222 and main-viewing reflective element 212 all being generally flush or generally coplanar with one another so as to provide a generally flat or planar outer surface of the reflective element assembly. This facilitates the likes of ice removal or cleaning of the outer surfaces of the elements of the reflective element assembly, since the outer surfaces are generally coplanar. This also reduces or minimizes the likes of debris or dirt accumulation at the external or outer surface of the auxiliary wide angle reflective element. Although shown with a demarcation element disposed between the perimeter region of the auxiliary wide angle reflective element and the perimeter region of the main viewing reflective element, the receiving portion may not include such an inner wall or demarcation element, such that the adjacent perimeter regions of the auxiliary wide angle reflective element and the main viewing reflective element may abut one another, and preferably with little or no gap therebetween so as to provide a generally uniform front or outer surface of the reflective element assembly.

Optionally, and as is common for passenger side rearview mirror assemblies in vehicles in the U.S., the main viewing mirror reflective element may comprise a non-planar main viewing reflective element (and preferably a convex curved main viewing reflective element), and the radius of curvature of the front or outermost surface of the main viewing or principally reflecting reflective element preferably matches or generally corresponds to the radius of curvature of the front or outermost surface of the wide angle reflective element (with the outermost surfaces of the side portion and/or demarcation portion optionally likewise generally corresponding to the radii of curvature of the outer surface or surfaces of the adjacent element or elements). In such an application, the radius of curvature of the outer surface of the wide angle reflective element is larger than the radius of curvature of the rear or inner curved reflector surface of the wide angle reflective element, such that the wide angle reflective element provides a wider angle field of view than that of the main viewing reflective element to a person viewing the reflective element assembly. Optionally, the main viewing reflective element and/or the wide angle reflective element may comprise a polymer-based material, and may be injection molded or otherwise formed, or may comprise a glass molded element or an element formed by grinding and/or polishing a glass substrate or the like, while remaining within the spirit and scope of the present invention.

Optionally, a wide angle element may be incorporated into an electrochromic reflective element and may be disposed to the rear of the reflective element, such as in a similar manner as described above. Optionally, and with reference to FIG. 7A, a wide angle reflective element 222' may be disposed at the rear of a front substrate 212a' of an electrochromic reflective element 212' of a mirror reflective element assembly 211'. The electrochromic reflective element 212' includes the front substrate 212a' and a rear substrate 212b', with an electrochromic medium 212c' sandwiched between the front and rear substrates and at a principal reflecting region 218' of the reflective element 212'. In the illustrated embodiment, the rear substrate 212b' is cut away or formed to accommodate the wide angle element 222' so that the wide angle element 222' is disposed at the cut-away region 220' and has its forward face 222a' at the rear surface of the front substrate 212a'. Thus, the wide angle element may be disposed at a cutaway region and rearward of the front substrate and adjacent to the electrochromic medium and rear substrate, such that the mirror reflective element assembly does not provide a dimming function at the wide angle reflecting region. Optionally, however, a wide angle element may be disposed at the rear of a rear substrate of an electro-optic (such as electrochromic) reflective element so as to be disposed at a dimmable region of the reflective element, depending on the particular application and desired functionality of the mirror reflective element assembly.

Figure 7A:
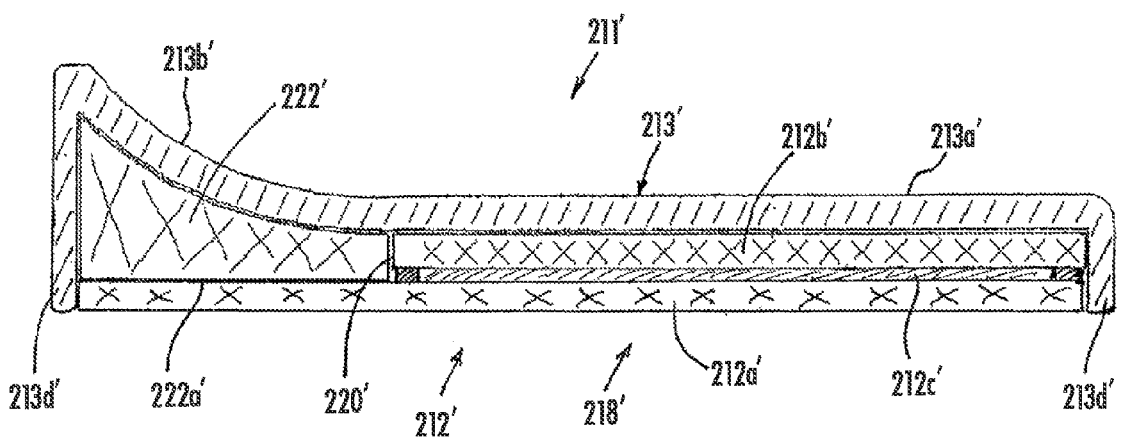
FIG. 7A is a sectional view of another exterior mirror reflective element assembly of the present invention.

As shown in FIG. 7A, the mirror reflective element assembly 211' may include a back plate or mounting portion 213' at the rear of the rear substrate 212b' and wide angle element 222', such as described above. In a similar manner as described above with respect to FIG. 7, the back plate 213' may include a separation or demarcation portion or element (that may be a separate element or may be integrally formed or molded with backing portions 213a', 213b' of back plate or mounting portion 213') that is established between the adjacent or opposed perimeter edges of the wide angle element 222' and the cutaway portion or edge 220' of the rear substrate 212b' of reflective element 212'. As discussed above, the demarcation element may demarcate or delineate or distinguish the wide angle element from the generally planar principal reflecting region of the reflective element to enhance the discernibility of the wide angle element at the wide angle reflecting region of the mirror reflective element assembly 211'.

Optionally, the mounting portion and/or demarcation element may include illumination means, such as light piping or the like (or optionally, the wide angle element may be backlit or otherwise illuminated or partially illuminated), to enhance the discernibility and viewability of the wide angle element, such as in a similar manner as discussed above. Optionally, the mirror reflective element assembly may otherwise include other demarcation means or elements, such as a demarcation element or line established at a perimeter region of the front surface of the wide angle element or at the rear surface of the front substrate (and at or corresponding to the perimeter region or regions of the wide angle element), or the demarcation means may comprise a transparent sheet disposed between the wide angle element and the front substrate, and with a dark ring established at the transparent sheet and generally at and/or around the perimeter region of the wide angle element. As shown in FIG. 7A, the mounting portion 213' may include perimeter portions 213d' that circumscribe the perimeter edges of the reflective element and the wide angle element, such as described above, or optionally, the mounting portion may comprise a frameless mounting portion or the like.

Optionally, and with reference to FIGS. 8A and 8B, a wide angle element 222" (that preferably is a Platzer-type auxiliary mirror that follows the teaching of PCT International Publication WO 01/81956 to George E. Platzer Jr. entitled "Compound Automotive Rearview Mirror", the entire disclosure of which is hereby incorporated by reference herein) may be disposed at the rear of a front substrate 212a" of an electrochromic reflective element 212" of a mirror reflective element assembly 211". The electrochromic reflective element 212" includes the front substrate 212a" and a rear substrate 212b", which are spaced apart and sealed together via a perimeter seal 212d" disposed around the perimeter of the rear substrate 212b", with an electrochromic medium 212c" sandwiched between the front and rear substrates and at a principal reflecting region or electro-optic active region 218" of the reflective element 212". In the illustrated embodiment, the rear substrate 212b" is cut away or formed to accommodate the wide angle element 222" so that the wide angle element 222" is disposed at the cut-away region 220" and has its forward face 222a" at the rear surface of the front substrate 212a", such as in a similar manner as described above. Alternatively, other wide angle constructions or designs can be used, such as are known in the mirror arts.

As shown in FIG. 8B, the mirror reflective element assembly 211" includes a transparent conductor 230" (such as ITO or the like) disposed at the rear surface of the front substrate and a reflector or reflector coating 232" (such as a metallic reflector coating) disposed at the front surface of the rear substrate. As also shown in FIG. 8B, mirror reflective element assembly 211" includes a cross border or border band or separating or demarcating or hiding or bordering or framing or outlining layer or element or coating or strip or band 234" (that may be an at least substantially opaque or partially opaque or a metal thin film reflective coating) that is established at the perimeter edge regions of the front substrate and along the perimeter seal 212d" (and thus around the electro-optic active region 218") so as to outline or demarcate or border or at least partially obscure from direct view the perimeter of the wide angle element 222". The hiding layer 234" (such as a metallic reflective layer, such as, for example, a chromium metallic reflective layer or the like) may be disposed on the transparent conductor 230" at the rear (second) surface of the front substrate 212a" (or optionally may be disposed beneath the transparent conductor and between the transparent conductor and the rear or second surface of the front substrate).

The hiding layer 234" thus may mask or hide from direct view of the driver the seal and/or other components or elements of the mirror reflective element assembly construction that are to the rear of the front substrate and in the area of the bordering or hiding layer or element. The hiding layer thus serves as a demarcation element and a hiding or occluding element for the wide angle mirror element disposed behind the glass substrate at the wide angle reflecting region of the mirror reflective element assembly. The hiding layer 234" and mirror reflective element assembly 211" may utilize aspects of the mirror assemblies described in U.S. Pat. Nos. 7,274,501; 7,255,451; and/or 7,184,190; and/or U.S. patent application Ser. No. 11/226,628, filed Sep. 14, 2005 and published Mar. 23, 2006 as U.S. Publication No. 2006/0061008; and/or Ser. No. 11/912,576, filed Oct. 25, 2007, now U.S. Pat. No. 7,626,749 and PCT Application No. PCT/US2006/018567, filed May 15, 2006, and published Nov. 23, 2006 as International Publication No. WO 2006/124682; and/or U.S. provisional applications, Ser. No. 61/040,902, filed Mar. 31, 2008; Ser. No. 61/048,687, filed Apr. 29, 2008; and/or Ser. No. 61/050,810, filed May 6, 2008, which are hereby incorporated herein by reference in their entireties. As discussed above, the hiding layer or demarcation element may demarcate or delineate or distinguish or frame the wide angle element from the generally planar principal reflecting region of the reflective element to enhance the discernibility of the wide angle element at the wide angle reflecting region of the mirror reflective element assembly 211", while hiding the perimeter seal of the electro-optic mirror reflective element assembly. For example, the demarcation element or band or layer may provide different optical characteristics or reflecting characteristics or qualities as compared to the reflectance of the principal reflecting region and/or the wide angle reflecting region of the mirror reflective element assembly.

Optionally, and with reference to FIGS. 9A and 9B, the electro-optic mirror reflective element assembly 211''' may have a hiding layer 234''' disposed at the rear surface of the front substrate 212a''' and beneath the transparent conductor 230''' (with the transparent conductor 230''' overcoating the hiding layer or layers 234'''). In the illustrated embodiment, the hiding layer is disposed along the rear surface of the front substrate 212a''' and along the perimeter seal 212d''' so as to hide or substantially hide or conceal the perimeter seal and to border or outline the principal reflecting region or electro-optic active region 218''' and to partially outline or border or demarcate the wide angle element 222''', as can be seen with reference to FIG. 9A. Mirror reflective element assembly 211''' may otherwise be substantially similar to mirror reflective element assembly 211", discussed above, such that a detailed discussion of the mirror reflector assemblies need not be included herein.

Figure 10C:
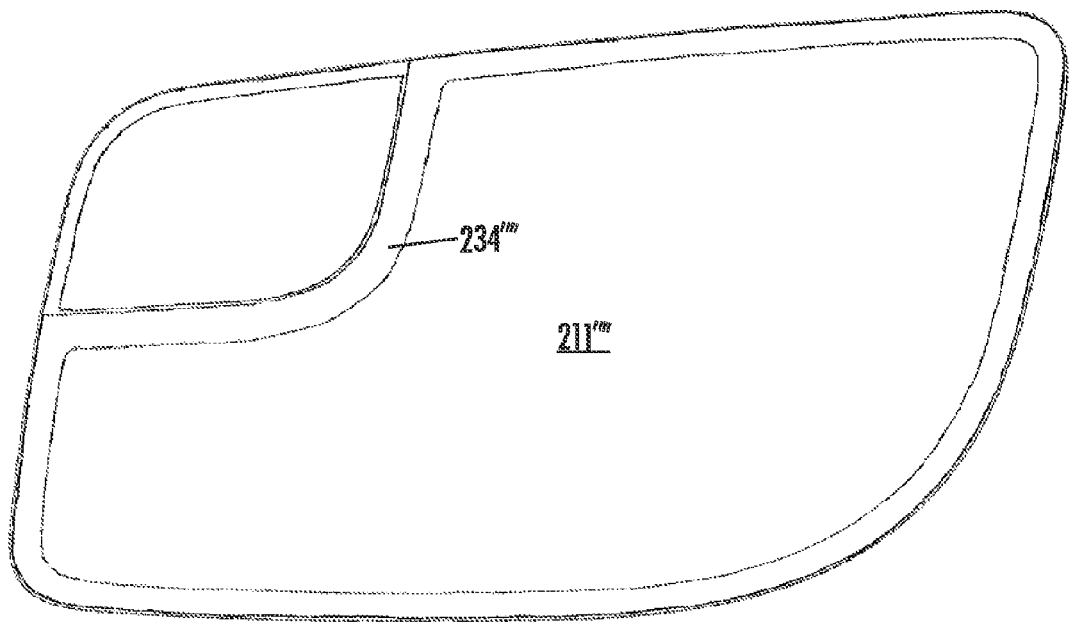
FIGS. 10C and 10D are front perspective views of the mirror reflective element assembly of FIGS. 10A and 10B.
Figure 10D:
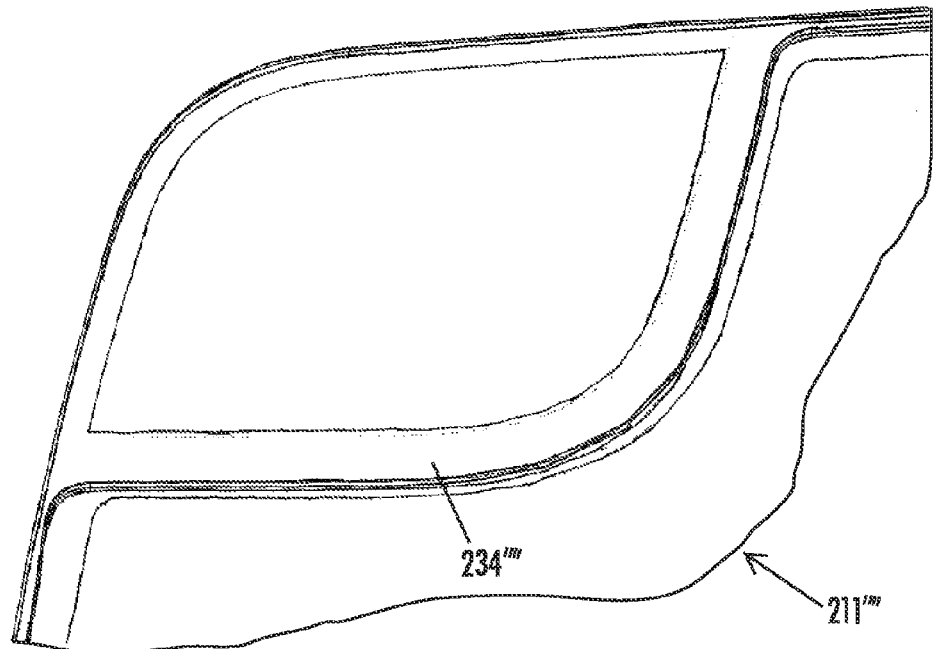
Figure 10E:
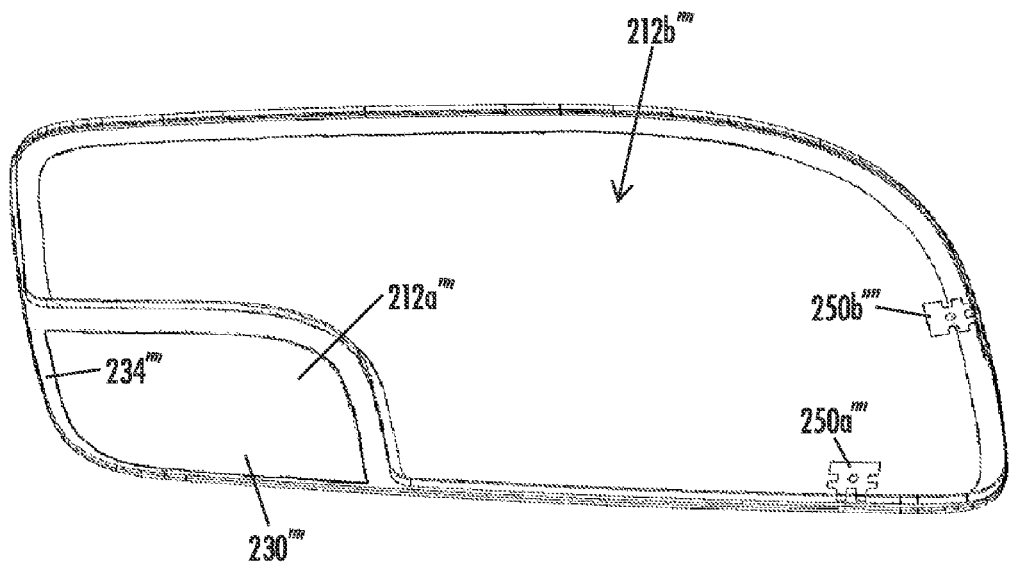
FIGS. 10E and 10F are rear perspective views of the mirror reflective element assembly of FIGS. 10A and 10B, showing the cutaway of the rear substrate for receiving the wide angle reflector element behind a portion of the front substrate.
Figure 10F:
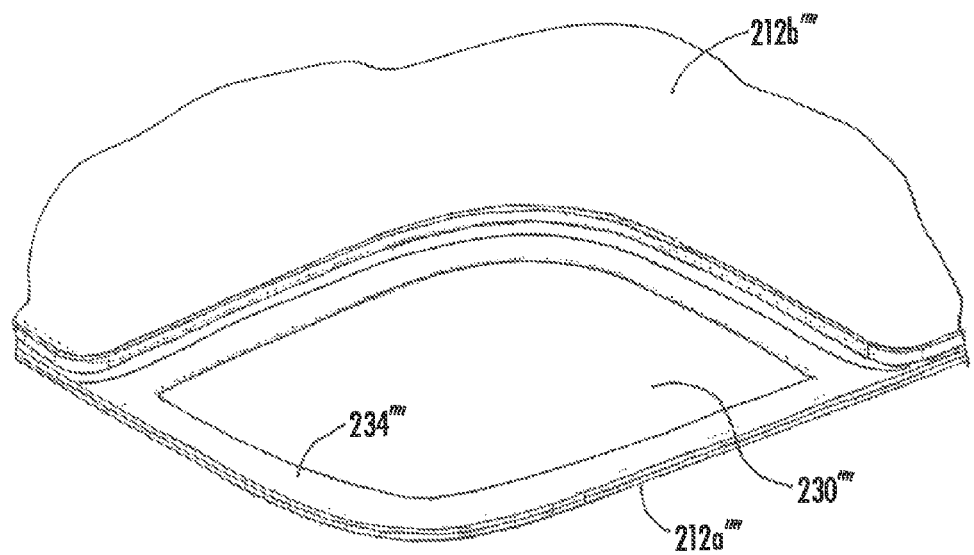
Figure 10G:
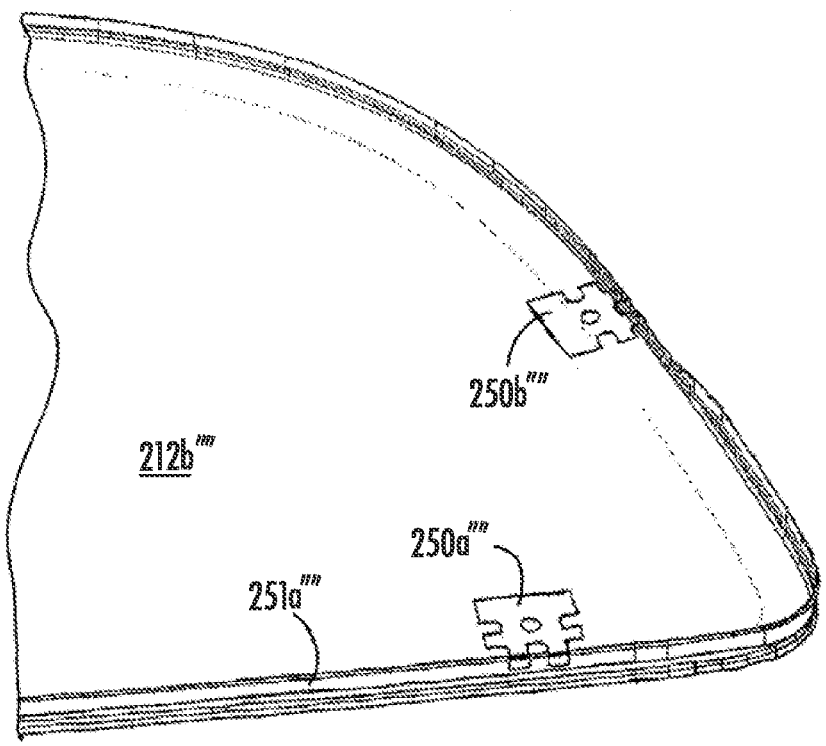
FIGS. 10G and 10H are rear perspective views of the mirror reflective element assembly of FIGS. 10A and 10B, showing the electrical connectors established at the rear or fourth surface of the rear substrate and in electrical connectivity with the third surface reflector (FIG. 10G) and the second surface transparent conductor (FIG. 10H)
Figure 10H:
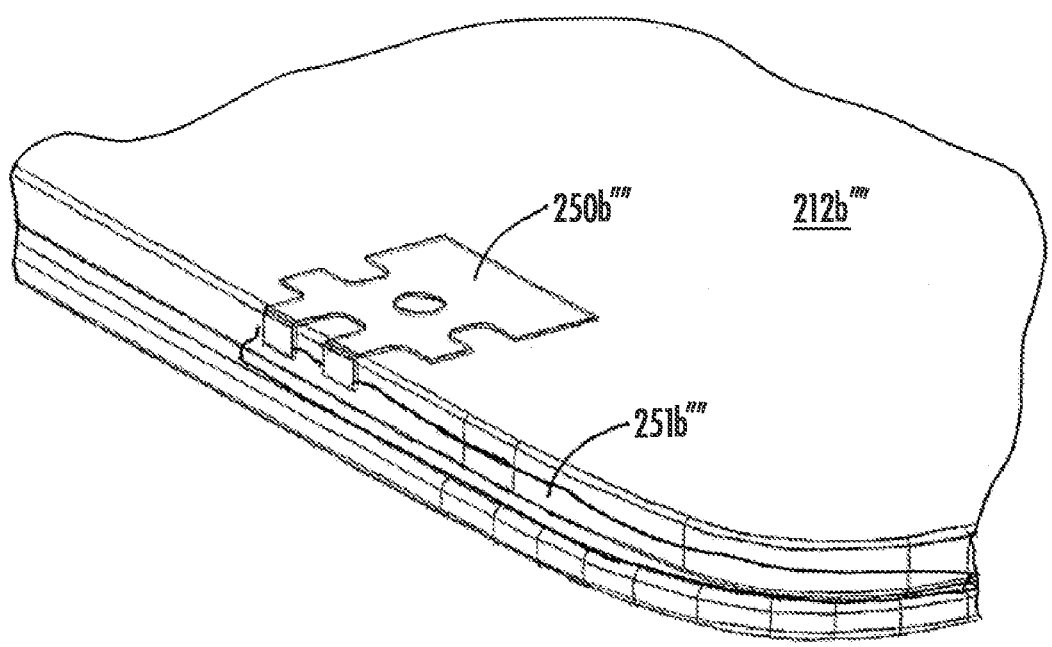

Optionally, and with reference to FIGS. 10A-H, the electro-optic mirror reflective element assembly 211'''' may have a hiding layer 234'''' disposed at the rear surface of the front substrate 212a'''' and over the transparent conductor 230''''. In the illustrated embodiment, the hiding layer is disposed along the rear surface of the front substrate 212a'''' and along the perimeter seal 212d'''' so as to border or outline the principal reflecting region or electro-optic active region 218'''' and to border or outline the wide angle element 222'''', as can be seen with reference to FIG. 8A, while functioning to hide or substantially hide or conceal the perimeter seal (and other components or elements of the mirror reflective element assembly construction that may be to the rear of the front substrate). As shown in FIG. 10B, the third surface reflector coating or coatings or layers 232" may comprise a thin ruthenium film 232a" disposed on a thin chromium film 232b", with the films 232a", 232b" being disposed at least partially over a cut edge region of the rear substrate so as to at least partially wrap around the edge of the substrate. A fourth surface wraparound coating or layer 235'''' (such as a thin metallic film 235a'''', such as a thin ruthenium film or the like, and a thin metallic film 235 b'''', such as a thin chromium film or the like) may be disposed over a portion of the rear surface of the rear substrate and the edge of the substrate and in contact with the third surface wraparound layer or layers so as to establish conductive continuity between the front (third) and rear (fourth) surfaces of the rear substrate. Mirror reflective element assembly 211"" may otherwise be substantially similar to mirror reflective element assembly 211" and/or 211''', discussed above, such that a detailed discussion of the mirror reflector assemblies need not be included herein.

Although shown and described as providing a demarcating line or border element or line around a wide angle element of an exterior rearview mirror reflective element assembly, it is envisioned that aspects of the reflector assemblies described above and below may be suitable for application to other elements or components or devices or accessories, such as to border or demarcate a perimeter region of a display element (such as a video display device or element or an information display device or element or an iconistic display device or element or the like) of the mirror reflective element assembly. Optionally, aspects of the reflector assemblies described above and below may be suitable for application to interior rearview mirror reflector assemblies, such as for bordering or demarcating a perimeter region of a wide angle reflector element or a display element (such as a video display device or element or an information display device or element or an iconistic display device or element or the like) at an interior rearview mirror assembly of a vehicle.

As shown in FIGS. 10E-H, electrical connectors 250a"", 250b"" may be established at the rear or fourth surface of the rear substrate of the mirror reflective element assembly 211"". For example, connector 250a"" may be disposed at the fourth surface and may electrically connect to a conductive bead or coating 251a"" (FIG. 10O) at the fourth surface that contacts and establishes conductive continuity to the fourth surface wraparound coating to establish conductive continuity to the third surface metallic reflector. Also, connector 250b"" may be disposed at the fourth surface and may electrically connect to a conductive bead or coating 251b"" (FIG. 10H) at the second surface of the front substrate that contacts and establishes conductive continuity to the transparent conductor at the second surface of the front substrate.

Because it is not uncommon to equip a vehicle with a driver side electro-optic or electrochromic exterior rearview mirror element and to utilize a non-electrochromic or conventional passenger side mirror element, it may be desirable to utilize aspects of the mirror assemblies described in U.S. patent application Ser. No. 11/912,576, filed Oct. 25, 2007, now U.S. Pat. No. 7,626,749, and PCT Application No. PCT/US2006/018567, filed May 15, 2006, and published Nov. 23, 2006 as International Publication No. WO 2006/124682, which are hereby incorporated herein by reference in their entireties. For example, a passenger side mirror (typically a convex bent mirror element or substrate) may be utilized with a wide angle element such as of the construction described above, with the likes of a silicon coating transflector (or other suitable reflector coating or the like) at the rear surface of the substrate. The substrate may be masked at the wide angle element region during the reflector coating process, and the hiding or demarcating layers or bands may be established around the perimeter of the substrate and around the border or perimeter of the wide angle reflecting region, with the reflector (such as a silicon layer or the like) deposited over the principal reflecting region of the mirror element and up to or partially over the demarcating layers or bands. Thus, the appearance of the driver side electro-optic mirror may generally or substantially match the appearance of the passenger side non-electro-optic mirror when such a combination of mirrors is implemented on a vehicle.

Figure 11A:
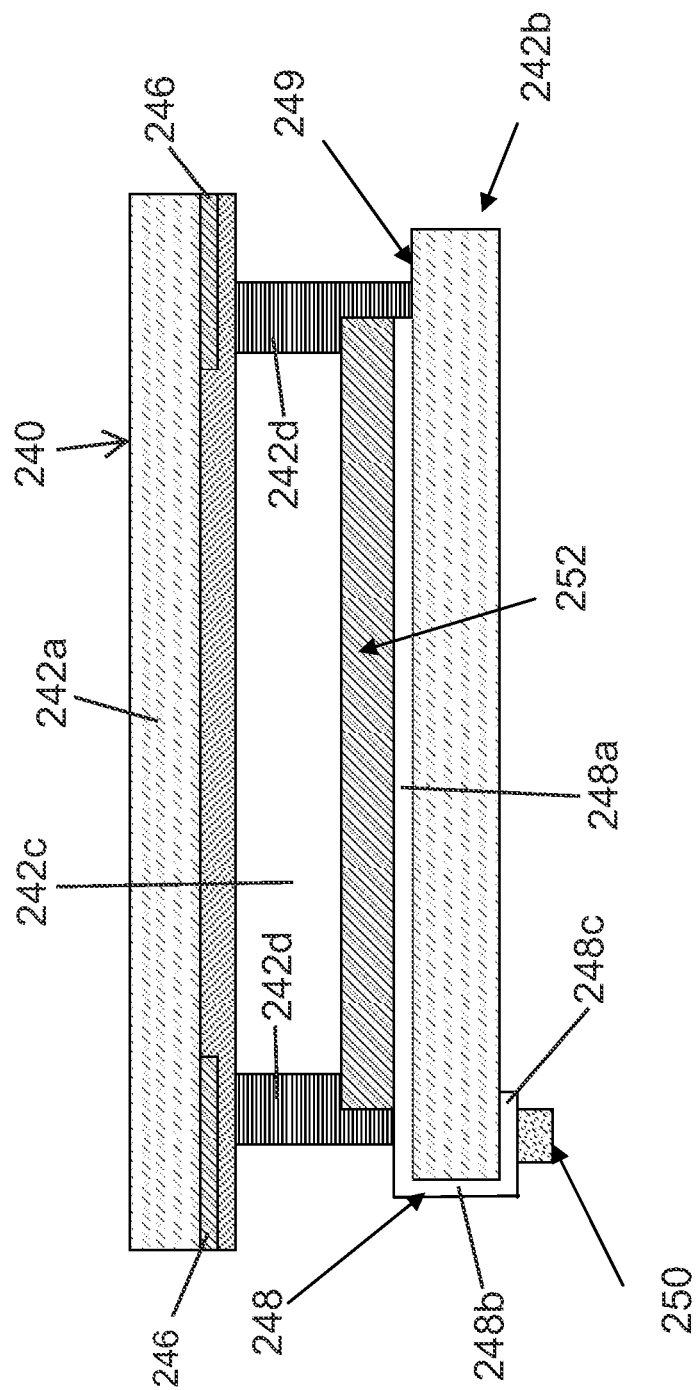
FIG. 11A is a sectional view of another exterior mirror reflective element assembly of the present invention.

Optionally, and with reference to FIG. 11A, an exterior electro-optic mirror reflective element assembly 240 may include a front substrate 242a and a rear substrate 242b, with an electro-optic (such as electrochromic) medium 242c disposed therebetween and sealed via a perimeter seal 242d. The front substrate 242a includes a transparent conductor 244 disposed at its rear surface and may include a hiding layer or perimeter band 246 disposed at its rear surface and around the perimeter region of the front substrate (with the perimeter band being disposed between the transparent conductor 244 and the rear surface of the front substrate as shown or optionally over the transparent conductor 244). Optionally, the mirror reflective element assembly 240 may include a wide angle optic, such as discussed above, or a display device or element or other accessory or accessories.

The rear substrate 242b includes a transparent conductor 248 disposed at its front surface, with the transparent conductor 248 comprising a third surface coating portion 248a disposed over the front or third surface of the rear substrate and disposed to a perimeter edge of the rear substrate 242b and a wraparound portion 248b disposed over the cut edge of the rear substrate and a fourth surface coating portion 248c disposed at least partially over the rear or fourth surface of the rear substrate 242b so as to provide a wraparound conductive coating that provides electrical continuity between the front and rear surfaces of the rear substrate 242b. A conductive epoxy 250 may be established at the rear or fourth surface of the rear substrate 242b to enhance electrical connection to the transparent fourth surface wraparound conductive coating 248. As can be seen in FIG. 11A, the transparent conductor 248 is not disposed to the perimeter edge at other edge regions of the rear substrate, such that there is an exclusion zone or non-conductive raceway 249 at the perimeter edge regions of the front surface of the rear substrate, except at where the wraparound coating 248a is disposed. The exclusion zone 249 may be established by masking the perimeter regions during the coating or deposition process or by laser ablating or deletion or by fixturing or by otherwise removing the transparent conductor in those regions.

The rear substrate 242b includes a reflector coating 252 disposed at its rear surface and over a portion of the third surface transparent conductor portion 248a. As can be seen in FIG. 11A, the reflector coating is disposed only over the transparent conductor in the area bounded by the perimeter seal 242d, such that the transparent conductor 248 does not extend beyond the seal 242d toward the perimeter region of the rear substrate. Thus, the reflector coating 252 (such as an ISI stack of coatings or ITO-silver-ITO stack of coatings or other stack of metallic coatings or the like) is not exposed at the outer portions of the seal and is entirely sealed within the perimeter seal.

Optionally, and with reference to FIG. 11B, an exterior mirror reflective element assembly 240' may be similar to mirror reflective element assembly 240, discussed above, with a transparent conductor coating 248' disposed at the front or third surface of the rear substrate 242b' and at least partially at the fourth or rear surface of the rear substrate and at least partially over an edge of the rear substrate, and with the third surface reflector coating 252' disposed over a central or principal reflecting region of the transparent conductor coating. In the illustrated embodiment, the third surface reflector coating comprises a silver based reflector coating 252a' disposed on the third surface portion 248a' of the transparent conductor portion 248' and a transparent conductor passivation layer 252b' disposed over the silver based reflector coating 252a'. As discussed above, the reflector coatings 252' are established at the third surface of the rear substrate and are bounded by or surrounded by the perimeter seal 242d'. Thus, the silver based reflector coating 252a' is sealed within the perimeter seal boundary and coated or covered by the passivation layer 252b' (such as an ITO coating or an AZO coating or the like) such that the silver based reflector coating is substantially not exposed to the electro-optic medium and/or to the exterior of the mirror reflective element assembly. The silver based reflector coating may comprise a transflective coating or a substantially reflective and substantially non-transmissive coating, depending on the particular application of the mirror reflective element assembly. Mirror reflective element assembly 240' may otherwise be similar to mirror reflective element assembly 240, discussed above, such that a detailed discussion of the mirror reflector assemblies need not be included herein. Optionally, as can be seen in FIG. 11B, the front substrate 242a' may have its perimeter edges ground or otherwise processed or seamed to provide an enhanced appearance to the front substrate and to limit sharp edges and the like at the front substrate of the mirror reflective element assembly.

Figure 11C:
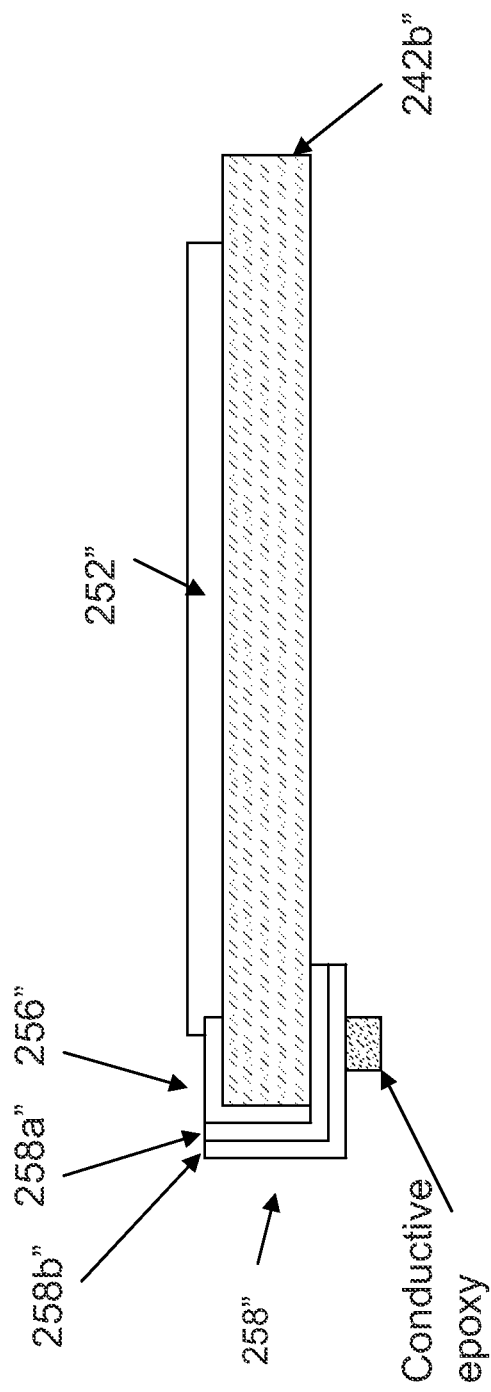
FIG. 11C is a sectional view of a rear substrate of an exterior mirror reflective element assembly of the present invention.

Optionally, and with reference to FIG. 11C, a rear substrate 242b" of an electro-optic mirror reflective element assembly may have a mirror reflector coating 252" (such as an ITO-silver-ITO (ISI) stack of coatings or the like) disposed at the front or third surface of the rear substrate. The reflector coating 252" may be disposed at the central region or principal reflecting region of the mirror reflective element assembly, and a perimeter region of the mirror reflector coating 252" may contact or overlap (or be overlapped by) a third surface wraparound coating 256" (such as a metallic coating, such as a layer of chromium or the like), which is disposed over a perimeter region of the rear substrate and the cut edge of the rear substrate. A fourth surface wraparound coating 258" (such as a coating comprising a thin chromium layer 258a" and a thin ruthenium layer 258b") is disposed over a portion of the fourth surface and over the edge of the substrate so as to contact and establish conductive continuity to the third surface wraparound coating 256" and thus to the reflector coating 252". A conductive epoxy may be established at the rear of the substrate and may contact the fourth surface wraparound layer or coating 258".

Figure 12C:
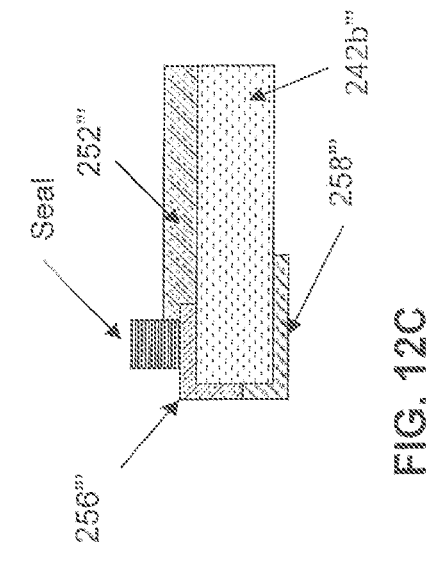
FIGS. 12A-C are views of another exterior mirror reflective element assembly of the present invention.
Figure 12A:
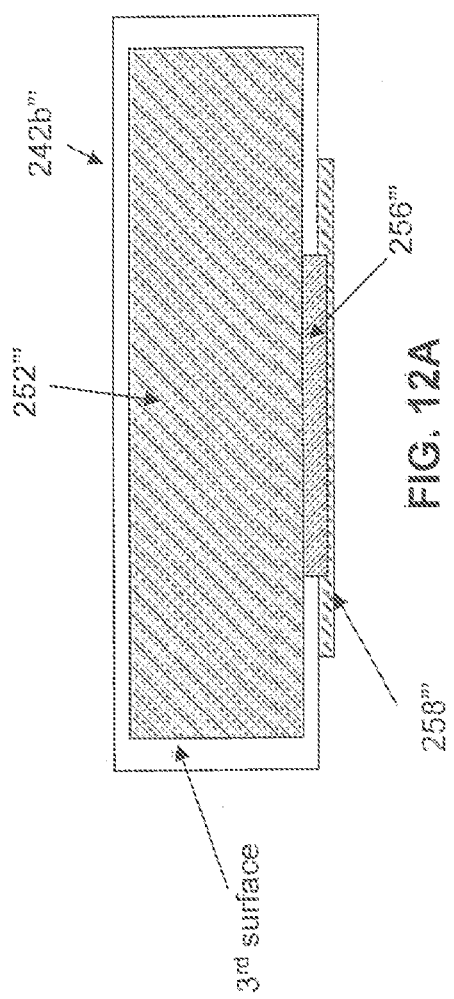
Figure 12B:
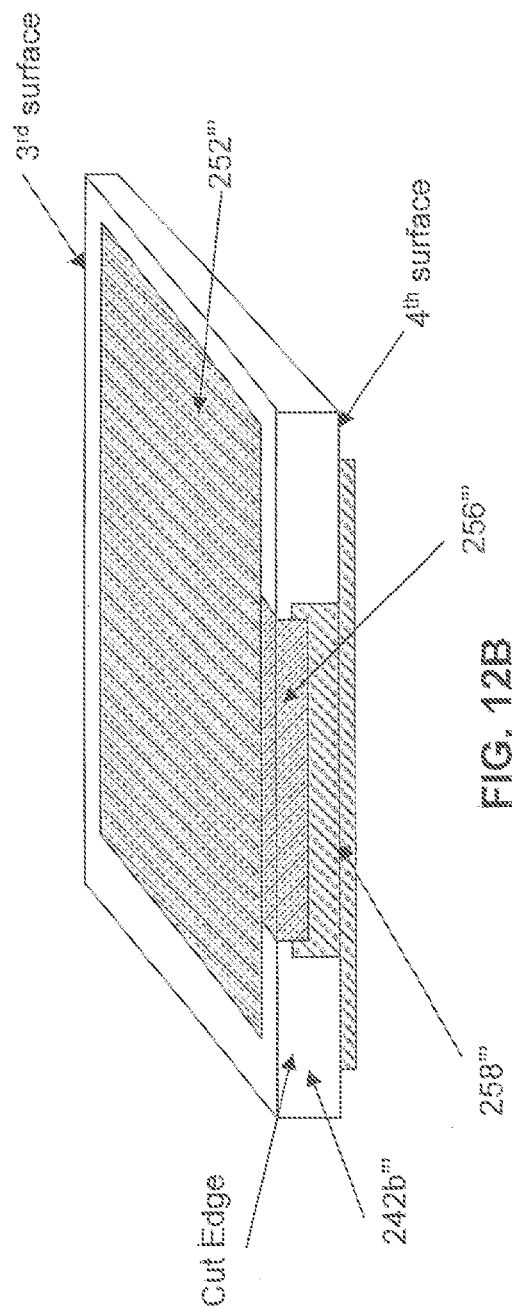

Optionally, and with reference to FIGS. 12A-C, a rear substrate 242b''' of a mirror reflective element assembly (which may be suitable for use in an exterior rearview mirror or an interior rearview mirror) has a third surface reflector coating or coatings 252''' (such as a silver or silver alloy metallic thin film or coating or layer) disposed at the principal reflecting region of the mirror, with the perimeter regions of the front surface or third surface of the rear substrate being devoid of the metallic reflector coating. A third surface wraparound coating 256''' (such as a transparent conductor, such as ITO or the like) is disposed at a perimeter region of the rear substrate and over the cut edge of the rear substrate proximate the perimeter region. A fourth surface wraparound coating 258''' (such as a transparent conductor, such as ITO or the like) is disposed at a perimeter region of the rear surface of the rear substrate and over the cut edge of the rear substrate at the wraparound coating 256''' so as to contact and establish conductive continuity to the third surface wraparound coating 256''' and thus to the reflector coating 252". Thus, conductive continuity is established between an electrical connection at the fourth surface of the rear substrate and the metallic reflector coating at the third surface of the rear substrate, with no metallic coating or material disposed outboard of the perimeter seal (because the third and fourth surface wraparound coatings comprise transparent conductors, such as ITO or ATO or the like). The third and fourth surface wraparound coatings may be independently established or coated or deposited on the respective surfaces and edge or both sides and the edge may be coated during the same deposition or coating process, such as by utilizing a two-sided coating process, such as by utilizing aspects of the mirror processes described in U.S. Pat. No. 7,255,451, which is hereby incorporated herein by reference in its entirety.

Optionally, conductive electrode coated glass substrates are commercially available from various sources. For example, tin oxide-coated glass substrates, known as "TEC-Glass" products, may be obtained from Libbey-Owens-Ford Co., LOF Glass Division, Toledo, Ohio, and such as described in U.S. Pat. No. 7,004,592, which is hereby incorporated herein by reference in its entirety. Such "TEC-Glass" products are manufactured by an on-line chemical vapor deposition process that pyrolytically deposits onto clear float glass a multi-layer thin film structure, which includes a microscopically thin coating of fluorine-doped tin oxide (having a fine grain uniform structure) with additional undercoating thin film layers disposed between the fluorine-doped tin oxide layer and the underlying glass substrate. The "TEC-Glass" substrates may be available in different thicknesses, such as 2 thick or 3 mm thick glass substrates and/or the like.

Optionally, the mirror assembly and/or mirror reflective element assembly or sub-assembly may include a back plate that includes a perimeter framing portion or bezel portion that extends around the perimeter edges of the reflective element to support the reflective element and frame the reflective element at the mirror assembly (such as by utilizing aspects of the mirror assemblies described in U.S. patent application Ser. No. 11/520,193, filed Sep. 13, 2006, now U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflector sub-assembly may comprise a bezelless or frameless reflective element (such as the types described in U.S. Pat. No. 7,184,190; and/or U.S. patent application Ser. No. 11/226,628, filed Sep. 14, 2005 and published Mar. 23, 2006 as U.S. Publication No. 2006/0061008; and/or Ser. No. 11/021,065, filed Dec. 23, 2004, now U.S. Pat. No. 7,255,451, and/or PCT Application No. PCT/US2006/018567, filed May 15, 2006 and published Nov. 23, 2006 as International Publication No. WO 2006/124682, which are hereby incorporated herein by reference in their entireties), whereby the back plate may not include a perimeter framing portion or bezel portion around the perimeter of the reflective element.

As stated above, the reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,195,381; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. 2006/0061008; and/or PCT Application No. PCT/US2006/018567, filed May 15, 2006 and published Nov. 23, 2006 as International Publication No. WO 2006/124682, and/or European Patent Application No. EP0728618, filed Dec. 8, 1995 and published Aug. 28, 1996; and/or European Patent Application EP0729864, filed Dec. 11, 1995 and published Sep. 4, 1996; and/or Australian Patent Application AU4031795, filed Dec. 11, 1995 and published Feb. 8, 1996, and/or Australian Patent Application AU4031895, filed Dec. 11, 1995 and published Aug. 29, 1996, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 7,274,501; 5,910,854 and 6,420,036, and in PCT Application No. PCT/US03/29776, filed Sep. 9, 2003, which are all hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993, 302, filed Nov. 19, 2004, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,274,501 and 7,184,190; and/or PCT Application No. PCT/US03/29776, filed Sep. 19, 2003; and/or PCT Application No. PCT/US03/35381, filed Nov. 5, 2003; and/or U.S. patent application Ser. No. 11/021,065, filed Dec. 23, 2004 by McCabe et al. for ELECTRO-OPTIC MIRROR CELL, now U.S. Pat. No. 7,255,451; Ser. No. 11/226,628, filed Sep. 14, 2005 and published Mar. 23, 2006 as U.S. Publication No. 2006/0061008, which are all hereby incorporated herein by reference in their entireties. Optionally, the reflective element may include indicia formed at and viewable at the reflective element, such as by utilizing aspects of the reflective elements described in PCT Application No. PCT/US2006/018567, filed May 15, 2006 and published Nov. 23, 2006 as International Publication No. WO 2006/124682; and U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface. The mirror assembly thus may comprise a prismatic mirror assembly or planar or non-planar mirror or other mirror having a single substrate reflective element, such as a mirror assembly utilizing aspects of the mirror assemblies described in U.S. Pat. Nos. 6,318,870; 6,598,980; 5,327, 288; 4,948,242; 4,826,289; 4,436,371 and 4,435,042; and PCT Application No. PCT/US04/015424, filed May 18, 2004; and U.S. patent application Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in U.S. Pat. No. 7,274,501, and/or PCT Application No. PCT/US03/29776, filed Sep. 19, 2003; U.S. patent application Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004, which are all hereby incorporated herein by reference in their entireties.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 7,274,501; 7,184,190; 7,195,381; 6,690,268; 5,668,663 and/or 5,724,187, and/or in U.S. patent application Ser. No. 10/538,724, filed Jun. 13, 2005 and published Mar. 9, 2006 as U.S. Publication No. 2006/0050018; Ser. No. 11/284,543, filed Nov. 22, 2005, now U.S. Pat. No. 7,370,983; and/or Ser. No. 11/021,065, filed Dec. 23, 2004, now U.S. Pat. No. 7,255,451; and/or PCT Application No. PCT/US03/29776, filed Sep. 9, 2003; and/or PCT Application No. PCT/US03/35381, filed Nov. 5, 2003; and/or PCT Application No. PCT/US03/40611, filed Dec. 19, 2003, which are all hereby incorporated herein by reference in their entireties, or may include or incorporate video displays or the like, such as the types described in PCT Application No. PCT/US03/40611, filed Dec. 19, 2003, and/or U.S. patent application Ser. No. 10/538,724, filed Jun. 13, 2005 and published Mar. 9, 2006 as U.S. Publication No. 2006/0050018; and/or Ser. No. 11/284,543, filed Nov. 22, 2005, now U.S. Pat. No. 7,370,983; and/or U.S. provisional applications, Ser. No. 60/630,061, filed Nov. 22, 2004; and Ser. No. 60/667,048, filed Mar. 31, 2005, which are hereby incorporated herein by reference in their entireties.

Optionally, the mirror reflective element may comprise a transflective display on demand reflective element that is partially transmissive and partially reflective, so that the light emanating from the display element may be transmitted through the reflective element when an illumination source is activated, but the display is substantially non-visible or viewable when the illumination source is deactivated. Optionally, the mirror reflective element may comprise a single substrate or non-electro-optic reflective element, with the auxiliary wide angle reflector portion being integrally formed or established at a rear surface of the reflective element, while remaining within the spirit and scope of the present invention. For example, the reflective element may utilize aspects of the reflective elements described in U.S. Pat. Nos. 7,274,501; 7,184,190; 6,690,268; 5,668,663 and/or 5,724,187, and/or in U.S. patent application Ser. No. 10/993,302, filed Nov. 19, 2004, now U.S. Pat. No. 7,338,177; and/or Ser. No. 11/021,065, filed Dec. 23, 2004, now U.S. Pat. No. 7,255,451, which are all hereby incorporated herein by reference in their entireties.

Optionally, the mirror assembly may include a blind spot indicator and/or a turn signal indicator, such as an indicator or indicators of the types described in U.S. provisional applications, Ser. No. 60/985,446, filed Nov. 5, 2007; Ser. No. 61/019,478, filed Jan. 7, 2008; Ser. No. 60/853,850, filed Oct. 24, 2006; Ser. No. 60/918,089, filed Mar. 15, 2007; and/or Ser. No. 60/970,687, filed Sep. 7, 2007, and/or U.S. Pat. Nos. 6,198,409; 5,929,786 and 5,786,772, and/or PCT Application No. PCT/US2006/026148, filed Jul. 5, 2006, and/or PCT Application No. PCT/US07/82099, filed Oct. 22, 2007, which are hereby incorporated herein by reference in their entireties. The signal indicator or indication module may include or utilize aspects of various light modules or systems or devices, such as the types described in U.S. Pat. Nos. 6,227,689; 6,582,109; 5,371,659; 5,497,306; 5,669,699; 5,823,654; 6,176,602; and/or 6,276,821, and/or U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786 and 5,786,772, and/or U.S. patent application Ser. No. 11/315,675, filed Dec. 22, 2005, now U.S. Pat. No. 7,720,580; and/or PCT Application No. PCT/US2006/026148, filed Jul. 5, 2006, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786 and/or 5,786,772, and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/638,687, filed Dec. 23, 2004; Ser. No. 60/628,709, filed Nov. 17, 2004; Ser. No. 60/614,644, filed Sep. 30, 2004; and/or Ser. No. 60/618,686, filed Oct. 14, 2004, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005, now U.S. Pat. No. 7,526,103; and/or U.S. provisional application Ser. No. 60/607,963, filed Sep. 8, 2004, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999, now U.S. Pat. No. 7,339,149, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

Optionally, the turn signal indicator or module and/or blind spot indicator or module may comprise a hollow light tunnel that homogenizes light from a point source by the light entering one end of the tunnel and reflecting multiple times off of internal mirror surfaces within the tunnel and exiting the tunnel in a highly uniform state, and thus providing a high quality, uniform projection and/or illumination. Such a hollow light tunnel is commercially available as a Vikuiti™ Hollow Light Tunnel from 3M of Minn. The turn signal indicator or module and/or blind spot indicator or module may utilize a power light emitting diode (LED) with such a hollow light tunnel to provide a substantially uniform glow bar or glow element (such as by utilizing aspects of the indicator or indicators of the types described in U.S. patent application Ser. No. 11/912,576, filed Oct. 25, 2007, now U.S. Pat. No. 7,626,749, and/or U.S. provisional applications, Ser. No. 60/985,446, filed Nov. 5, 2007; and/or Ser. No. 61/019,478, filed Jan. 7, 2008, and/or U.S. Pat. Nos. 6,198,409; 5,929,786 and 5,786,772, and/or PCT Application No. PCT/US2006/026148, filed Jul. 5, 2006, and/or PCT Application No. PCT/US2007/82099, filed Oct. 22, 2007, which are hereby incorporated herein by reference in their entireties.

Figure 13:
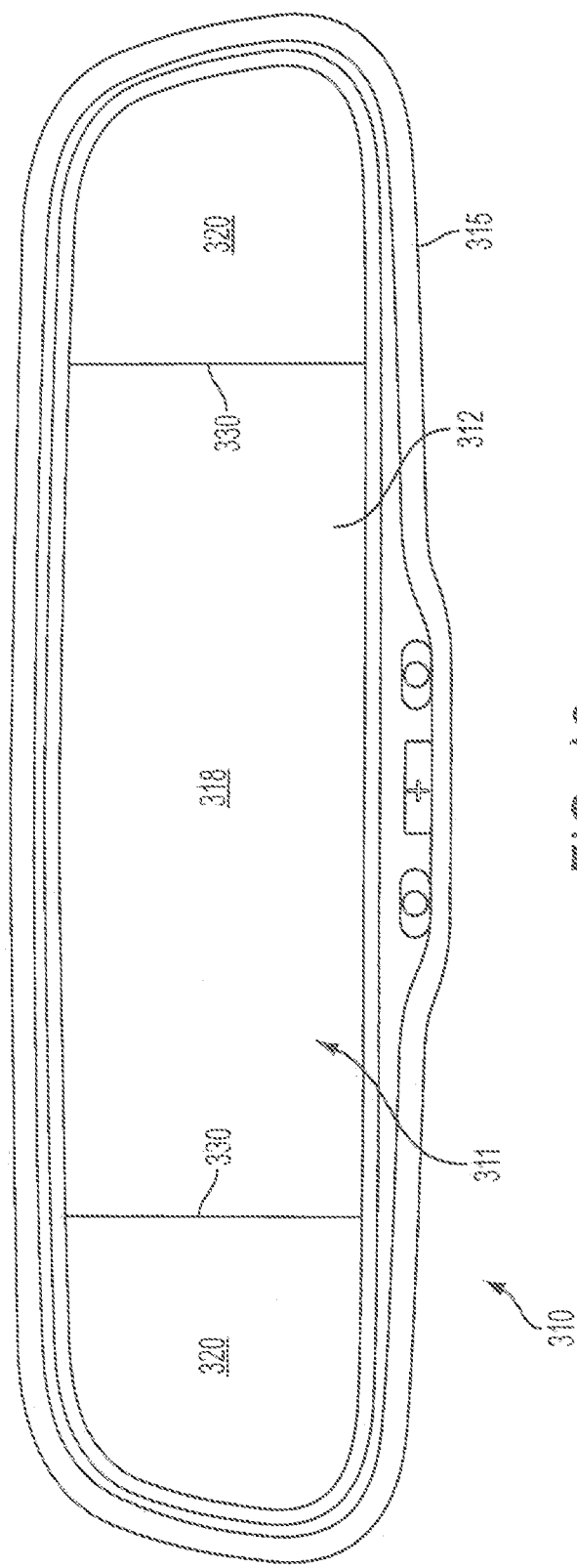
FIG. 13 is a plan view of an interior rearview mirror assembly with blind spot reflector elements or portions in accordance with the present invention.
Figure 13B:
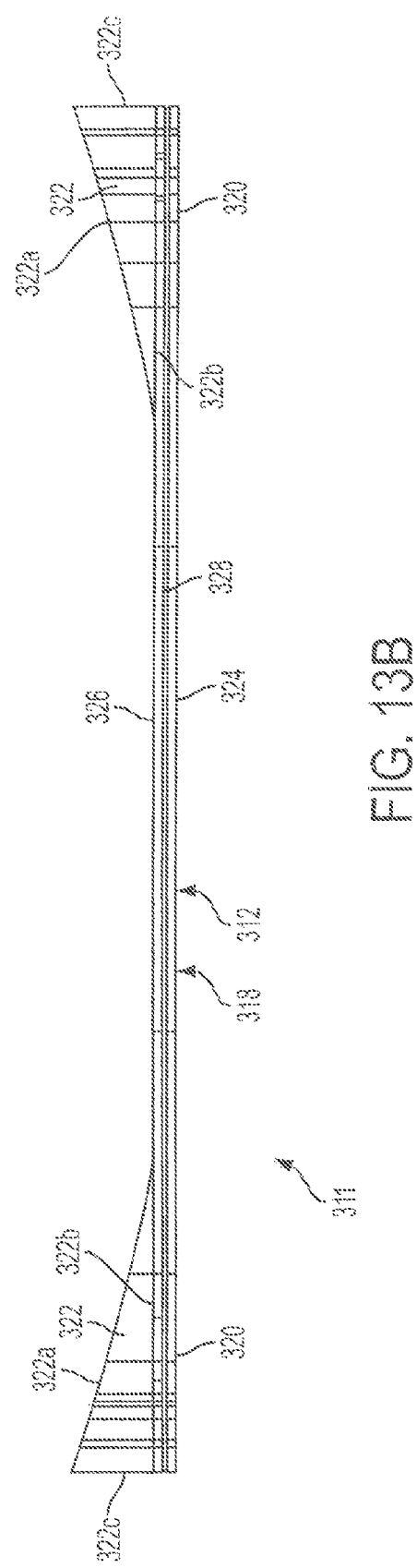
FIG. 13B is a sectional view of the interior rearview mirror assembly of FIG. 13.

Optionally, and with reference to FIGS. 13-13B, an interior rearview mirror assembly 310 of a vehicle includes a reflective element assembly 311 having a mirror reflector or reflective element 312 received in and/or supported by a mirror shell or casing 314 and bezel portion or casing 315. Reflective element 312 provides a first or principal mirror reflective element portion or area 318 and a second or auxiliary wide angle reflective element portion 320 at or near the side regions of the reflective element 312. Reflective element assembly 311 includes an auxiliary wide angle reflective element or reflective optic 322 established behind and at or near each of the wide angle portions 320 of the reflective element 312 to provide a wide angle "spotter" mirror at one or both sides of the reflective element, such as in a similar manner as discussed above.

In the illustrated embodiment, the reflective element 312 is an electro-optic reflective element, such as an electrochromic reflective element or the like, and includes a front glass substrate 324 and a rear glass substrate 326 with an electro-optic medium 328 disposed therebetween. The reflective element may include a mirror reflector or metallic reflector coating or coatings at the front surface of the rear substrate 326 (such as for a third surface mirror reflective element) or at the rear surface of the rear substrate 326 (such as for a fourth surface mirror reflective element), and the rear substrate may be substantially devoid of the metallic reflector coatings at the wide angle portions or side portions 320 of the reflective element. Thus, light incident on the principal reflective portion of the reflective element is reflected by the metallic reflector coatings at the rear substrate at the principal reflective portion 318, while light incident on the side portions 320 is reflected by the reflective spotter optic or element 322 (which may have a reflector coating or element or layer disposed at its curved rear surface 322*a*) at the side regions of the reflective element (because the light incident on the side portions passes through the reflective element where the reflective element is devoid of the mirror reflector coating or coatings).

For example, one or more reflector coatings may be disposed at the principal reflecting portion 318 of the reflective element, while a window or non-reflective portion is established at the auxiliary portions 320 (such as via masking of the auxiliary portions 320 during the coating process of the reflective element glass substrate) of the reflective element 312. For example, a window may be masked or formed through the mirror reflector coating or layer (such that a window area or areas of the reflective element is substantially devoid of the mirror reflector coating, while the mirror reflector or coating is present at the other regions of the principal reflecting area of the reflective element). The window may be formed via any suitable means, such as via masking of the window area during sputter deposition of the mirror reflector or the like, such as described above or such as via utilizing aspects of the coating processes described in U.S. Pat. Nos. 7,274,501; 7,255,451 and/or 7,184,190, and/or PCT Application No. PCT/US2006/018567, filed May 15, 2006 and published Nov. 23, 2006 as International Publication No. WO 2006/124682, which are all hereby incorporated herein by reference in their entireties.

Auxiliary wide angle elements 322 are disposed at the rear of the reflective element and at or behind the respective windows formed in the reflective coating of the reflective element 312 (and at the auxiliary portions 320 of the reflective element 312). Auxiliary wide angle element 322 comprises a glass element having a curved rear surface 322*b*, a generally planar front surface 322*b*, and a perimeter edge 322*c*, with a reflective coating or layer or element disposed or established at the curved rear surface 322*a*. The reflective coating or layer may comprise any suitable reflector layer, such as a metallic coating or layer, such as chromium or silver or aluminum or alloys thereof, or an ITO/Ag/ITO stack of layers or coatings or a silicon metal reflector coating, or the like. The glass wide angle element may be formed via casting or grinding the glass material, or via other suitable forming means, such as described above.

The auxiliary wide angle elements 322 may comprise glass elements that are adhered to the rear surface of the reflective element with an optical adhesive (such as, for example, a Dymax UV curable adhesive or the like, such as are available from Dymax Corporation of Torrington, Conn.). As discussed above, such a glass element or lens limits or substantially precludes bonding issues that may arise when a plastic or polymeric or polycarbonate lens is bonded to the glass substrate of the reflective element due to the differences in the thermal expansion coefficients of the two materials.

Optionally, the reflective element may provide a demarcation line or delineation line 330 at the inboard edges of the wide angle optics 322 and/or at the outboard edges of the principal reflecting region 318 of the mirror reflective element 312, in order to indicate to a person viewing the reflective element that there is a difference between the central region or principal region and the portions of the mirror reflective element outboard of the principal or central region. The demarcation line or lines 330 may be established at the rear substrate of the reflective element (such as by etching lines in the mirror reflector coating or coatings at or near the outboard edges of the coatings or by disposing or painting or applying a dark colored material, such as paint or ink or the like, at the rear of the reflective element and outboard of the metallic reflector coatings) so as to be viewable and discernible by a person viewing the reflective element.

Optionally, the wide angle optics 322 may be fixedly adhered to or attached to or disposed at the rear of the reflective element (such as via an optical adhesive or the like, such as discussed above), or the wide angle optics 322 may be adjustably disposed at the side regions 320 of the reflective element, and may be adjustable (such as rotatable about an generally horizontal axis or pivotable side-to-side or the like) to adjust a viewing angle of the driver of the vehicle to provide the desired or appropriate wide angle field of view for viewing the blind spot region or regions at the side or sides of the vehicle or for viewing or monitoring an interior portion of the vehicle cabin. For example, the wide angle optic may be rotated or adjusted via adjustment of a dial or toggle or the like at the respective side or sideward region or portion of the mirror casing (such as at a lower bezel portion of the mirror and generally below the side portion of the reflective element at which the adjustable wide angle optic is disposed) so as to adjust the wide angle optics relative to the reflective element and thus without adjusting the rearward field of view provided by the principal reflective portion of the reflective element.

Thus, the interior rearview mirror provides a reflective element having a generally planar front surface (the surface angled generally toward the driver of the vehicle when the mirror assembly is mounted in the vehicle and adjusted to provide a desired rearward field of view to the driver of the vehicle) and curved reflecting portions at the rear of the reflective element and at or near the side regions of the reflective element. The curved reflecting portions are curved to provide a wide angle field of view toward the side regions of the vehicle to enhance viewing by the driver of the vehicle of the blind spot regions at either or both sides of the vehicle. The wide angle curved reflecting portions may be adjustable to adjust the wide angle field of view without adjusting the principal reflector portion of the interior rearview mirror.

Figure 14:
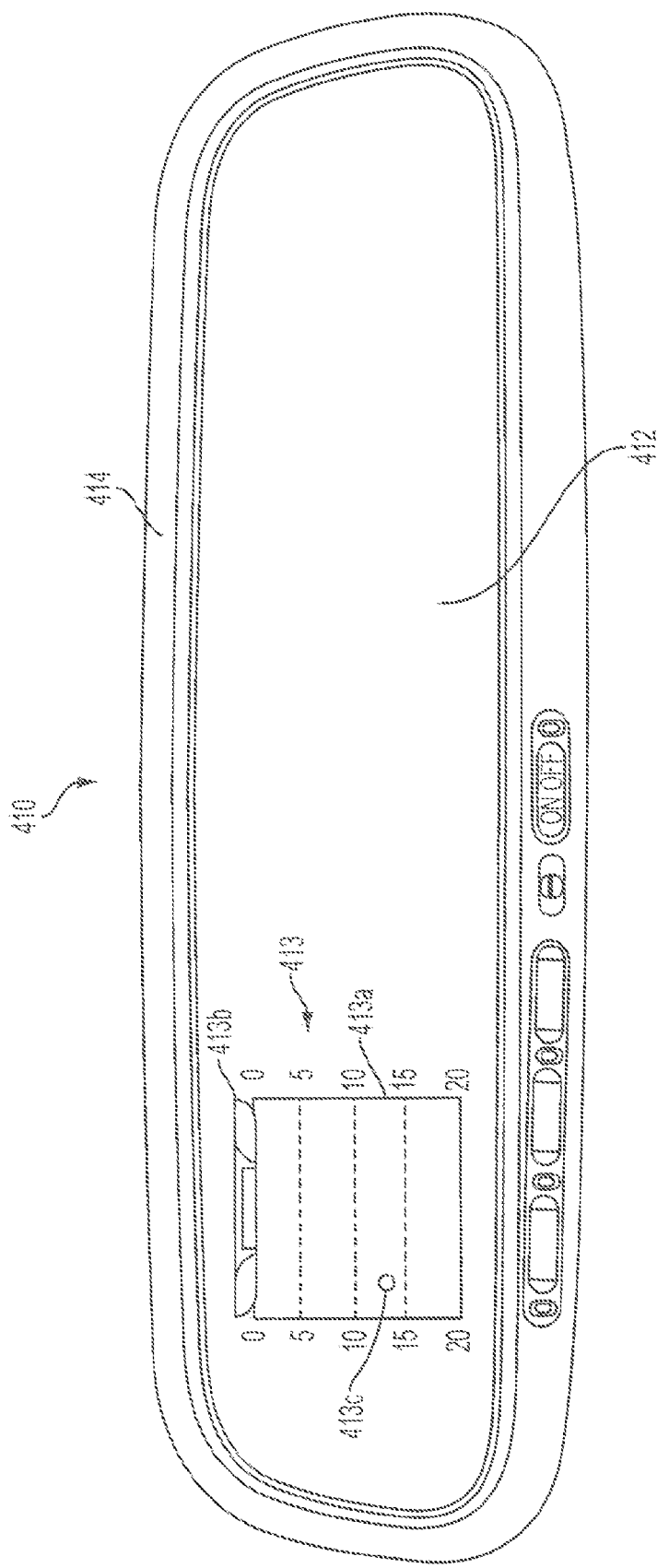
FIG. 14 is a plan view of an interior rearview mirror assembly with a display indicative of the area rearward of the vehicle in accordance with the present invention.

Optionally, and with reference to FIG. 14, an interior rearview mirror assembly 410 may include a reflective element 412 received in and/or supported by a mirror shell or casing 414, with a display device disposed behind the reflective element and within the casing and operable to display information through the reflective element for viewing of the information at a display area 413 of the reflective element by the driver of the vehicle. In the illustrated embodiment, the display device is responsive to an object detection system at the rear of the vehicle and operable to detect objects rearward of the vehicle. For example, the object detection system may comprise an ultrasonic sensing system or a radar sensing system or a vision-based or camera-based sensing system or other suitable sensing system capable of detecting objects rearward of the vehicle and preferably capable of determining or approximating a distance between the rear of the vehicle and the detected object. The display device is operable to display information indicative of the detected object or objects to alert the driver of the presence of an object or objects rearward of the vehicle, such as when the driver is reversing the vehicle.

In the illustrated embodiment, the display device comprises a grid and a 4×4 light emitting diode (LED) array (having four rows of LEDs and four columns of LEDs arranged or disposed at the rear of the reflective element) that is operable to energize one of the sixteen LEDs to indicate the location of an object detected in the area rearward of the vehicle. The display area 413 of the reflective element thus may have a grid 413a displayed thereat (such as a grid display that is displayed or activated in response to the vehicle being shifted into a reverse gear by the driver or operator of the vehicle so that the grid is viewable and discernible by a person viewing the mirror assembly when the display element or device is activated), such as by providing a transflective display at the rear of the reflective element (whereby the grid lines may be visible and discernible when the display element is activated and may be substantially not visible or discernible when the display element is deactivated). The grid indicates locations laterally across the width of the vehicle and locations at particular distances rearward of the vehicle (such as, for example, distances of about 5, 10, 15 and 20 or 30 feet or the like from the rear of the vehicle). Preferably, the grid display includes a representation 413b of the rear bumper of the vehicle to assist the driver in understanding where the area represented by the grid is in relation to the driven vehicle. Each of the LEDs of the LED array of the display device is disposed at a respective particular location on the grid to represent a respective particular location or area rearward of the vehicle and toward one side or the other of a centerline of the vehicle.

The display device and/or LED array is operable to energize a particular one (or two or more) of the sixteen LEDs to indicate a particular location of the detected object rearward of the vehicle. For example, and with reference to FIG. 14, when an object is detected about 10-15 feet behind the vehicle and toward the left side of the vehicle when the vehicle is backing up, the LED 413c is activated to indicate to the driver of the vehicle that an object is detected at that particular location. If a larger object is detected (such as a detected object that spans two or more of the zones or areas represented by respective ones of the LEDs), then two or more of the LEDs may be energized to indicate to the driver of the vehicle the location of the detected object or objects rearward of the vehicle. Although shown and described as comprising a 4×4 array of LEDs, the LED array of the display device may have more or less rows/columns of LEDs or may have them otherwise arranged within the grid or area of the display, while remaining within the spirit and scope of the present invention.

The display device of the present invention thus provides a representation of the area rearward of the vehicle that is readily viewed and understood by the driver to assist the driver in understanding where an object has been detected in the rearward path of the vehicle. Also, the display device, comprising an LED array with individually actuatable or energizable LEDs, provides a low cost display device without the added cost and complexity of a video display screen or the like.

Figure 15B:
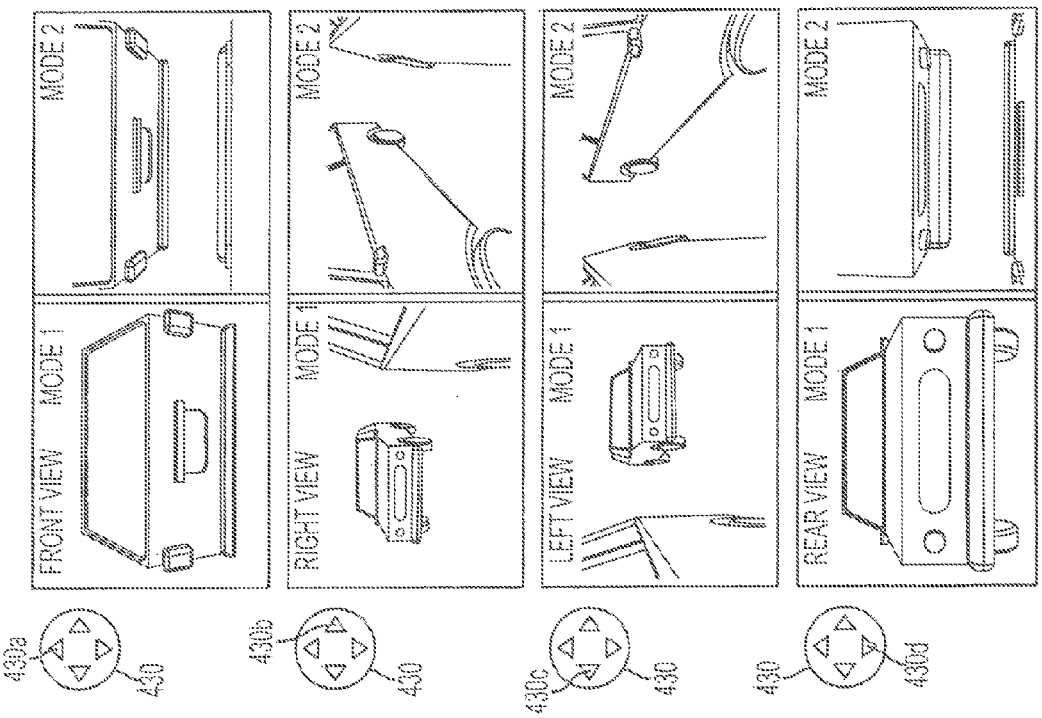
FIG. 15B depicts a plurality of display images that may be selectively displayed at a display module or element in accordance with the present invention.
Figure 15A:
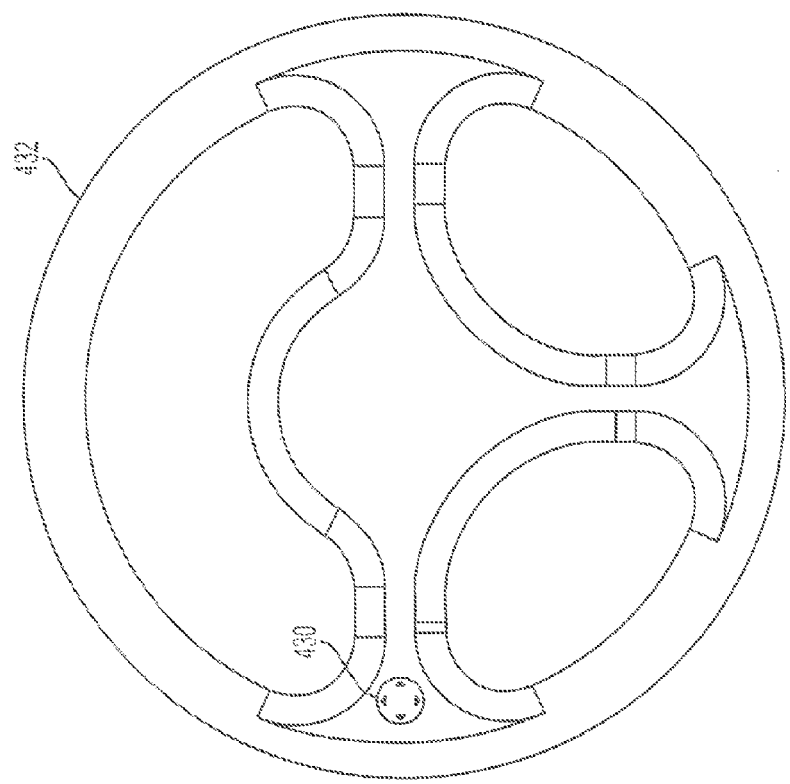
FIG. 15A is a perspective view of a user input for selectively controlling a display module or element in accordance with the present invention.
Figure 15C:
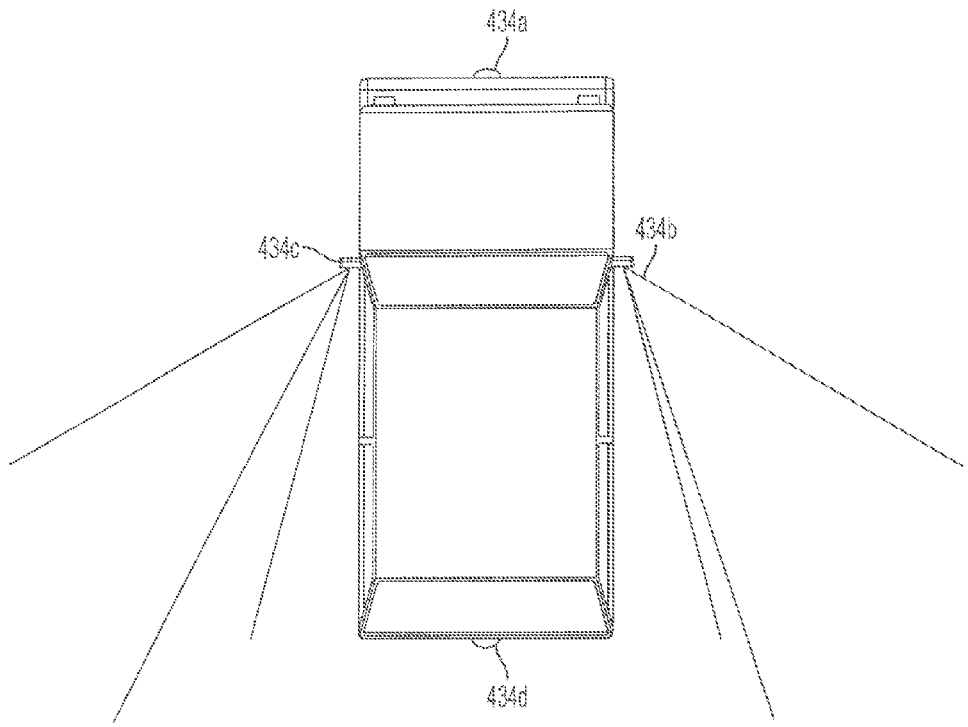
FIG. 15C is a plan view of a vehicle having a plurality of cameras for capturing images for display of the captured images to the driver of the vehicle.

Optionally, the display system may be selectively operable to display video images from one or more image sensors disposed at the vehicle and having a respective field of view exteriorly of the vehicle. For example, and with reference to FIGS. 15A-D, a display system 428 includes a display screen or monitor 429 and a user input 430 (which may be provided such as at a steering wheel 432 of the vehicle as shown in FIG. 15A or elsewhere in the vehicle, such as at the interior rearview mirror assembly or at the instrument panel or at a console of the vehicle or the like) that allows the user to select a camera 434 from which image data may be received by the display device and displayed at the display area, such as at the interior rearview mirror assembly. For example, the user input 430 may comprise a toggle switch or button (such as a four-way toggle as shown in FIGS. 15A and 15B), whereby the upper direction input 430a may provide for a selection of a forward facing camera or image sensor 434a (FIGS. 15C and 15D), the right direction input 430b may provide for a selection of a camera or image sensor 434b at the right side of the vehicle and having a generally sideward and rearward field of view, the left direction input 430c may provide for a selection of a camera or image sensor 434c at the left side of the vehicle and having a generally sideward and rearward field of view, and the lower direction input 430d may provide for a selection of a rearward facing camera or image sensor 434d. Thus, the driver of the vehicle may readily select what field of view is to be displayed at the video display screen 429 (which may be positioned within the vehicle and at a location that is readily viewable by the driver of the vehicle, such as at the interior rearview mirror assembly, such as in a similar manner as described above).

The display system thus may use a single video display screen or module or device 429 (such as at the interior rearview mirror) to display different fields of view from multiple cameras or image sensors and video inputs at different times. The image sensors or cameras may be located at or near the front and rear of the vehicle and at or near the respective sides (such as at or in the exterior rearview mirror assemblies) of the vehicle. Optionally, for example, the front and rear facing cameras 434a, 434d may comprise wide angle cameras and may provide a wide angle field of view (such as about a 140 degree field of view or greater, such as up to about a 180 degree field of view or other field of view depending on the particular application), while the side cameras 434b, 434c may provide a reduced field of view (such as about a 60 degree wide field of view or other field of view depending on the particular application). The front and rear facing cameras may be provided for and used for safety and parking aids, while the left and right side cameras may be provided for and used for blindzone detection systems.

Optionally, the display system may be operable in an active mode and/or a passive mode, depending on the particular application and/or the vehicle circumstances. When in the passive mode, the display system may be operable to automatically display images captured by respective ones of the cameras, such as in response to a triggering event. For example, a rear camera image may be displayed to the driver of the vehicle in response to the driver of the vehicle shifting the reverse gear selector to a reverse gear position to select the reverse gear of the vehicle, so that the rearward field of view of the rear camera is displayed to the driver of the vehicle to assist the driver during the reversing maneuver. Optionally, for example, a front camera image may be displayed in response to the vehicle being driven in a forward direction, but at a slow speed, such as at or below about 5 miles per hour or thereabouts. Optionally, for example, a side camera image may be displayed in response to actuation of the respective turn signal and/or a detection of an object at the side of the vehicle, such as in response to an object detection device or system at the respective exterior rearview mirror assembly and facing the vehicle's blindzone at that side of the vehicle.

Optionally, the driver may manually select any of the camera fields of view to view the desired or selected images, such as via the user input or toggle 430. Optionally, the driver may select between the active and passive triggering modes of the display system. For example, the driver may select a passive mode, whereby the display system may operate in response to the automatic triggering events discussed above. When the active mode is selected, the driver of the vehicle may manually select the image that is desired to be displayed via an in-vehicle human-machine interface (HMI) or user input.

Figure 15D:
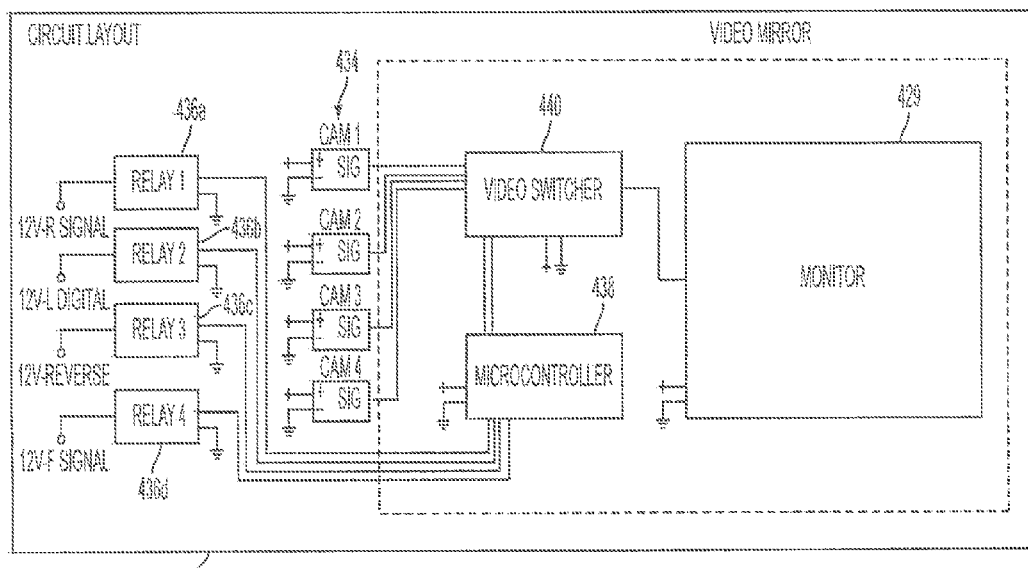
FIG. 15D is a schematic of a display system in accordance with the present invention.

As shown in FIG. 15D, the display system 428 may include a set of relays 436a-d that provide inputs to a microcontroller 438, which, in turn, provides inputs to a video switcher device or element 440 (which may comprise or may be in communication with the user input 430). The image data or image outputs of the cameras 434 are input to the video switcher, whereby captured images or image data from the selected camera (as selected by the operator in the active mode or as automatically selected in response to a respective relay in the passive mode) are displayed at the monitor 429. In the illustrated embodiment, the relays include a right turn signal relay 436a, a left turn signal relay 436b, a reverse gear selection relay 436c and a forward travel or speed relay 436d, which provide an actuation input or triggering signal to the microcontroller to actuate or utilize a respective camera to automatically provide the desired or appropriate captured images at the monitor for viewing by the driver of the vehicle during the associated or corresponding driving maneuver.

Optionally, and with reference to FIG. 15B, the user input 430 may be activated a first time for one camera image and a second time to change to another camera image. For example, when the upper toggle or button 430a is activated a first time, the display device may display images from a forward facing camera that provides a forward field of view in front of the vehicle, and when the upper toggle or button 430a is activated a second time, the display device may display images from a forward and downward facing camera at the front of the vehicle that provides a forward and generally downward field of view at the front of the vehicle (and may include a portion of the front of the vehicle, such as the front bumper of the vehicle, to provide enhanced cognizant awareness and understanding to the driver of the vehicle as to the meaning of the displayed images). Likewise, if the right toggle or button 430b or left toggle or button 430c is activated a first time, the display device may display images from a respective right or left camera at the respective side of the vehicle that may provide a generally rearward field of view alongside the vehicle to enhance the blindzone viewing at that side of the vehicle, and when the right or left toggle or button is activated a second time, the display device may display images from a respective right or left camera at the respective side of the vehicle that may provide a generally downward field of view at that side of the vehicle to the driver (such as for a parking assist device or system). Likewise, if the lower toggle or button 430d is activated a first time, the display device may display images from a rearward facing camera that provides a rearward field of view rearward of the vehicle, and when the lower toggle or button 430d is activated a second time, the display device may display images from a rearward and downward facing camera at the rear of the vehicle that provides a rearward and generally downward field of view at the rear of the vehicle (and may include a portion of the rear of the vehicle, such as the rear bumper of the vehicle, to provide enhanced cognizant awareness and understanding to the driver of the vehicle as to the meaning of the displayed images).

Optionally, the user input or HMI may be operable to allow the driver or operator to adjust or modify the selected displayed images. For example, the operator may pan the camera or zoom in or enlarge portions of the displayed image or rotate the image or truncate the image or expand the image or perform other image manipulation as desired. The user or operator may control such image manipulation via a user input, such as via a series of pushbuttons or a joystick or joysticks, a touch screen, a voice activated control, or any other device appropriate for providing such image manipulation and the like.

The display system thus may provide a passive mode that automatically displays images from vehicle cameras to provide the driver video images that may be relevant or helpful for the driving maneuver that is being undertaken by the driver, and may provide an active mode that allows the driver to manually select a view or camera that is desired at that time. The display system may provide multiple selections within the active mode, and may provide a first active mode and a second active mode for each side and front and rear region of the vehicle to further enhance the viewing capabilities to the driver of the vehicle for any type of driving maneuver.

Figure 16A:
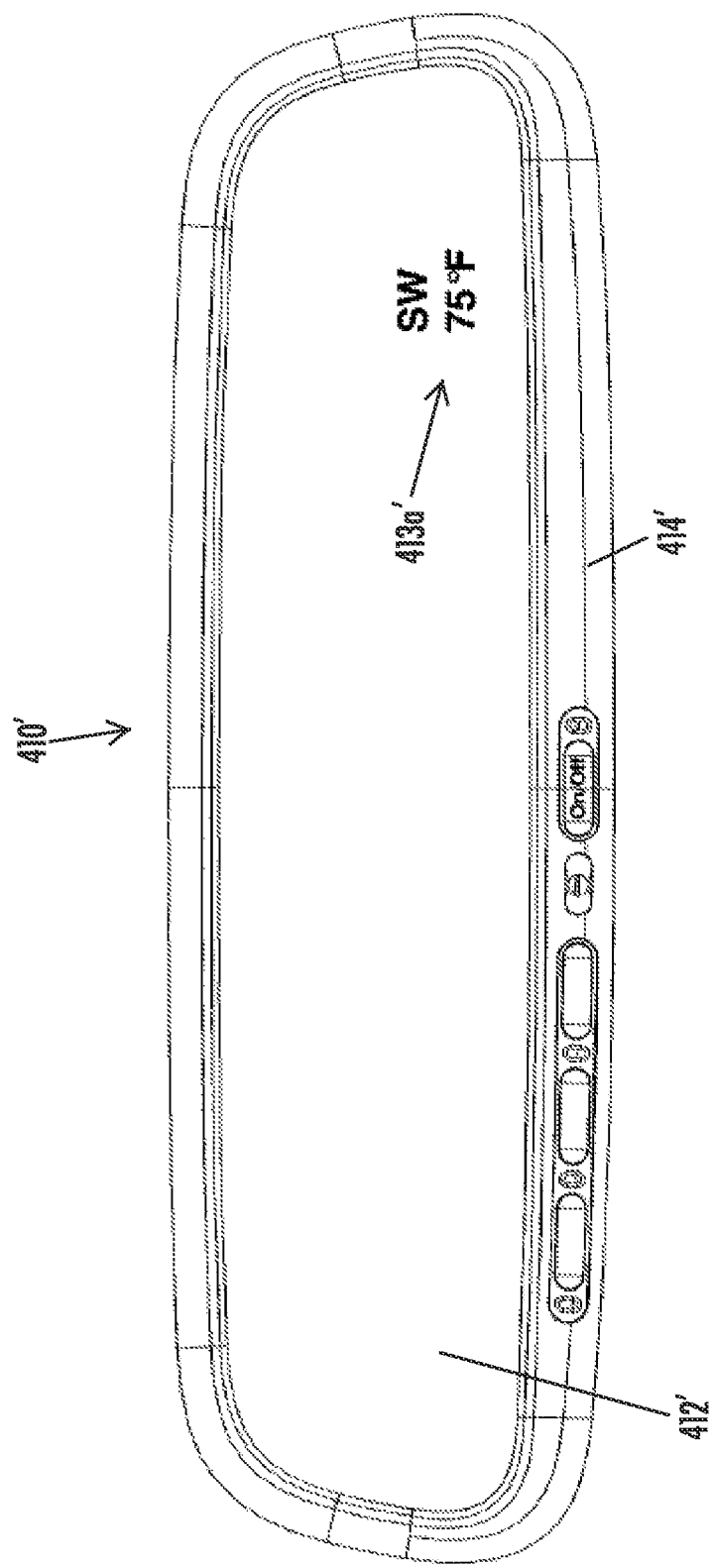
Figure 16B:
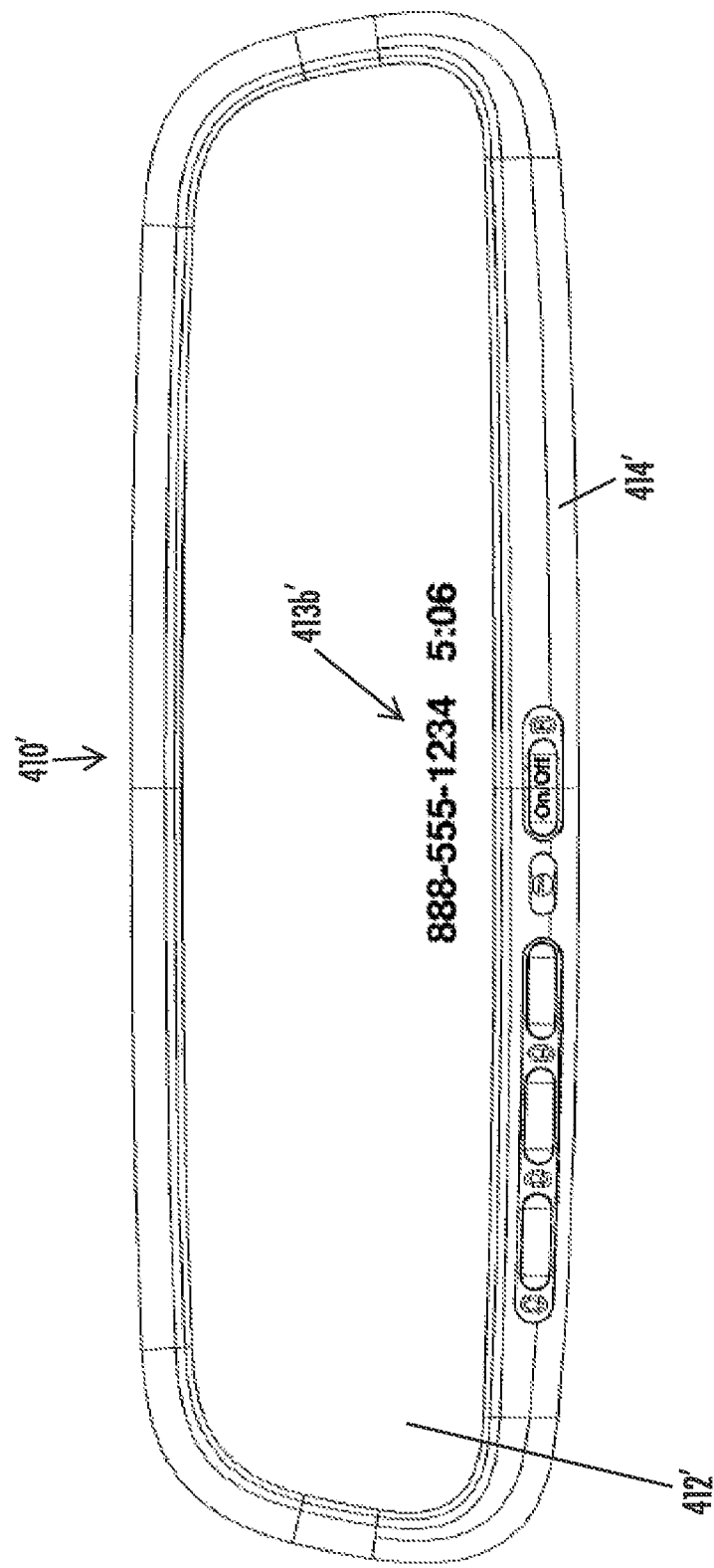

Optionally, the interior rearview mirror assembly of the vehicle may incorporate other display devices or elements for displaying information to the driver of the vehicle. For example, and with reference to FIGS. 16A-C, an interior rearview mirror assembly 410' may include a reflective element 412' received in and/or supported by a mirror shell or casing 414', with a display device disposed behind the reflective element and within the casing and operable to display information through the reflective element for viewing of the information (such as compass and/or temperature information, clock, telephone numbers, navigational instructions and/or the like) at a display area 413a' (FIG. 16A), 413b' (FIG. 16B) or 413c' (FIG. 16C) of the reflective element by the driver of the vehicle. The display device may comprise an electroluminescent display device that is operable to project or emit illumination through the transflective mirror reflective element for viewing by the driver of the vehicle. The electroluminescent display device or devices may provide high detail, high quality non-video images at the reflective element, and thus may provide a low cost alternative to liquid crystal video display devices or the like. Although shown in FIGS. 16A-C as a mirror assembly having a respective electroluminescent display device, it is envisioned that a mirror assembly may include or incorporate two or more such electroluminescent display devices, with each display device operable to project or display the respective information at the respective area of the reflective element at which the display device is disposed.

Optionally, an information mirror, such as the navigational information interior rearview mirror illustrated in FIG. 16C, may be a touch-sensitive interior rearview mirror where user-input may be via touching the front surface of the mirror element utilized. Such a touch-sensitive mirror element may be a resistive touch-sensitive mirror element or a capacitive touch-sensitive mirror element (either surface capacitive or projected capacitive). Alternatively, other touch-sensitive technologies may be utilized, such as surface acoustic wave (SAW) touch technology or force-based touch technology. For example, a display-on-demand transflective mirror element can be constructed that is adapted to be a surface capacitive rearview mirror element with an ITO transparent electrically conductive layer (or another type of layer, such as a tin oxide-based transparent conductor, such as ATO, or the like) on the first surface of the mirror element (for example, on the first surface of an electrochromic mirror cell), preferably disposed across the entire first (front) surface of the outermost glass substrate. Since the refractive index (RI) of the likes of ITO is higher than that of glass (glass has an RI around 1.52 whereas ITO can have an RI around 1.9 or thereabouts), optionally an anti-reflective coating or coatings may be disposed over the ITO transparent conductive coating both as an anti-reflection means and as an overcoating hardcoat. An automotive electrochromic (EC) interior mirror element typically maximally dims to about 6-7% R or so mainly because the fixed first surface reflectance off the glass first surface is around 4% R and there are then additional reflections off the ITO/glass second surface interface and some (but small) off the third surface reflector. Addition at the first surface of a higher index coating such as ITO that has an RI greater than glass's 1.52 may increase the "fixed" reflectance off the first surface, and thus may raise the lowest reflectance state reached when the EC cell is maximally dimmed under applied voltage. Addition of anti-reflecting means, as are known in the information display art, overlaying the ITO may mitigate this.

Optionally, the mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; 7,195,381; 7,249,860 and/or 5,669,698, which are hereby incorporated herein by reference in their entireties, may be included in the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377 and/or 6,420,975, and/or in U.S. patent application Ser. No. 10/529,715, filed Mar. 30, 2005, now U.S. Pat. No. 7,657,052; and/or in PCT Application No. PCT/US03/308877, filed Oct. 1, 2003, which are hereby incorporated herein by reference in their entireties.

Optionally, the mirror assembly may also or otherwise include other accessories, such as a telematics system, speakers, antennas, including global positioning system (GPS) or cellular phone antennas, such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,678,614; 6,946,978; 7,167,796; 7,308,341; and/or 7,004,593 U.S. patent application Ser. No. 10/529,715, filed Mar. 30, 2005, now U.S. Pat. No. 7,657,052; and/or PCT Application No. PCT/US03/40611, filed Dec. 19, 2003, and/or PCT Application No. PCT/US03/308877, filed Oct. 1, 2003, a communication module, such as disclosed in U.S. Pat. No. 5,798,688, a voice recorder, a blind spot detection and/or indication system, such as disclosed in U.S. Pat. Nos. 7,038,577; 6,882,287; 5,929,786 and/or 5,786,772, and/or U.S. patent application Ser. No. 11/315,675, filed Dec. 22, 2005, now U.S. Pat. No. 7,720,580; and/or U.S. provisional applications, Ser. No. 60/638,687, filed Dec. 23, 2004; Ser. No. 60/784,570, filed Mar. 22, 2006; and/or Ser. No. 60/696,953, filed Jul. 6, 2006, and/or PCT Application No. PCT/US2006/026148, filed Jul. 5, 2006, transmitters and/or receivers, such as for a garage door opener or a vehicle door unlocking system or the like (such as a remote keyless entry system), a digital network, such as described in U.S. Pat. No. 5,798,575, a compass indicator or display and/or a temperature indicator or display, such as described in U.S. Pat. Nos. 7,004,593 and/or 7,329,013, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. patent applications, Ser. No. 11/105,757, filed Apr. 14, 2005, now U.S. Pat. No. 7,526,103; Ser. No. 11/239,980, filed Sep. 30, 2005, now U.S. Pat. No. 7,881,496; and/or Ser. No. 11/334,139, filed Jan. 18, 2006, now U.S. Pat. No. 7,400,435, a video display device such as a fixed video device or module or a slide out or extendable/retractable video device or module, such as described in U.S. patent applications, Ser. No. 10/538,724, filed Jun. 13, 2005 and published Mar. 9, 2006 as U.S. Publication No. 2006/0050018; and/or Ser. No. 11/284,543, filed Nov. 22, 2005, now U.S. Pat. No. 7,370,983, PCT Application No. PCT/US06/042718, filed Oct. 31, 2006; and/or PCT Application No. PCT/US03/40611, filed Dec. 19, 2003, a video device for internal cabin surveillance (such as for sleep detection or driver drowsiness detection or the like) and/or video telephone function, such as disclosed in U.S. Pat. Nos. 5,760,962 and/or 5,877,897, an occupant detection system (such as the types described in PCT Application No. PCT/US2005/042504, filed Nov. 22, 2005 and published Jun. 1, 2006 as International Publication No. WO 2006/058098 A2, a heating element, particularly for an exterior mirror application, such as the types described in U.S. patent application Ser. No. 11/334,139, filed Jan. 18, 2006, now U.S. Pat. No. 7,370,983, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005, now U.S. Pat. No. 7,423,522; and/or U.S. provisional application, Ser. No. 60/611,796, filed Sep. 21, 2004, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005 and published Mar. 23, 2006 as U.S. Publication No. 2006/0061008, which is hereby incorporated herein by reference in its entirety), and may include a rain sensor or the like and may position the rain sensor against the windshield, such as described in U.S. Pat. Nos. 6,250,148; 6,341,523; 6,824,281; 6,516,664; 6,968,736; 7,188,963; and/or Ser. No. 11/201,661, filed Aug. 11, 2005, now U.S. Pat. No. 7,480,149, which are all hereby incorporated herein by reference in their entireties. Optionally, the mirror assembly may include an imaging device, such as an imaging array sensor for imaging systems of the types described in U.S. Pat. Nos. 6,946,978; 6,757,109; 6,717,610; 6,396,397; 6,201,642; 6,353,392; 6,313,454; 6,396,397; 5,550,677; 5,670,935; 5,796,094; 5,877,897; 6,097,023; 6,498,620; 7,339,149; and/or 7,038,577; and/or PCT application No. PCT/US2006/041709, filed Oct. 27, 2006, and published May 10, 2007 as International Publication No. WO 07/053,710; and/or U.S. patent application Ser. No. 11/672,070, filed Feb. 7, 2007, now U.S. Pat. No. 8,698,894, which are all hereby incorporated herein by reference in their entireties.

Optionally, the mirror assembly may include one or more user actuatable inputs or input devices or human machine interfaces. For example, the inputs or user interfaces may include buttons, such as are described in U.S. Pat. No. 6,501,387, and/or U.S. patent application Ser. No. 11/451,639, filed Jun. 13, 2006, now U.S. Pat. No. 7,527,403, which are hereby incorporated herein by reference in their entireties, or that include touch/proximity sensors such as are disclosed in U.S. Pat. Nos. 6,001,486; 6,310,611; 6,320,282; 6,627,918; and 7,224,324, and PCT Application No. PCT/US03/40611, filed Dec. 19, 2003, which are hereby incorporated herein by reference in their entireties, or that include other types of buttons or switches, such as those described in U.S. patent application Ser. No. 11/029,695, filed Jan. 5, 2005, now U.S. Pat. No. 7,253,723; and/or PCT Application No. PCT/US2004/015424, filed May 18, 2004, which are hereby incorporated herein by reference in their entireties, or that include fabric-made position detectors, such as are disclosed in U.S. Pat. Nos. 6,504,531; 6,501,465; 6,492,980; 6,452,479; 6,437,258 and 6,369,804, which are hereby incorporated herein by reference in their entireties. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, the interior rearview mirror assembly may include an ignition input or button or keyless start button, which may be integrated into the interior mirror so as to be readily accessible by the driver of the vehicle. The keyless start input may comprise a push button or may comprise a touch sensor or proximity sensor or capacitive sensor or voice recognition device or system or a touch screen (such as, for example, a touch screen video display module or screen such as the types described in U.S. patent application Ser. No. 11/284,543, filed Nov. 22, 2005, now U.S. Pat. No. 7,370,983, which is hereby incorporated herein by reference in its entirety) or the like, and/or may comprise a biometric input that starts the vehicle in response to recognition of the driver or authorized user and/or in response to the driver or authorized user actuating the input, such as by pressing a button or the like at the mirror assembly, such as at a bezel or chin region of the mirror assembly. The keyless start button or input device may be activated or awakened in response to detection of a smart card or other passive signaling device carried by the user, and may then actuate the vehicle ignition to start the vehicle in response to a user input or movement or actuation by a preauthorized user, such as a person or user that is recognized by the keyless start input or system or that has been allowed entry into the vehicle via a passive entry system or the like, whereby the system will start the vehicle only for the preauthorized person or user. Optionally, the keyless start button or input device may include a biometric reading device that is operable to process biometric data (such as fingerprint, retinal scan, voice recognition and/or the like) to determine if the user is an authorized user prior to starting the vehicle.

The interior rearview mirror assembly thus may provide an input element or device that is operable by the driver of the vehicle to start the vehicle without requiring a key and without requiring the driver to actuate an input at the instrument panel of the vehicle. The mirror system may communicate an output of the keyless ignition device or element to the engine control module or ignition device of the vehicle, such as via a wired connection or via a wireless communication or vehicle LIN/CAN bus interface or the like. The mirror system thus provides a keyless start and/or a passive keyless entry system, which may enhance the vehicle interior by providing the start button or input device at the interior rearview mirror instead of at the instrument panel of the vehicle. Optionally, the mirror system may also provide a memory mirror system and/or seat memory system and/or radio memory system and/or climate control memory system and/or the like, whereby the systems may set the mirrors, seat, radio, climate control and/or the like to the desired or selected setting in response to recognition of the user or driver by the passive entry system and/or the keyless start system. Thus, the system may recognize the user as the user (carrying an identification card or element) approaches the vehicle and may unlock the vehicle doors and set the seats, mirrors, radio, climate setting and/or the like as the user approaches and enters the vehicle, and then may allow the recognized and authorized user to start the vehicle by pressing or otherwise actuating (such as by waving a hand by a proximity sensor or touching a touch sensor or providing a voice command or the like) the keyless ignition button or sensor or receiver or input at the interior rearview mirror assembly. The user may thus approach and enter the vehicle and readily start the vehicle without having to adjust settings of the seats, mirrors, radio, climate control system, and without having to handle a key and insert a key into the door lock cylinder or an ignition key cylinder.

Optionally, a display device associated with a rearward sensing system (such as for displaying information representative of detected objects rearward of the vehicle when the vehicle is shifted into a reverse gear) may be operable in response to image data captured by a rearward facing camera or image sensor, such as an image sensor at the rear of the vehicle or such as one or more image sensors at one or both sides of the vehicle. Optionally, and with reference to FIGS. 17 and 18, an exterior rearview mirror assembly 510 of the vehicle may have a generally rearward and/or sideward facing imaging sensor or camera 512 mounted or established at or near the side of the vehicle, such as at a mounting arm or portion 514 of mirror assembly 510. The imaging sensor 512 may be mounted in a housing or casing 516 attached to a lower portion of the mirror mounting arm 514. In the illustrated embodiment, the mirror assembly 510 is a foldable mirror assembly, and may comprise a power fold mirror assembly, or may comprise a non-foldable mirror assembly, without affecting the scope of the present invention. The imaging sensor may utilize aspects of the imaging sensors and systems referenced above, and may utilize aspects of the camera modules described in U.S. patent application Ser. No. 10/534,632, filed May 11, 2005, now U.S. Pat. No. 7,965,336; and/or PCT Application No. PCT/US2006/041709, filed Oct. 27, 2006 and published May 10, 2007 as International Publication No. WO 07/053,404, which are hereby incorporated herein by reference in their entireties.

The imaging sensor or device or camera is operable to capture images of the side region or blind spot region of the vehicle. The captured images may be displayed on a display element or screen (such as a video display screen), such as at a display screen at the exterior mirror reflective element 518 (such as by utilizing aspects of the system described in U.S. patent application Ser. No. 11/933,697, filed Nov. 1, 2007, now U.S. Pat. No. 7,777,611, and U.S. provisional application Ser. No. 60/857,025, filed Nov. 6, 2006, which are hereby incorporated herein by reference in their entireties), where the display may encompass a portion of the reflective element (such as an upper, outboard corner region of the reflective element) and/or may encompass the entirety or substantially the entirety of the reflective element (and may be viewable through the mirror reflective element), and/or such as at a display screen at and/or behind the interior mirror reflective element (or elsewhere depending on the particular application). The interior or exterior mirror reflective element may comprise a transflective mirror reflective element such that the display screen images may be viewable through the transflective mirror reflective element when the display screen is activated but substantially not viewable through the transflective mirror reflective element when the display screen is deactivated. The imaging sensor may be activated in response to actuation of a turn signal indicator so that it is operated when the driver of the vehicle is in the process of changing lanes or turning, or in response to a detection system (such as a radar detection system or the like) that detects the presence of an object or vehicle in the lane or region adjacent to the controlled vehicle, or other actuating means (such as by utilizing aspects of the mirror system described in U.S. Pat. No. 7,126,456, which is hereby incorporated herein by reference in its entirety). Optionally, and desirably, the imaging sensor and display element or screen may be deactivated following a period of time after the activating event or input (such as, for example, about ten seconds after the turn signal indicator is turned off).

The imaging sensor may be oriented at and mounted at the side region of the vehicle so as to capture images that include a portion of the side of the vehicle for a reference to the driver or person viewing the display screen. The display screen (displaying images of the scene occurring exteriorly and sidewardly/rearwardly of the vehicle) supplements the view provided by the exterior rearview mirror to enhance the driver's rearward viewing and awareness of objects or vehicles at or near the blind spot at the side or sides of the controlled vehicle.

Optionally, the camera may be mounted to the fixed portion of the mirror assembly, and may be fixedly mounted so as to have a desired rearward and sideward field of view along the side of and rearward of the vehicle. Optionally, the camera may be adjustably mounted at the mirror assembly so as to have an adjustable rearward and sideward field of view. Optionally, the camera may be adjustably mounted to a movable portion of the folding mirror (or extendable mirror or the like), and may be adjusted in response to movement or adjustment of the mirror assembly (such as in response to the mirror assembly pivoting to its extended or operational orientation). For example, a cam actuator or the like may function to adjust the camera to a desired or appropriate orientation in response to an adjustment of the mirror assembly (optionally, the camera may be adjustable in response to an adjustment of the mirror reflective element, such as when the driver of the vehicle adjusts the reflective element to adjust the rearward field of view).

Optionally, the display system or imaging system may include a forward facing camera (such as an imaging sensor or camera at the front of the vehicle with a forward facing field of view immediately in front of the vehicle and in an area not readily viewable by the driver of the vehicle. Such a forward facing camera may capture images of the area immediately in front of the vehicle for displaying to the driver so that the driver is aware of an object or child or animal in front of the vehicle, such as at the initial startup of the vehicle. Optionally, a rearward facing camera may be provided at the rear of the vehicle as well to provide images of the area immediately rearward of the vehicle for viewing by the driver of the vehicle.

Optionally, the forward facing camera (and/or the rearward facing camera) may be activated in response the vehicle ignition being started so that the driver of the vehicle is able to readily view the area immediately in front (and/or rear) of the vehicle. Optionally, the forward facing camera (and display) may be activated when the vehicle is first started (whereby a display, such as at the interior rearview mirror of the vehicle, is activated to display the area immediately in front of the vehicle), and if the vehicle is shifted into a reverse gear, the rearward facing camera (and display) may be activated, whereby the display is activated to display the area immediately rearward of the vehicle. Optionally, the forward facing camera may not be activated until the vehicle is shifted into a forward gear. Thus, the appropriate camera is activated and the respective field of view is displayed to the driver of the vehicle at the initial onset of the vehicle or initial shifting into the respective gear. Optionally, and desirably, the camera and/or display may be deactivated at the end of a period of time following the initial activation and/or when the vehicle travels a threshold distance or when the vehicle attains a threshold forward or reverse speed. Optionally, operation of the cameras may be locked out during normal driving of the vehicle.

The image processor for processing the images captured by the imaging device or devices or sensors or cameras may be an existing processor that is located at or near the interior rearview mirror for processing images captured from an existing forward facing imaging sensor or camera with a forward field of view. For example, the image processor and forward facing camera may be part of or operable in conjunction with an automatic headlamp control (AHC) system or a rain sensing system or a lane departure warning (LDW) system or a traffic sign recognition (TSR) system (such as the types described in U.S. Pat. No. 7,004,606, which is hereby incorporated herein by reference in its entirety) or the like. Optionally, for example, the image processor may comprise an EyeQ™ image processing chip available from Mobileye Vision Technologies Ltd. of Jerusalem, Israel. Such image processors include object detection software (such as the types described in U.S. patent application Ser. No. 10/427,051, filed Apr. 30, 2003, now U.S. Pat. No. 7,038,577; and/or Ser. No. 11/315,675, filed Dec. 22, 2005, now U.S. Pat. No. 7,720,580, which are hereby incorporated herein by reference in their entireties), and analyzes image data to detect objects. Other types of image processors may be utilized while remaining within the spirit and scope of the present invention.

Figure 19:
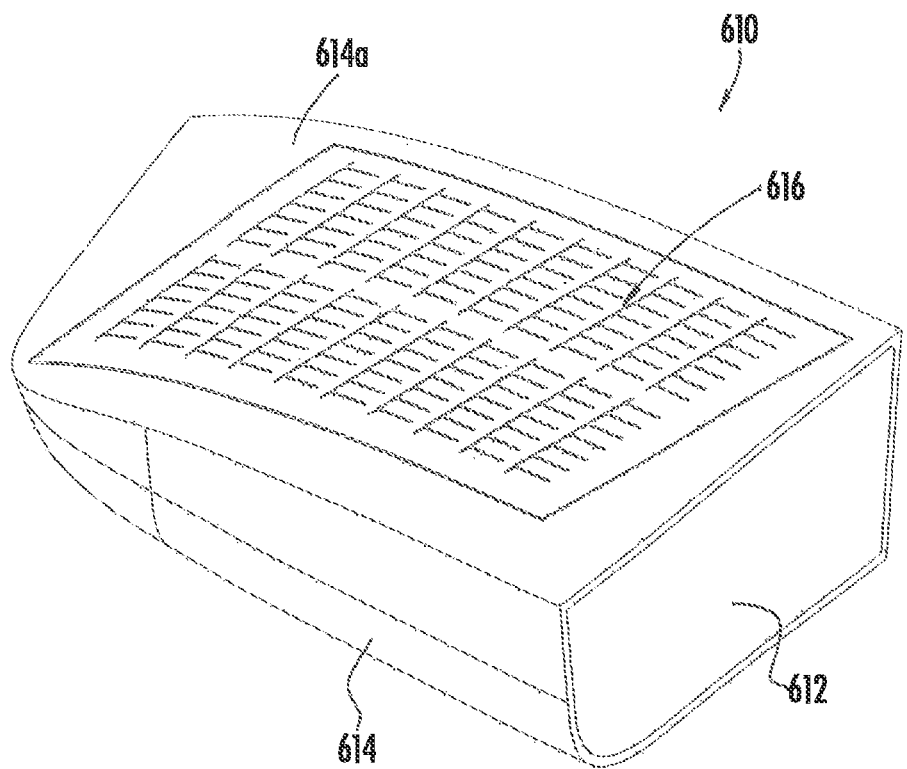
FIG. 19 is a perspective view of an exterior rearview mirror assembly having a solar panel disposed thereat in accordance with the present invention.

Optionally, and with reference to FIG. 19, an exterior rearview mirror assembly 610 includes a reflective element 612 and a casing 614, with a solar panel 616 disposed at or incorporated in an upper surface or wall 614a of casing 614 for capturing solar energy to assist in powering one or more accessories of the mirror assembly or vehicle and/or for charging one or more batteries of the mirror assembly or vehicle. The solar panel 616 may comprise any suitable solar panel element for capturing solar energy and storing the energy for use in various electrical applications. The mirror casing 614 may comprise an enlarged upper surface or wall 614a so as to support a correspondingly large solar panel to enhance the capturing of solar energy at the exterior rearview mirror assembly. Thus, the present invention may provide additional energy for charging or operating various accessories of the mirror assembly (such as the mirror actuator or illumination sources of the mirror assembly) or of the vehicle.

Optionally, the exterior mirror may include other accessories, such as, for example, a blind spot indicator or a turn signal indicator or a brake light indicator. For example, the exterior rearview mirror assembly may include one or more illumination sources (such as at a perimeter region of the mirror casing or reflective element) that are activated or energized in response to the brake pedal switch of the vehicle (or in response to other inputs indicative of the brakes of the vehicle being applied). Optionally, the mirror assembly may include a row or column of LEDs (such as a row of LEDs arranged along a lower portion of the mirror casing and below the reflective element) that are incrementally energized in response to the degree of braking of the vehicle (such as in response to a pressure in the brake lines of the vehicle or a vehicle deceleration rate or the like during braking or decelerating of the vehicle). For example, one or more LEDs at the inboard portion of the row of LEDs may be activated at the onset of braking, and more of the LEDs may be activated (with the subsequently activated LEDs being toward the outboard portion of the row of LEDs from the initially activated LEDs) as the braking level increases. Thus, each LED (or subset of LEDs) is activated or energized in response to the degree of braking reaching a respective threshold level. Optionally, all of the LEDs may be activated at a first or lower intensity in response to an onset of braking, and the intensities of the individual LEDs (or subsets of LEDs) may be increased to a greater intensity or brightness in response to the degree of braking reaching a respective threshold level. The mirror assembly thus provides an indication of the host vehicle braking or decelerating that is viewable by a driver of a vehicle at the side of the host vehicle, and that may indicate the degree of braking of the host vehicle to provide additional information to the driver of the other vehicle.

The constructions of the present invention are economical and effective compared to the more complicated and potentially more costly constructions of other mirror assemblies. For example, no additional elements or reflectors need be positioned at the front or rear surface of the reflective element, since the auxiliary reflector portion is integrally formed and/or established at the reflective element during manufacture of the reflective element.

Changes and modifications to the specifically described embodiments may be carried out without departing from the principles of the present invention, which is intended to be limited only by the scope of the appended claims as interpreted according to the principles of patent law.

The invention claimed is:

1. A mirror reflective element assembly for an exterior rearview mirror assembly of a vehicle, said mirror reflective element assembly comprising:

a principal mirror element, said principal mirror element comprising a glass substrate and a first reflector coating disposed at a surface of said glass substrate to establish a principal reflector portion of said mirror reflective element assembly;

a wide angle mirror element, said wide angle mirror element comprising a glass element having a second reflector coating disposed at a surface of said glass element to establish an auxiliary reflector portion of said mirror reflective element assembly;

an illumination element comprising an illumination source, wherein said illumination element at least partially circumscribes said glass element of said wide angle mirror element;

wherein said illumination element, when said illumination source is activated, emits illumination at least partially around said glass element that is viewable by a person viewing an exterior rearview mirror assembly equipped with said mirror reflective element assembly when the equipped exterior rearview mirror assembly is disposed at a side of a vehicle equipped with the exterior rearview mirror assembly;

wherein said wide angle mirror element is disposed at an upper outboard portion of said mirror reflective element assembly when the equipped exterior rearview mirror assembly is disposed at the side of the equipped vehicle;

wherein at least one of (i) said illumination element, responsive to determination that an ambient light level is below a threshold level, is operable to provide a light level that is less than about 100 candelas per square meter, and (ii) said illumination element, responsive to determination that an ambient light level is above a threshold level, is operable to provide a light level that is greater than about 200 candelas per square meter;

a back plate, wherein said principal mirror element is attached at said back plate;

wherein said back plate comprises a receiving portion generally at said auxiliary reflector portion of said reflective element assembly, and wherein said receiving portion is configured to at least partially receive said wide angle mirror element; and a cover plate attached to said receiving portion, said cover plate substantially encasing said wide angle mirror element within said receiving portion.

2. The mirror reflective element assembly of claim 1, wherein said first reflector coating comprises a different material than said second reflector coating.

3. The mirror reflective element assembly of claim 2, wherein said first reflector coating has a different tint than said second reflector coating.

4. The mirror reflective element assembly of claim 1, wherein, responsive to determination that an ambient light level is below a threshold level, said illumination element is operable to provide a light level that is less than about 100 candelas per square meter.

5. The mirror reflective element assembly of claim 1, wherein, responsive to determination that an ambient light level is above a threshold level, said illumination element is operable to provide a light level that is greater than about 200 candelas per square meter.

6. The mirror reflective element assembly of claim 1, wherein said illumination source of said illumination element is activated responsive to an object detection system of the equipped vehicle, and wherein said illumination element is activated responsive, at least in part, to said object detection system detecting an object present at or near the side of the equipped vehicle at which the equipped exterior rearview mirror assembly is mounted.

7. The mirror reflective element assembly of claim 1, wherein said illumination element is activated responsive to a turn signal indicator of the equipped vehicle, and wherein said illumination element is activated responsive, at least in part, to activation of a turn signal indicator at the side of the equipped vehicle at which the equipped exterior rearview mirror assembly is mounted.

8. A mirror reflective element assembly for an exterior rearview mirror assembly of a vehicle, said mirror reflective element assembly comprising:
  a principal mirror element, said principal mirror element comprising a glass substrate and a first reflector coating disposed at a surface of said glass substrate to establish a principal reflector portion of said mirror reflective element assembly;
  a wide angle mirror element, said wide angle mirror element comprising a glass element having a second reflector coating disposed at a surface of said glass element to establish an auxiliary reflector portion of said mirror reflective element assembly;
  an illumination element comprising an illumination source, wherein said illumination element at least partially circumscribes said glass element of said wide angle mirror element;
  wherein said illumination element, when said illumination source is activated, emits illumination at least partially around said glass element that is viewable by a person viewing an exterior rearview mirror assembly equipped with said mirror reflective element assembly when the equipped exterior rearview mirror assembly is disposed at a side of a vehicle equipped with the exterior rearview mirror assembly;
  wherein said wide angle mirror element is disposed at an upper outboard portion of said mirror reflective element assembly when the equipped exterior rearview mirror assembly is disposed at the side of the equipped vehicle;
  wherein at least one of (i) said illumination element, responsive to determination that an ambient light level is below a threshold level, is operable to provide a light level that is less than about 100 candelas per square meter, and (ii) said illumination element, responsive to determination that an ambient light level is above a threshold level, is operable to provide a light level that is greater than about 200 candelas per square meter; and
  wherein said wide angle mirror element is disposed to the rear of a portion of said glass substrate of said principal mirror element, and wherein said illumination element is disposed to the rear of said glass substrate, and wherein, when said illumination source is activated, said illumination element emits illumination at least partially around said glass element that is viewable through said glass substrate by a person viewing the equipped exterior rearview mirror assembly when the equipped exterior rearview mirror assembly is disposed at the side of the equipped vehicle.

9. The mirror reflective element assembly of claim 8, wherein said first reflector coating is disposed at a front surface of said glass substrate and wherein a window is established at said first reflector coating, said window corresponding to a location of said wide angle mirror element and said illumination element.

10. The mirror reflective element assembly of claim 8, comprising a back plate, wherein said principal mirror element is attached at said back plate.

11. The mirror reflective element assembly of claim 10, wherein said back plate comprises a receiving portion generally at said auxiliary reflector portion of said reflective element assembly, and wherein said receiving portion is configured to at least partially receive said wide angle mirror element.

12. The mirror reflective element assembly of claim 8, wherein said auxiliary reflector portion is devoid of said first reflector coating.

13. The mirror reflective element assembly of claim 8, wherein said glass element of said wide angle mirror element is adhered at a rear surface of said glass substrate via an optical adhesive, and wherein said optical adhesive has an index of refraction that is substantially similar to a refractive index of said glass substrate.

14. A mirror reflective element assembly for an exterior rearview mirror assembly of a vehicle, said mirror reflective element assembly comprising:
  a principal mirror element, said principal mirror element comprising a glass substrate and a first reflector coating disposed at a surface of said glass substrate to establish a principal reflector portion of said mirror reflective element assembly;
  a wide angle mirror element, said wide angle mirror element comprising a glass element having a second reflector coating disposed at a surface of said glass element to establish an auxiliary reflector portion of said mirror reflective element assembly;
  an illumination element comprising an illumination source, wherein said illumination element at least partially circumscribes said glass element of said wide angle mirror element;
  wherein said illumination source comprises at least one light emitting diode;
  wherein said illumination element, when said illumination source is activated, emits illumination at least partially around said glass element that is viewable by a person viewing an exterior rearview mirror assembly equipped with said mirror reflective element assembly when the equipped exterior rearview mirror assembly is disposed at a side of a vehicle equipped with the exterior rearview mirror assembly;
  wherein said wide angle mirror element is disposed at an upper outboard portion of said mirror reflective element assembly when the equipped exterior rearview mirror assembly is disposed at the side of the equipped vehicle;

wherein at least one of (i) said illumination element, responsive to determination that an ambient light level is below a threshold level, is operable to provide a light level that is less than about 100 candelas per square meter, and (ii) said illumination element, responsive to determination that an ambient light level is above a threshold level, is operable to provide a light level that is greater than about 200 candelas per square meter;

wherein at least one of (a) said illumination source of said illumination element is activated responsive to an object detection system of the equipped vehicle, and wherein said illumination element is activated responsive, at least in part, to said object detection system detecting an object present at or near the side of the equipped vehicle at which the equipped exterior rearview mirror assembly is mounted, and (b) said illumination element is activated responsive to a turn signal indicator of the equipped vehicle, and wherein said illumination element is activated responsive, at least in part, to activation of a turn signal indicator at the side of the equipped vehicle at which the equipped exterior rearview mirror assembly is mounted; and wherein said wide angle mirror element is disposed to the rear of a portion of said glass substrate of said principal mirror element, and wherein said illumination element is disposed to the rear of said glass substrate, and wherein, when said illumination source is activated, said illumination element emits illumination at least partially around said glass element that is viewable through said glass substrate by the person viewing the equipped exterior rearview mirror assembly when the equipped exterior rearview mirror assembly is disposed at the side of the equipped vehicle.

15. The mirror reflective element assembly of claim 14, comprising a back plate, wherein said principal mirror element is attached at said back plate, and wherein said back plate comprises a receiving portion generally at said auxiliary reflector portion of said reflective element assembly, and wherein said receiving portion is configured to at least partially receive said wide angle mirror element.

16. The mirror reflective element assembly of claim 14, wherein said first reflector coating comprises a different material than said second reflector coating.

17. A mirror reflective element assembly for an exterior rearview mirror assembly of a vehicle, said mirror reflective element assembly comprising:

a principal mirror element, said principal mirror element comprising a glass substrate and a first reflector coating disposed at a surface of said glass substrate to establish a principal reflector portion of said mirror reflective element assembly;

a wide angle mirror element, said wide angle mirror element comprising a glass element having a second reflector coating disposed at a surface of said glass element to establish an auxiliary reflector portion of said mirror reflective element assembly;

a back plate, wherein said principal mirror element and said wide angle mirror element are disposed at said back plate;

an illumination element comprising an illumination source, wherein said illumination element at least partially circumscribes said glass element of said wide angle mirror element;

wherein said illumination element, when said illumination source is activated, emits illumination at least partially around said glass element that is viewable by a person viewing an exterior rearview mirror assembly equipped with said mirror reflective element assembly when the equipped exterior rearview mirror assembly is disposed at a side of a vehicle equipped with the exterior rearview mirror assembly;

wherein said wide angle mirror element is disposed at an upper outboard portion of said mirror reflective element assembly when the equipped exterior rearview mirror assembly is disposed at the side of the equipped vehicle;

wherein (i) said illumination element, responsive to determination that an ambient light level is below a threshold level, is operable to provide a light level that is less than about 100 candelas per square meter, and (ii) said illumination element, responsive to determination that an ambient light level is above a threshold level, is operable to provide a light level that is greater than about 200 candelas per square meter; and wherein said wide angle mirror element is disposed to the rear of a portion of said glass substrate of said principal mirror element, and wherein said illumination element is disposed to the rear of said glass substrate, and wherein, when said illumination source is activated, said illumination element emits illumination at least partially around said glass element that is viewable through said glass substrate by the person viewing the equipped exterior rearview mirror assembly when the equipped exterior rearview mirror assembly is disposed at the side of the equipped vehicle.

18. The mirror reflective element assembly of claim 17, wherein said principal mirror element is attached at said back plate, and wherein said back plate comprises a receiving portion generally at said auxiliary reflector portion of said reflective element assembly, and wherein said receiving portion is configured to at least partially receive said wide angle mirror element.

19. The mirror reflective element assembly of claim 17, wherein at least one of (a) said illumination source of said illumination element is activated responsive to an object detection system of the equipped vehicle, and wherein said illumination element is activated responsive, at least in part, to said object detection system detecting an object present at or near the side of the equipped vehicle at which the equipped exterior rearview mirror assembly is mounted, and (b) said illumination element is activated responsive to a turn signal indicator of the equipped vehicle, and wherein said illumination element is activated responsive, at least in part, to activation of a turn signal indicator at the side of the equipped vehicle at which the equipped exterior rearview mirror assembly is mounted.

* * * * *

UNITED STATES PATENT AND TRADEMARK OFFICE
CERTIFICATE OF CORRECTION

PATENT NO. : 9,580,017 B2  
APPLICATION NO. : 14/336371  
DATED : February 28, 2017  
INVENTOR(S) : Foote et al.

Page 1 of 1

It is certified that error appears in the above-identified patent and that said Letters Patent is hereby corrected as shown below:

Column 6  
Line 52, "61" should read --6/--

Column 7  
Line 8, "61/" should read --6/--

Column 26  
Line 31, "234")" should read --234''')--  
Line 35, "234''" should read --234'''')--  
Line 51, "222''" should read --222''''--  
Line 57, "232''" should read --232''''--  
Line 57, "232a''" should read --232a''''--  
Line 59, "232b''" should read --232b''''--  
Line 59, "232a''" should read --232a''''--  
Line 59, "232b" should read --232b''''--

Column 27  
Line 33, "100" should read --10G''''--

Column 29  
Line 66, "252''" should read --252'''--

Signed and Sealed this  
Twenty-fourth Day of July, 2018

Andrei Iancu  
*Director of the United States Patent and Trademark Office*